(12) United States Patent
Dutta

(10) Patent No.: US 10,581,624 B2
(45) Date of Patent: Mar. 3, 2020

(54) HIERARCHICAL BIT INDEXED REPLICATION OF MULTICAST PACKETS

(71) Applicant: Nokia Solutions and Networks Oy, Espoo (FI)

(72) Inventor: Pranjal Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/927,770

(22) Filed: Mar. 21, 2018

(65) Prior Publication Data
US 2019/0296922 A1    Sep. 26, 2019

(51) Int. Cl.
*H04L 12/18*    (2006.01)
*H04L 12/741*   (2013.01)

(52) U.S. Cl.
CPC ............ *H04L 12/18* (2013.01); *H04L 45/745* (2013.01)

(58) Field of Classification Search
CPC ............................... H04L 12/18; H04L 45/745
See application file for complete search history.

(56) References Cited

U.S. PATENT DOCUMENTS

| | | | | |
|---|---|---|---|---|
| 7,339,903 | B2 * | 3/2008 | O'Neill | ................. H04L 12/185 370/313 |
| 8,711,752 | B2 | 4/2014 | Liu et al. | |
| 9,853,822 | B2 | 12/2017 | Wijnands et al. | |
| 2015/0078377 | A1 * | 3/2015 | Wijnands | ............ H04L 12/1886 370/390 |
| 2015/0085635 | A1 * | 3/2015 | Wijnands | ................. H04L 45/28 370/216 |
| 2015/0131659 | A1 | 5/2015 | Wijnands et al. | |
| 2015/0131660 | A1 * | 5/2015 | Shepherd | ................. H04L 45/74 370/390 |
| 2015/0181309 | A1 * | 6/2015 | Shepherd | ................. H04L 12/18 725/109 |

(Continued)

FOREIGN PATENT DOCUMENTS

| | | |
|---|---|---|
| WO | 2016071843 | 5/2016 |
| WO | 2016071844 | 5/2016 |
| WO | WO-2018006671 A1 * | 1/2018 |

OTHER PUBLICATIONS

"First Demonstration of SDN-based Bit Index Explicit Replication (BIER) Multicasting"; Giorgetti et al.; IEEE 2017. (Year: 2017).*

(Continued)

*Primary Examiner* — Benjamin H Elliott, IV

(57) ABSTRACT

A hierarchical domain includes egress routers, an ingress router, set gateway routers, and subdomain gateway routers. The ingress router receives a multicast packet in a flow associated with the egress routers. The ingress router is in a first set of egress routers in a first subdomain of the hierarchical domain. The set gateway routers provide gateways to second sets of the plurality of egress routers in the first subdomain. The subdomain gateway routers provide gateways to second subdomains that includes sets of the plurality of egress routers. The ingress router generates a first copy of the multicast packet for transmission to the first set of egress routers based on a first bitstring, a second copy of the multicast packet for transmission to the set gateway routers based on a second bitstring, and a third copy of the multicast packet to the subdomain gateway routers based on a third bitstring.

24 Claims, 31 Drawing Sheets

(56) References Cited

U.S. PATENT DOCUMENTS

| | | | |
|---|---|---|---|
| 2016/0127139 A1* | 5/2016 | Tian | H04L 45/16 370/390 |
| 2017/0033939 A1 | 2/2017 | Bragg et al. | |
| 2017/0111260 A1* | 4/2017 | Wu | H04L 45/021 |
| 2018/0077060 A1* | 3/2018 | Nagarajan | H04L 45/026 |
| 2018/0205636 A1* | 7/2018 | Hu | H04L 45/16 |
| 2018/0278521 A1 | 9/2018 | Pfister et al. | |
| 2019/0014034 A1* | 1/2019 | Allan | H04L 45/16 |
| 2019/0075041 A1* | 3/2019 | Wang | H04L 41/0806 |
| 2019/0116114 A1* | 4/2019 | Chen | H04L 45/24 |
| 2019/0123922 A1 | 4/2019 | Suthar et al. | |
| 2019/0230503 A1* | 7/2019 | Circosta | H04L 61/1511 |

OTHER PUBLICATIONS

U.S. Appl. No. 15/927,760, filed Mar. 21, 2018, listing Pranja Dutta et al. as inventors, entitled "Hierarchical Bit Indexed Replication of Multicast Packets".

U.S. Appl. No. 15/927,781, filed Mar. 21, 2018, listing Pranja Dutta et al. as inventors, entitled "Hierarchical Bit Indexed Replication of Multicast Packets".

Chen et al, "BGP Link-State extensions for BEIR", Internet Engineering Task Force (IETF) Internet-Drafts, Networking Working Group, Jul. 30, 2017, 8 pages.

Ginsberg et al, "BIER support via ISIS", Internet Engineering Task Force (IETF) Internet-Drafts, Internet Engineering Task Force, Oct. 22, 2017, 11 pages.

Kumar et al, "BIER Use Cases", Internet Engineering Task Force (IETF) Internet-Drafts, Network Working Group, Jul. 17, 2017, 17 pages.

Wijnands et al, "Encapsulation for Bit Index Explicit Replicaiton in MPLS and non-MPLS Networks", Internet Engineering Task Force (IETF) Internet-Drafts, Internet Engineering Task Force, Oct. 27, 2017, 22 pages.

Aggarwal et al, "Extensions to Resource Reservation Protocol—Traffic Engineering (RSVP-TE) for Point-to-Multipoint TE Label Switched Paths (LSPs)", Internet Engineering Task Force (IETF) Memo, Network Working Group, May 2007, 53 pages.

Cain et al, "Internet Group Management Protocol, Version 3", Internet Engineering Task Force (IETF) Memo, Network Working Group, Oct. 2002, 53 pages.

Rosen et al, "Multicast VPN Using BIER", Internet Engineering Task Force (IETF) Internet-Drafts, Nov. 13, 2017, 17 pages.

Wijnands et al, "Multipoint LDP In-Band Signaling for Point-to-Multipoint and Multipoint-to-Multipoint Label Switched Paths", Internet Engineering Task Force (IETF) Internet Standards Track Memo, Jan. 2013, 12 pages.

Wijnands et al, "Multicast Using Bit Index Explicit Replication (BIER)" Internet Engineering Task Force (IETF) Internet Standards Track Memo, Nov. 2017, 43 pages.

Psenak et al, "OSPF Extensions for BIER", Internet Engineering Task Force (IETF) Internet-Drafts, Dec. 4, 2017, 9 pages.

Fenner et al, "Protocol Independent Multicast—Sparse Mode (PIM-SM): Protocol Specification (Revised)", Internet Engineering Task Force (IETF) Memo, Mar. 2016, 137 pages.

International Search Report and Written Opinion dated Jun. 11, 2019 for PCT/FI2019/050158, 15 pages.

Non-Final Office Action dated Mar. 24, 2019 for U.S. Appl. No. 15/927,781, 28 pages.

Non-Final Office Action dated Jul. 3, 2019 for U.S. Appl. No. 15/927,760, 34 pages.

International Search Report and Written Opinion dated Jun. 11, 2019 for PCT/FI2019/050159, 13 pages.

Notice of Allowance date Oct. 15, 2019 for U.S. Appl. No. 15/927,760, 25 pages.

Notice of Allowance dated Oct. 23, 2019 for U.S. Appl. No. 15/927,781, 130 pages.

Notice of Allowance dated Oct. 15, 2019 for U.S. Appl. No. 15/927,760, 25 pages.

Eckert, T. et al., "Traffic Engineering for Bit Index Explicit Replicaiton BIER-TE; draft-eckert-bier-te-arch-01". Internet-Draft, Jul. 5, 2015, 23 pages.

* cited by examiner

300

| BITSTRING | DEST PREFIX | NEXT HOP |
|---|---|---|
| 0000000001 | 220 | 220 |
| 0100000000 | 222 | 222 |
| 0001000000 | 223 | 222 |
| 0000000100 | 224 | 222 |

301

| BITSTRING | DEST PREFIX | NEXT HOP |
|---|---|---|
| 0000000001 | 225 | 228 |
| 0000001000 | 226 | 228 |
| 0000100000 | 227 | 228 |

302

| BITSTRING | DEST PREFIX | NEXT HOP |
|---|---|---|
| 0000000010 | 228 | 228 |
| 0010000000 | 229 | 228 |
| 0000001000 | 230 | 228 |
| 0000100000 | 231 | 228 |

FIG. 3

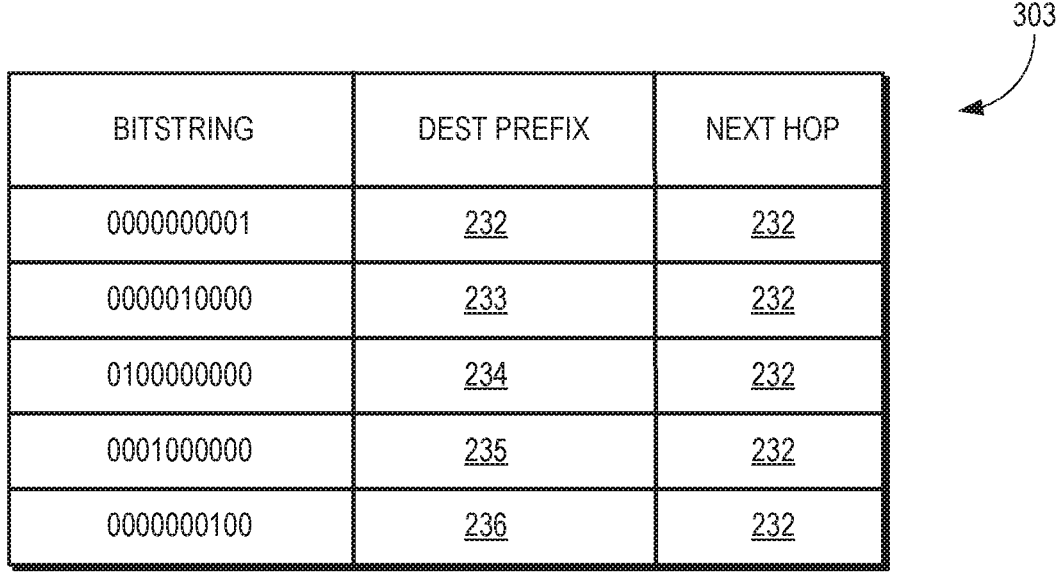
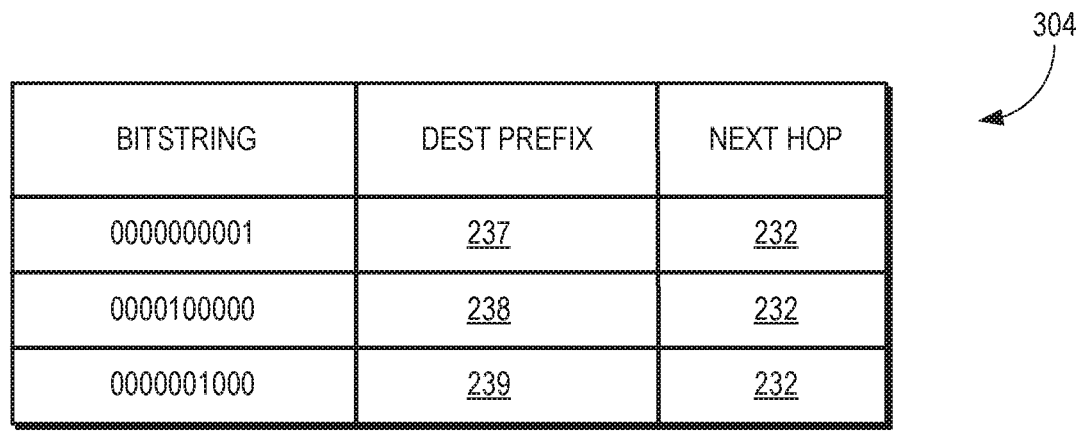
FIG. 4

| BITSTRING | FORWARDING MASK | NEXT HOP |
|---|---|---|
| 0000000001 | 0000000001 | 220 |
| 0000000100 | 0101000100 | 222 |
| 0001000000 | 0101000100 | 222 |
| 0100000000 | 0101000100 | 222 |
FIG. 5
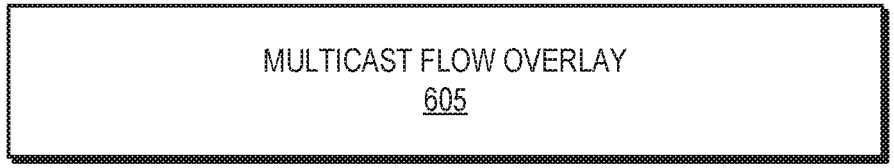
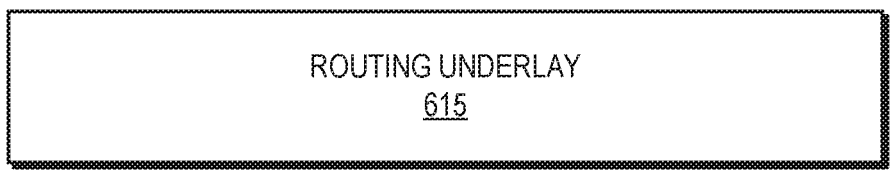
FIG. 6

| SUBDOMAIN BITSTRING | FORWARDING MASK | NEXT HOP |
|---|---|---|
| 0000000001 | 0101000001 | Ra |
| 0000000100 | 0000000100 | Rc |
| 0001000000 | 0101000001 | Ra |
| 0100000000 | 0101000001 | Ra |

FIG. 25

| SET BITSTRING | FORWARDING MASK | NEXT HOP |
|---|---|---|
| 0000000001 | 0101000001 | Ra |
| 0000000100 | 0000000100 | Rc |
| 0001000000 | 0101000001 | Ra |
| 0100000000 | 0101000001 | Rc |

FIG. 26

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                BIFT-id                | TC |S|       TTL      |
+-+-+-+-+-+-+-+-+-+-+-+-+-+-+-+-+-+-+-+-+-+-+-+-+-+-+-+-+-+-+-+-+
|Nibble | Ver | BSL |              Entropy                      |
+-+-+-+-+-+-+-+-+-+-+-+-+-+-+-+-+-+-+-+-+-+-+-+-+-+-+-+-+-+-+-+-+
|OAM|Rsv|  DSCP   |   Proto   |           BFIR-id               |
+-+-+-+-+-+-+-+-+-+-+-+-+-+-+-+-+-+-+-+-+-+-+-+-+-+-+-+-+-+-+-+-+
|                  BitString (first 32 bits)                   ~
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
~                   BitString (last 32 bits)                    |
+-+-+-+-+-+-+-+-+-+-+-+-+-+-+-+-+-+-+-+-+-+-+-+-+-+-+-+-+-+-+-+-+
```

FIG. 29

```
+-+-+-+-+-+-+-+-+-+-+-+-+-+-+-+-+-+-+-+-+-+-+-+-+-+-+-+-+-+-+-+-+
//   Ethernet Header with Ethertype = MPLS (0x8847 or 0x8848)  //
+-+-+-+-+-+-+-+-+-+-+-+-+-+-+-+-+-+-+-+-+-+-+-+-+-+-+-+-+-+-+-+-+
|                 Label 1               | EXP |S|      TTL      |
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
|                 Label N-1             | EXP |S|      TTL      |
+-+-+-+-+-+-+-+-+-+-+-+-+-+-+-+-+-+-+-+-+-+-+-+-+-+-+-+-+-+-+-+-+
|             Label N (BIFT-id)         | TC  |S|      TTL      |
+-+-+-+-+-+-+-+-+-+-+-+-+-+-+-+-+-+-+-+-+-+-+-+-+-+-+-+-+-+-+-+-+
|Nibble | Ver | BSL |              Entropy                      |
+-+-+-+-+-+-+-+-+-+-+-+-+-+-+-+-+-+-+-+-+-+-+-+-+-+-+-+-+-+-+-+-+
|OAM|Rsv|  DSCP   |   Proto   |           BFIR-id               |
+-+-+-+-+-+-+-+-+-+-+-+-+-+-+-+-+-+-+-+-+-+-+-+-+-+-+-+-+-+-+-+-+
|                  BitString (first 32 bits)                   ~
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
~                   BitString (last 32 bits)                    |
+-+-+-+-+-+-+-+-+-+-+-+-+-+-+-+-+-+-+-+-+-+-+-+-+-+-+-+-+-+-+-+-+
```

FIG. 30

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              BIFT-id              | TC  |S|       TTL         |
+-+-+-+-+-+-+-+-+-+-+-+-+-+-+-+-+-+-+-+-+-+-+-+-+-+-+-+-+-+-+-+-+
|Nibble |  Ver  |  BSL  |                Entropy                |
+-+-+-+-+-+-+-+-+-+-+-+-+-+-+-+-+-+-+-+-+-+-+-+-+-+-+-+-+-+-+-+-+
|OAM|Rsv|   DSCP    |    Proto      |           BFIR-id         |
+-+-+-+-+-+-+-+-+-+-+-+-+-+-+-+-+-+-+-+-+-+-+-+-+-+-+-+-+-+-+-+-+
|                                                               |
~                          Variable                             ~
+                                                               +
~                                                               |
+-+-+-+-+-+-+-+-+-+-+-+-+-+-+-+-+-+-+-+-+-+-+-+-+-+-+-+-+-+-+-+-+
```

FIG. 31

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              BIFT-id              | TC  |S|       TTL         |
+-+-+-+-+-+-+-+-+-+-+-+-+-+-+-+-+-+-+-+-+-+-+-+-+-+-+-+-+-+-+-+-+
|Nibble |0 0 0 1|  BSL  |                Entropy                |
+-+-+-+-+-+-+-+-+-+-+-+-+-+-+-+-+-+-+-+-+-+-+-+-+-+-+-+-+-+-+-+-+
|OAM|Rsv|   DSCP    |    Proto      |           BFIR-id         |
+-+-+-+-+-+-+-+-+-+-+-+-+-+-+-+-+-+-+-+-+-+-+-+-+-+-+-+-+-+-+-+-+
|                  BitString (first 32 bits)                    ~
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
~                   BitString (last 32 bits)                    |
+-+-+-+-+-+-+-+-+-+-+-+-+-+-+-+-+-+-+-+-+-+-+-+-+-+-+-+-+-+-+-+-+
```

FIG. 32

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              BIFT-id          | TC  |S|      TTL             |
+-+-+-+-+-+-+-+-+-+-+-+-+-+-+-+-+-+-+-+-+-+-+-+-+-+-+-+-+-+-+-+-+
|Nibble |0 0 0 2|   BSL  |            Entropy                  |
+-+-+-+-+-+-+-+-+-+-+-+-+-+-+-+-+-+-+-+-+-+-+-+-+-+-+-+-+-+-+-+-+
|OAM|Rsv|   DSCP   |   Proto    |          BFIR-id             |
+-+-+-+-+-+-+-+-+-+-+-+-+-+-+-+-+-+-+-+-+-+-+-+-+-+-+-+-+-+-+-+-+
|              SET-BitString[1]   (first 32 bits)              ~
+-+-+-+-+-+-+-+-+-+-+-+-+-+-+-+-+-+-+-+-+-+-+-+-+-+-+-+-+-+-+-+-+
~                                                              ~
+-+-+-+-+-+-+-+-+-+-+-+-+-+-+-+-+-+-+-+-+-+-+-+-+-+-+-+-+-+-+-+-+
~              SET-BitString[8]   (last 32 bits)               |
+-+-+-+-+-+-+-+-+-+-+-+-+-+-+-+-+-+-+-+-+-+-+-+-+-+-+-+-+-+-+-+-+
|                       BitString-id                           |
+-+-+-+-+-+-+-+-+-+-+-+-+-+-+-+-+-+-+-+-+-+-+-+-+-+-+-+-+-+-+-+-+
```

FIG. 33

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              BIFT-id          | TC  |S|      TTL             |
+-+-+-+-+-+-+-+-+-+-+-+-+-+-+-+-+-+-+-+-+-+-+-+-+-+-+-+-+-+-+-+-+
|Nibble |0 0 0 3|   BSL  |            Entropy                  |
+-+-+-+-+-+-+-+-+-+-+-+-+-+-+-+-+-+-+-+-+-+-+-+-+-+-+-+-+-+-+-+-+
|OAM|Rsv|   DSCP   |   Proto    |          BFIR-id             |
+-+-+-+-+-+-+-+-+-+-+-+-+-+-+-+-+-+-+-+-+-+-+-+-+-+-+-+-+-+-+-+-+
|           SUBDOMAIN-BitString[1]  (first 32 bits)            ~
+-+-+-+-+-+-+-+-+-+-+-+-+-+-+-+-+-+-+-+-+-+-+-+-+-+-+-+-+-+-+-+-+
~                                                              ~
+-+-+-+-+-+-+-+-+-+-+-+-+-+-+-+-+-+-+-+-+-+-+-+-+-+-+-+-+-+-+-+-+
~           SUBDOMAIN-BitString[8]  (last 32 bits)             |
+-+-+-+-+-+-+-+-+-+-+-+-+-+-+-+-+-+-+-+-+-+-+-+-+-+-+-+-+-+-+-+-+
|                       BitString-id                           |
+-+-+-+-+-+-+-+-+-+-+-+-+-+-+-+-+-+-+-+-+-+-+-+-+-+-+-+-+-+-+-+-+
```

FIG. 34

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|     Type      |    Length     |
+-+-+-+-+-+-+-+-+-+-+-+-+-+-+-+-+
|   SD-BFR-id   |
+-+-+-+-+-+-+-+-+
```

FIG. 37

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|     Type      |    Length     |
+-+-+-+-+-+-+-+-+-+-+-+-+-+-+-+-+
|   SI-BFR-id   |
+-+-+-+-+-+-+-+-+
```

FIG. 38

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|     Type      |    Length     |
+-+-+-+-+-+-+-+-+-+-+-+-+-+-+-+-+-+-+-+-+-+-+-+-+-+-+-+-+-+-+-+-+
|         Reserved              |            Label              |
+-+-+-+-+-+-+-+-+-+-+-+-+-+-+-+-+-+-+-+-+-+-+-+-+-+-+-+-+-+-+-+-+
```

FIG. 39

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|       Reserved       |                 Label                  |
+-+-+-+-+-+-+-+-+-+-+-+-+-+-+-+-+-+-+-+-+-+-+-+-+-+-+-+-+-+-+-+-+
```

FIG. 43

```
          ( )              ( )              ( )
       (     )          (     )          (     )
   R1   Area 1     R2    Area 0    R3    Area 2    R4
       (     )          (     )          (     )
          ( )              ( )              ( )
```

FIG. 44

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |
+-+-+-+-+-+-+-+-+-+-+-+-+-+-+-+-+-+-+-+-+-+-+-+-+-+-+-+-+-+-+-+-+
|   reserved    | subdomain-id  |     MT-ID     |     BSL       |
+-+-+-+-+-+-+-+-+-+-+-+-+-+-+-+-+-+-+-+-+-+-+-+-+-+-+-+-+-+-+-+-+
|         BFR-id                |          reserved             |
+-+-+-+-+-+-+-+-+-+-+-+-+-+-+-+-+-+-+-+-+-+-+-+-+-+-+-+-+-+-+-+-+
|         Sub-TLVs (variable)                  |
+-                                             -+
|                                              |
```

FIG. 45

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type        |       Length        |
+-+-+-+-+-+-+-+-+-+-+-+-+-+-+-+-+-+-+-+-+-+-+-+-+-+-+-+-+-+-+-+-+
| SD-BFR-id |
+-+-+-+-+-+-+-+-+
```

FIG. 46

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type        |       Length        |
+-+-+-+-+-+-+-+-+-+-+-+-+-+-+-+-+-+-+-+-+-+-+-+-+-+-+-+-+-+-+-+-+
| SI-BFR-id |
+-+-+-+-+-+-+-+-+
```

FIG. 47

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type        |       Length        |
+-+-+-+-+-+-+-+-+-+-+-+-+-+-+-+-+-+-+-+-+-+-+-+-+-+-+-+-+-+-+-+-+
|    Reserved     |        Label         |
+-+-+-+-+-+-+-+-+-+-+-+-+-+-+-+-+-+-+-+-+-+-+-+-+-+-+-+-+-+-+-+-+
```

FIG. 48

HIERARCHICAL BIT INDEXED REPLICATION OF MULTICAST PACKETS

CROSS REFERENCE TO RELATED APPLICATIONS

This application is related to U.S. patent application Ser. No. 15/927,760, entitled "HIERARCHICAL BIT INDEXED REPLICATION OF MULTICAST PACKETS" and U.S. patent application Ser. No. 15/927,781, entitled "HIERARCHICAL BIT INDEXED REPLICATION OF MULTICAST PACKETS" filed on even date herewith, the entirety of which is incorporated by reference herein.

BACKGROUND

Multicasting is used to transmit a single packet to multiple recipients in a wired or wireless communication network. The Internet Protocol (IP) is used for IP multicasting to a reserved block of multicast addresses, or group addresses, which are defined for IPv4 and IPv6. A single source is therefore able to transmit a single packet including an IPv4 or IPv6 header with a multicast address and the packet will be received by all the members of the multicast group associated with the multicast address. In stateful multicasting, multicast packets are routed through a multicast distribution tree (MDT) that includes an ingress router that receives the multicast packet from a source, one or more transit routers, and one or more egress routers that provides copies of the multicast packet to local area networks or radio access networks for transmission to the members of the multicast group. The egress routers are referred to as leaf nodes and the ingress router is referred to as a root node of the MDT. The routers in the MDT are required to maintain control plane and data plane state information that defines routes taken by the multicast packets between the ingress router and the egress routers. Each router therefore maintains state information for each multicast flow that traverses the router.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIGS. 3 and 4 illustrate routing tables that are implemented in a control plane entity of the router shown in FIG. 2.

FIG. 5 illustrates a forwarding table that is implemented in a data plane entity of the router shown in FIG. 2.

FIG. 6 is a block diagram of layers in a BIER architecture.

FIG. 25 is a subdomain gateway forwarding table according to some embodiments.

FIG. 26 is a set gateway forwarding table according to some embodiments.

FIG. 29 is an example encoding of a header according to some embodiments.

FIG. 30 is another example encoding of the header at the bottom of a MPLS label stack according to some embodiments.

FIG. 31 is a generic data plane header for H-BIER packets according to some embodiments.

FIG. 32 is an example of a local type packet header according to some embodiments.

FIG. 33 is an example of a set type packet header according to some embodiments.

FIG. 34 is an example of a subdomain type packet header according to some embodiments.

FIG. 37 illustrates a format of SD-BFR Info Sub-Sub-TLV according to some embodiments.

FIG. 38 illustrates a format of SI-BFR Info Sub-Sub-TLV according to some embodiments.

FIG. 39 illustrates a format of a Sub-Sub-TLV according to some embodiments.

FIG. 43 illustrates a format of a Sub-TLV according to some embodiments.

FIG. 44 illustrates the flooding scope according to some embodiments.

FIG. 45 illustrates a format of H-BIER TLV according to some embodiments.

FIG. 46 illustrates a format of SD-BFR Sub-TLV according to some embodiments.

FIG. 47 illustrates a format of SI-BFR Sub-TLV according to some embodiments.

FIG. 48 illustrates a format of a Sub-TLV according to some embodiments.

DETAILED DESCRIPTION

Figure 1:
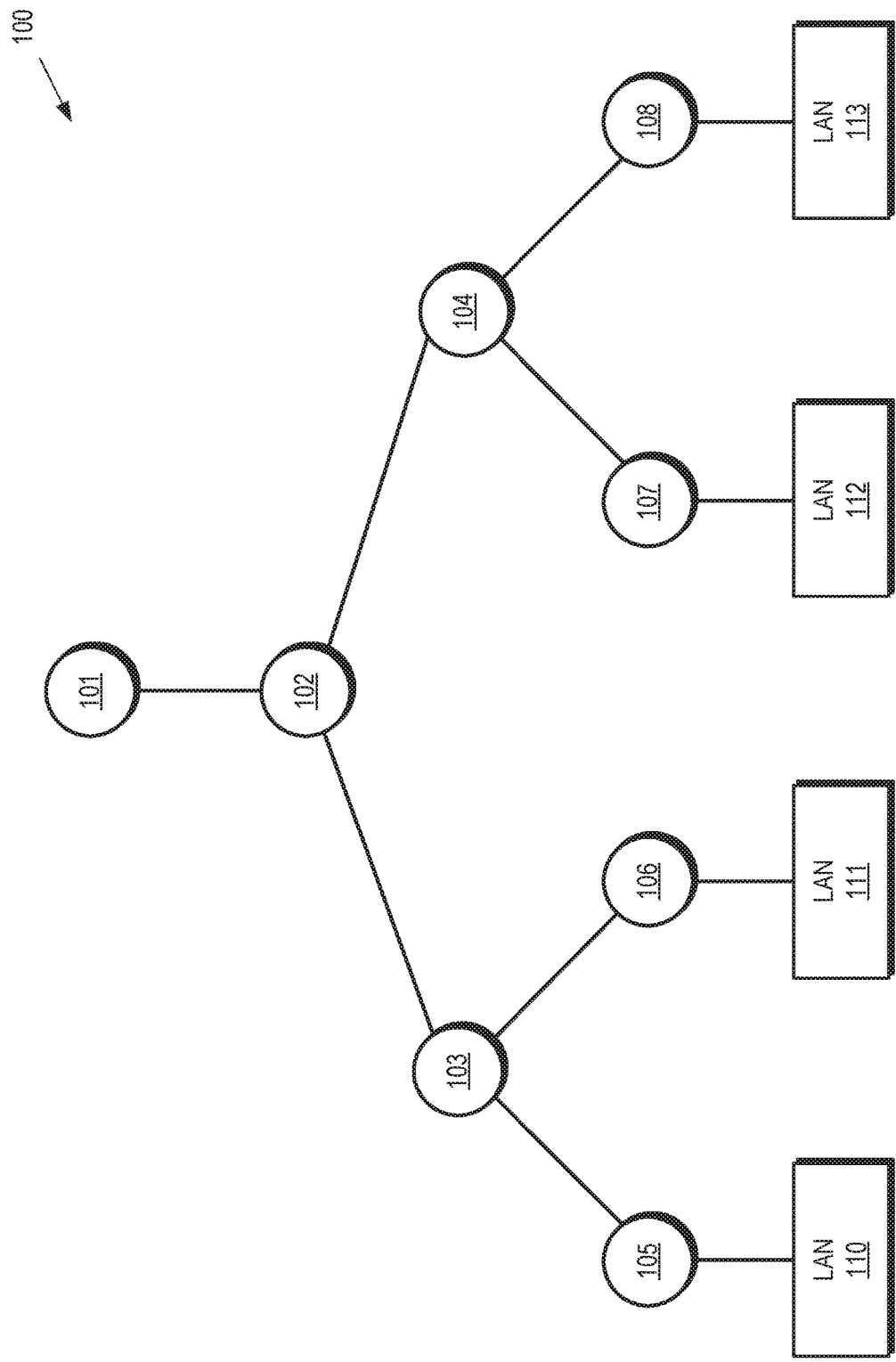
FIG. 1 is a block diagram of a communication system that is configured to perform multicasting of packets.

Stateless forwarding of multicast data packets does not require a control protocol to define an MDT for a multicast flow nor does it require transit routers to maintain per-flow state information. One type of stateless architecture, which is referred to herein as bit index explicit replication (BIER), is implemented by encapsulating multicast packets in a BIER header that includes information identifying the egress routers. An ingress router receives the multicast packets for the BIER domain and encapsulates the multicast packets with the identifying information. The BIER domain partitions the routers into subdomains that include a predetermined number of router sets per subdomain. Each router set includes a predetermined number of routers. For example, a subdomain in a BIER domain can include up to 65,535 routers that are subdivided into 256 router sets, with each set including up to 256 routers. The routers in a set are uniquely identified by a bitstring in which each bit represents one router within the set. For example, if each set in a subdomain of a BIER domain includes up to 256 routers, the bitstring includes 256 bits. The egress routers for a multicast packet are identified by including a subdomain identifier, a router set identifier, and a bitstring in a header that is appended to the multicast packet.

The ingress router is required to replicate the multicast packet for each combination of a subdomain identifier and a router set identifier because the bitstring does not uniquely identify routers in different subdomains or sets. The number of packet replications therefore increases linearly with the number of subdomain/set combinations. Ingress packet replication results in wasted bandwidth and computational burden on the ingress router. For example, if 40,000 receivers are receiving a multicast flow, the BIER domain includes 40,000 egress routers. All of the egress routers can be provisioned within a single subdomain and 157 router sets. If the multicast flow consumes 25 megabits per second (Mbps), then ingress replication at the ingress router multiplies the volume of the flow to 25×157 Mbps=4 Gbps.

Although the routers in a stateless architecture do not maintain per-flow state information, the routers are in some cases required to maintain routing and forwarding tables. For example, the "triple" used to identify a router in a BIER architecture, which is represented by the subdomain identifier, the router set identifier, and the bitstring, is not a routable address. A control plane entity associated with each router therefore maintains routing tables to indicate how to route multicast packets to the egress routers in the BIER domain. Each router is assigned a routable loopback IP address, which is referred to herein as a router prefix or a prefix. The control plane entity maintains a set of routing tables that are referred to as bit index routing tables (BIRTs). Each BIRT provides routing information for the routers within a corresponding set of each subdomain that includes an egress router for the multicast flow. The routing information includes bitstrings for destination routers within the set, router prefixes for the routers within the set, and router prefixes for next hop routers along a path from the router to the destination router. Consequently, the number of entries in the BIRTs grows linearly with the number of routers in the BIER domain. Whenever the network topology changes, a shortest path first (SPF) algorithm is run on all of the router prefixes and the impacted routing tables are updated. Thus, the control plane convergence time (the SPF running time plus the time required to update the routing tables) increases with the number of routers in the BIER domain.

The data plane in the stateless architecture maintains forwarding tables that are referred to herein as bit index forwarding tables (BIFTs). The BIFTs for a router are derived from the corresponding BIRTs maintained in the control plane. Each router stores one BIFT for each combination of a subdomain and a set. The entries in a BIFT are indexed or ordered using the bitstrings of the destination routers associated with the entries and each entry identifies the routing prefix of a next hop router that receives packets for the destination router indicated by the bitstring. More than one entry in a BIFT can include the same next hop. A bitwise OR of the bitstrings of these entries is used to generate a forwarding bit mask that has bit values to indicate all of the routers that share the same next hop. The forwarding bit masks are also stored in the entries of the BIFT. The number of entries in the BIFTs therefore grows linearly with the number of routers in the BIER domain. A large number of entries in the BIFTs are typically impacted in response to a change in the network topology. Thus, a control plane takes longer to reprogram the data plane, which increases the convergence time for data traffic with the number of routers. For example, if 40,000 receivers are receiving a multicast flow, the BIER domain includes 40,000 egress routers. All of the egress routers can be provisioned within a single subdomain and 157 router sets. This will consume 40,000 entries in all BIRT and BIFT tables respectively.

FIGS. 1-48 disclose techniques for limiting a number of packet replications at a bit index explicit replication (BIER) ingress router to less than a predetermined number (such as three) by implementing a hierarchical BIER architecture. In response to receiving a multicast packet from outside of the BIER domain, the ingress router segregates destination egress routers for the multicast packet into groups based on locations of the egress routers. The ingress router multicasts a copy of the multicast packet to one subset of the egress routers in a local group associated with the ingress router based on a bitstring that encodes identifiers of the egress routers in the local group. The ingress router also multicasts one or more additional copies of the multicast packet to transit routers (which are referred to herein as gateway routers) based on one or more other bitstrings that encodes identifiers of the transit routers. The transit routers then multicast copies of the multicast packet to other transit or egress routers based on corresponding bitstrings that encode identifiers of subsets of the transit or egress routers.

In some embodiments, the BIER domain partitions the routers into subdomains that include a predetermined number of router sets per subdomain. The ingress router is therefore able to multicast three copies of the multicast packet to reach the egress routers, which are segregated into three groups. A first group includes egress routers that share a subdomain and a router set with the ingress router. The egress routers in the first group receive a first copy of the multicast packet directly from the ingress router based on a first bitstring that identifies the egress routers in the first group. A second group includes egress routers that share the subdomain with the ingress router but do not share a router set with the ingress router. The egress routers in the second group receive a second copy of the multicast packet via one or more gateway routers to the one or more router sets that include the egress routers. The gateway routers are identified by a second bitstring included in the second copy of the multicast packet. The one or more gateway routers multicast the multicast packet to the egress routers in the second group based on bitstrings that identify the egress routers. A third group includes egress routers that do not share a subdomain or a router set with the ingress router. The ingress router multicasts a third copy of the multicast packet to gateway routers for the subdomains that include the egress routers based on bitstrings that identify the gateway routers. Each gateway router for subdomain multicasts a copy of the multicast packet to gateway routers for router sets that include egress routers in the subdomain based on bitstrings that encode identifiers of the gateway routers. The gateway routers for these router sets can then multicast a copy of the multicast packet to the egress routers in the corresponding router set based on a bitstring that encodes identifiers of the egress routers.

A control plane entity at each router in the BIER domain includes a routing table that identifies next-hop routers along paths to gateway or egress routers for a multicast packet. The routing tables also identify the gateway or egress router. In embodiments that partition the routers into subdomains that include a predetermined number of router sets per subdomain, each router is configured to include first, second, and third types of routing table to route multicast packets to gateway routers for the subdomains, gateway routers for the router sets in the subdomain that includes the router, and local routers in the subdomain and router set that includes the router, respectively. The first type of routing table includes entries that map bitstrings for the gateway routers for the subdomains to routable addresses of the gateway routers and routable addresses of next-hop routers on paths to the gateway routers. The second type of routing table includes entries that map bitstrings for the gateway routers for the router sets to routable addresses of the gateway routers and routable addresses of next-hop routers on paths to the gateway routers. The third type of routing table includes entries that map bitstrings for the local routers to routable addresses of the local routers and routable addresses of next-hop routers on paths to the local routers. Some embodiments of the control plane determine the routes between routers in the BIER domain using a shortest path first (SPF) algorithm. The control plane routing tables are used to configure data plane forwarding tables in data planes of the routers. The control plane in a router maintains one routing table of the first type to map to the gateway routers for the subdomains, one routing table of the second type to map to the gateway routers for the router sets in the subdomain of the router, and one routing table of the third type to map to its local routers. Thus, the number of routing tables does not increase linearly with the number of routers in the BIER domain.

A data plane entity in each router in the BIER domain includes a forwarding table that is used to forward multicast packets to next-hop routers on paths to destination routers that include gateway or egress routers. The forwarding tables also include forwarding bit masks that identify one or more destination routers that share the same next-hop router. In embodiments that partition the routers into subdomains that include a predetermined number of router sets per subdomain, each router is configured to include first, second, and third types of forwarding table that are used to forward multicast packets to gateway routers for the subdomains, gateway routers for the router sets in the subdomain that includes the router, and local routers in the subdomain and router set that includes the router, respectively. Entries in the first type of forwarding table map bitstrings of the gateway routers for the subdomains to next-hop routers along paths to the gateway routers. The entries in the first type of forwarding table also include forwarding bit masks that identify the gateway routers that share the same next-hop. Entries in the second type of forwarding table map bitstrings of the gateway routers for the router sets to next-hop routers along paths to the gateway routers. The entries in the second type of forwarding table also include forwarding bit masks that identify the gateway routers that share the same next-hop. Entries in the third type of forwarding table map bitstrings of the local routers to next-hop routers along paths to the local routers. The entries in the third type of forwarding table also include forwarding bit masks that identify the local routers that share the same next-hop. The data planes in the routers use the forwarding tables to forward multicast packets. For example, a data plane in a router maintains one forwarding table of the first type to forward multicast packets to the gateway routers for the subdomains, one forwarding table of the second type to forward multicast packets to the gateway routers for the router sets in the subdomain of the router, and one forwarding table of the third type to forward multicast packets to the local routers associate with the router. Thus, the number of forwarding tables does not increase linearly with the number of routers in the BIER domain. For example, if 40,000 receivers are receiving a multicast flow, the BIER domain includes 40,000 egress routers. All of the egress routers can be provisioned within a single subdomain and 157 router sets. This will consume zero entries in the first types of routing and forwarding tables, 157 entries in the second types of routing and forwarding table and 256 entries in the third types of routing and forwarding tables, which makes a total of 413 entries in all three types of routing/forwarding tables.

FIG. 1 is a block diagram of a communication system 100 that is configured to perform multicasting of packets. The communication system 100 includes routers 101, 102, 103, 104, 105, 106, 107, 108, which are collectively referred to herein as "the routers 101-108." The routers 101-108 are able to receive multicast packets and forward the multicast packets towards one or more local access networks (LAN) 110, 111, 112, 113, which are collectively referred to herein as "the LAN 110-113."

Some embodiments of the communication system 100 implement stateful multicasting of packets. As used herein, the term "stateful" refers to a technique of multicasting that requires that specific states for each multicast flow are defined in both the control plane and data plane entities in the routers 101-108. State information stored in control plane and data plane entities of the routers 101-108 is used to define a multicast distribution tree (MDT) for each multicast flow. The routers 101-108 in the MDT are configured to distribute multicast packets in a corresponding multicast flow from an ingress router 101 to one or more of the egress routers 105-108. For example, if egress routers 105, 106 receive requests for packets associated with a multicast flow from the corresponding LANs 110, 111, the egress routers 105, 106 initiate a join procedure by transmitting messages towards the transit router 103. In response to receiving the join messages, the transit router 103 installs state information in both the control plane and the data plane that indicates that the egress routers 105, 106 are downstream routers for the multicast flow. The transit router 103 also sends a join message to the transit router 102, which installs corresponding state information in the control plane and data plane. The transit router 102 also sends a join message to the ingress router 101. Multicast packets transmitted by the ingress router 101 are then distributed to the LANs 110, 111 via the transit routers 102, 103 and the egress routers 105, 106 according to the state information stored in the corresponding routers 101, 102, 103, 105, 106.

Some embodiments of the communication system 100 implement stateless multicasting. As used herein, the term "stateless" refers to a paradigm for forwarding multicast packets that does not require a control protocol for explicitly building an MDT for each multicast flow. Furthermore, routers 101-108 in a stateless architecture are not required to maintain any per-flow state, e.g., routers do not include separate state information for each multicast flow and any state information that is stored in a router in a stateless architecture is used to route multicast packets for multiple multicast flows that are not necessarily directed to the same set of egress routers.

In the illustrated embodiment, the communication system 100 implements stateless multicasting using a bit index explicit replication (BIER) architecture. The ingress router 101 to a BIER domain determines a set of egress routers (such as the egress routers 105, 106) that are to receive multicast packets. The ingress router 101 encapsulates the multicast packet in a header that includes a bitstring in which each bit represents precisely one egress router in the BIER domain. For example, a bitstring for headers of multicast packets directed to the egress routers 105, 106 could be constructed as 1100, where the first two bits are set to a value (1) to indicate that the egress routers 105, 106 are to receive the multicast packet and the second two bits are set to a value (0) to indicate that the egress routers 107, 108 are not receiving the multicast packet. The multicast packet is forwarded from the ingress router 101, to the transit router 102, and to the transit router 103, which then makes two copies of the multicast packet and forwards the copies to the egress routers 105, 106.

Figure 2:
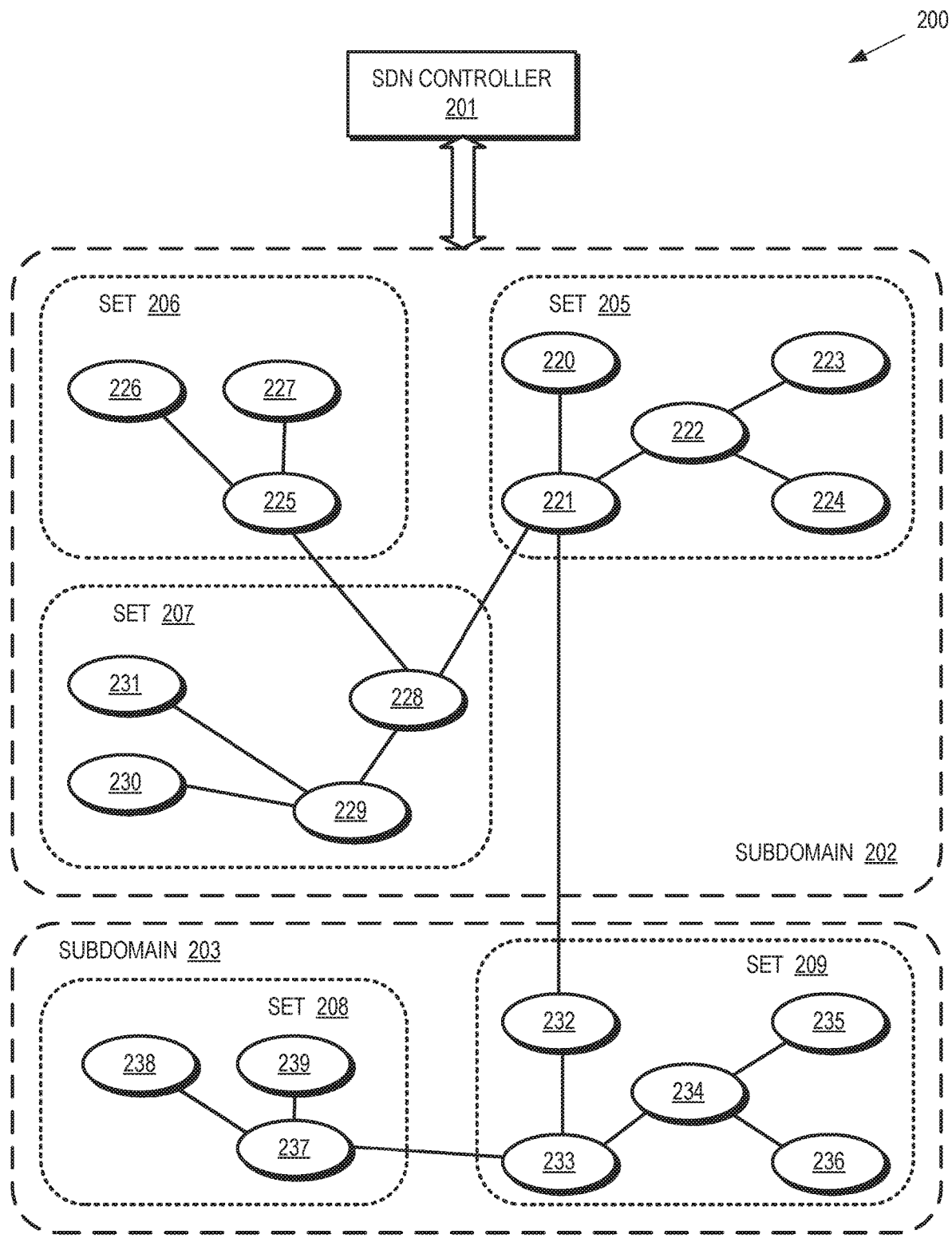
FIG. 2 is a block diagram of a communication system that implements stateless multicasting using a bit index explicit replication (BIER) architecture.

FIG. 2 is a block diagram of a communication system 200 that implements stateless multicasting using a BIER architecture. The communication system 200 includes a software defined networking (SDN) controller 201 that provides control functionality to the communication system 200. Routers within a BIER domain of the communication system 200 are partitioned into subdomains 202, 203. Subdomains 202, 203 are identified by a subdomain identifier having a predetermined range, such as [0 . . . 255]. The subdomains 202, 203 are respectively partitioned into sets of routers including the sets 205, 206, 207 in the subdomain 202 and the sets 208, 209 in the subdomain 203. The sets 205, 206, 207, 208, 209 are collectively referred to herein as "the sets 205-209."

The BIER domain also includes routers 220, 221, 222, 223, 224, 225, 226, 227, 228, 229, 230, 231, 232, 233, 234, 235, 236, 237, 238, 239, which are collectively referred to herein as "the routers 220-239." In the illustrated embodiment, the subdomain 202 includes the routers 220-231 and the subdomain 203 includes the routers 232-239. The set 205 includes the routers 220-224 and the set 209 includes the routers 232-235. The other routers are similarly included in the other sets. The number of routers 220-239 in each subdomain 202, 203 is limited to a predetermined maximum number, such as 65535 routers, and each router is assigned an identifier within a corresponding range, such as [1, 65535], which uniquely identifies the router within its subdomain. In some embodiments, the router identifiers are allocated densely from the available numbering space to produce more efficient encoding into bitstrings. For example, if there are less than 256 routers, then all of the router identifiers are assigned from the range [1, 256].

The sets 205-209 are uniquely identified within the BIER domain by corresponding set identifiers. In some embodiments, the set identifiers are part of the router identifier. For example, if a value of a router identifier is N, then a corresponding set identifier is the integer part of the quotient (N−1)/BSL, where the parameter "BitStringLength" (BSL) depends on the maximum number of routers allowed in a set, which determines length of the BitString. For example, if the maximum number of routers allowed in a set is 256 then BSL=256 bits. In order to represent the full range of 65535 router identifiers, the BIER domain requires 256 sets, e.g., 256 (=number of sets)×256 (=BSL)=65535 routers. The BitString has one bit position set to indicate the number that uniquely identifies the router within the set. If the low-order bit is denoted as "bit 1" and the high-order bit is denoted as bit "BSL", then the bit position that represents the router identifier N is ((N−1) modulo BitStringLength)+1.

In some embodiments, a BSL of 256 bits is used across the BIER domain. The router identifier of the router 230 is 2310 (within the subdomain 202). For example, the router identifier is composed of 9:6 to represent a set identifier SI=9 and a BitString in which the sixth bit is set to identify the router 230 within the subdomain 202. If there are 256 or fewer routers in one of the subdomains 202, 203, then all router identifiers can be assigned from a single set. In the hierarchical addressing scheme, an egress router for the multicast flow is uniquely identified across the BIER domain with the triple {subdomain identifier, set identifier, BitString}. If the subdomain 202 is allocated the identifier 0, the triple for the router 230 is {0, 9, 6}.

If an ingress router such as the ingress router 220 receives a packet that is to be multicast to a set of egress routers that share the same subdomain and set, the egress routers are represented using a single bitstring that is generated by combining the bitstrings for the egress routers using a bitwise OR operation. For example, if the ingress router 220 receives a packet that is to be multicast to the egress routers 234, 235, 236, the individual bitstrings can be defined as:

BitString of router 234=0100000000
BitString of router 235=0001000000
BitString of router 236=0000000100

The ingress router 220 encapsulates the multicast packet in a header that includes a combined bitstring of 0101000100 to represent the egress routers 234, 235, 236. To multicast a packet from the ingress router 220 to routers in other sets or subdomains, the ingress router 220 makes a copy of the packet for each combination of a subdomain and a set including an egress router. The ingress router 220 then builds a bitstring for the egress routers within each subdomain/set and sends the copy of the multicast packet with a header including the triple {subdomain identifier, set identifier, bitstring}. In the above example, the copy of the packet that is to be multicast to 234, 235, 236 is sent with a header including the triple {203, 209, 0101000100}. Thus, the ingress router 220 sends a copy of the packet to each unique combination of a subdomain and set. The bitstring in the copy is then used to target the egress routers within the subdomain and set, e.g., the egress routers 234, 235, 236 in the subdomain 203 and the set 209. As discussed herein, this "ingress replication" results in a number of replications that increases linearly with the number of unique combinations of subdomains and sets among all egress routers of the packet.

The triple {subdomain identifier, set identifier, bitstring} it is not a routable address. Multicast packets are therefore routed using Internet Protocol (IP) techniques as an underlay, as discussed below. Each router 220-239 is assigned a prefix, which is a routable loopback IP address of the router. A mapping of the prefixes to the corresponding triple is advertised across the BIER domain using control plane protocols such as IS-IS, OSPF, BGP-LS, and the like. Each router 220-239 receives or learns the prefix-to-triple mappings in the BIER domain via IS-IS, OSPF, BGP-LS, and the like. Thus, a router maintains an updated database of all prefix-to-triple mappings in the BIER domain. A router computes SPF on each prefix to determine its next-hop adjacencies. Procedures for advertising the mapping are known in the art and in the interest of clarity are not discussed in detail herein. The BIER control protocol at each router 220-239 maps each learned prefix into a set of one or more equal cost adjacencies using a shortest path first (SPF) algorithm to generate a topology of the BIER domain. The topology is then used to generate routing tables that include the reachability information for the routers within a subdomain and set.

FIGS. 3 and 4 illustrate routing tables 300, 301, 302, 303, 304, 304 (collectively referred to herein as "the routing tables 300-304") that are implemented in a control plane entity of the router 221 shown in FIG. 2. The rows of the routing tables 300-304 are associated with destination routers and the columns of the routing table 300-304 include bitstrings for the destination routers, prefixes of the destination routers, and routable addresses of next-hop routers along paths from the router 221 to the destination routers, as determined using the SPF algorithm. In the illustrated embodiment, routable addresses of the routers 220-239 shown in FIG. 2 (e.g., the prefixes and the routable addresses of the next-hop routers) are represented by the reference numerals of the routers. For example, the routable address of the router 220 is represented as "220" in FIGS. 3 and 4. In the interest of clarity, this convention for representing routable addresses is used in subsequent figures.

The routing table 300 includes routing information to route packets from the router 221 to routers in the same subdomain 202 and set 205 as the router 221. The routing table 301 includes routing information to route packets from the router 221 to routers in the same subdomain 202 and a different set 206. The routing table 302 includes routing information to route packets from the router 221 to routers in the same subdomain 202 and a different set 207. The routing table 303 includes routing information to route packets from the router 221 to routers in a different subdomain 203 and a different set 209. The routing table 304 includes routing information to route packets from the router 221 to routers in a different subdomain 203 and a different set 208. Thus, the total number of entries in the routing tables 300-304 stored in the router 221 is equal to the total number of routers 220-239 in the BIER domain. The same number of entries are included in the routing table stored in the other routers in the BIER domain.

FIG. 5 illustrates a forwarding table 500 that is implemented in a data plane entity of the router 221 shown in FIG. 2. The rows of the forwarding table 500 are associated with destination routers. The columns of the forwarding table 500 include bitstrings for the destination routers, forwarding bit masks, and routable addresses of next-hop routers along paths from the router 221 to the destination routers, as determined using the SPF algorithm. The forwarding table 500 is generated (or programmed) based on a corresponding routing tables such as the routing table 300 shown in FIG. 3. Although not shown in FIG. 5 in the interest of clarity, the data plane entity of the router 221 includes additional forwarding tables that are generated based on corresponding routing tables, such as the routing tables 301-304 shown in FIGS. 3 and 4. Thus, there is exactly one forwarding table for each combination of a subdomain and a set. The total number of entries in the forwarding tables stored in the router 221 is equal to the total number of routers in the BIER domain.

The forwarding bit mask is generated by taking a bitwise OR of the bitstrings for rows of the forwarding table 500 that include the same next-hop router. In the illustrated embodiment, the second, third, and fourth rows share the same next-hop router (i.e., the router 222 shown in FIG. 2). The forwarding bit mask for these rows of the forwarding table 500 is therefore equal to 0101000100, which is derived by performing a bitwise OR of the bitstrings 0000000100, 0001000000, and 0100000000 that identify the corresponding destination routers within the subdomain and set. As discussed below, the router 221 forwards multicast packets based on information stored in the forwarding table 500 including the forwarding bit mask.

FIG. 6 is a block diagram of layers in a BIER architecture 600. The layers include a multicast flow overlay 605, a BIER layer 610, and a routing underlay 615. The multicast flow overlay 605 uses the BIER layer 610 for stateless multicast of a packet for a multicast flow.

The multicast flow overlay 605 is implemented using a set of protocols and procedures that enable an ingress router to determine a set of egress routers for a multicast packet that is received from outside of the BIER domain. The multicast flow overlay 605 is then able to provide the information identifying the egress routers to other entities. The multicast flow overlay 605 also includes protocols and procedures that enable egress routers in the BIER domain, to determine how to forward a BIER-encapsulated packet to the associated application or out of the BIER domain. For example, an egress router can determine virtual routing and forwarding tables to which multicast packets from a backbone network should be sent. In some embodiments, the multicast flow overlay is implemented in a SDN controller such as the SDN controller 201 shown in FIG. 2.

The routing underlay 615 establishes adjacencies between pairs of routers within the BIER domain. The routing underlay 615 also determines one or more best or shortest paths from a given router to a given set of routers. For example, at a particular router, the routing underlay 615 maps the routable IP addresses of other routers in the BIER domain into a set of one or more equal-cost adjacencies, e.g., using an SPF algorithm. The router is then able to forward multicast packets to a given egress router based on the path from the router to the egress router that is determined by the routing underlay 615. In a typical deployment, the routing underlay 615 determines a default topology that an interior gateway protocol, such as OSPF, uses for routing unicast packets. In that case, the adjacencies determined by the routing underlay 615 are equivalent to the OSPF adjacencies determined for unicast traffic.

An ingress router is able to multicast a packet to a set of egress routers by determining a set of egress routers that share a subdomain and a set. For example, the number of separate sets of egress routers (i.e., sets of egress routers in different combinations of a subdomain and a set) is equal to N. For each of the N sets, a bitstring is determined that encodes all of the egress routers in the set using a bitwise OR of the bitstrings of the egress routers in the set. A subdomain identifier and a set identifier is determined for the set. The routing underlay 615 provides information to determine the next-hop adjacency for each of the destination egress routers in the bitstring. The set of destination egress routers is then partitioned into P groups so that the egress routers in each group have the same next-hop.

A copy of the multicast packet is generated for each of the P groups. Bits in the bitstring for the packet that identify an egress router that is not in the group are cleared. A header is prepended onto the multicast packet and the bitstring, subdomain identifier, and set identifiers are encoded into the header as a label or by absolute value. The copies of the packets are then transmitted to the next-hop routers associated with each of the P groups. Thus, the ingress router replicates the packet into N×P copies of the multicast packet and transmits each copy with a corresponding header to the designated next-hop router.

FIG. 29 is an example encoding of a header according to some embodiments. In the example header, BFIR-id is the identifier of the ingress router. Information in the other octets is determined according to relevant protocols such as the MPLS network protocol. The handling and interpretation of the first 4 octets (=BIFT-id+TC+S+TTL) in the header is different depending upon whether the underlying network is an MPLS network or not. The BIFT-id identifies the <SD, SI, BSL> associated with the packet.

The detailed definition of the fields are as follows:

BIFT-id: BIFT-id is used to identify the bit index forwarding table (BIFT) corresponding to the unique combination of a subdomain and a set.

In an MPLS network, BIFT-id is an MPLS label which is allocated and advertised by a router to receive BIER packets for the combination of a subdomain and a set. Any packet received with that label is identifies the BIFT corresponding to the combination of a subdomain and a set. Since BIFT-id is an MPLS label, its value may be changed as a BIER packet goes from router to router.

In non-MPLS network, a BIFT-id must be allocated for each combination of a subdomain and a set.

TC:

The "Traffic Class" field [RFC5462] has its usual meaning in an MPLS label stack entry.

S bit:

When a BIER packet is traveling through an MPLS network, the high-order 20 bits of the initial four octets of the BIER encapsulation contain an MPLS label in the BIFT-id field. These four octets are treated as the final entry in the packet's MPLS label stack. Hence, the S bit (see [RFC3032]) must be set to 1. If there are any MPLS label stack entries immediately preceding the BIER encapsulation, the S bit of those label stack entries must be set to 0.

TTL:

This is the usual MPLS "Time to Live" field [RFC3032]. When a BIER packet is received, its "incoming TTL" (see below) is taken from this TTL field.

When a BIER packet is forwarded to one or more BIER next-hop adjacencies, the BIER-MPLS label carried by the forwarded packet must have a TTL field whose value is one less than that of the packet's incoming TTL.

If a BIER packet's incoming TTL is 1 or greater and one of the bits in its BitString identifies the current router is the egress router for the packet. Therefore, the current router must process the packet as egress router, e.g., by removing the BIER encapsulation and processing the payload based on the contents of the Proto (Next Protocol) field.

If the incoming TTL is 0, the packet is considered to be "expired". If the incoming TTL is 1 and the BitString has a bit set that does not identify the current router, the packet is also considered to be expired. Expired packets should be passed to an error-handling procedure. (Optional implementation-specific rate limiting may be applied to control the rate at which packets are passed to the error-handling procedure.) Specification of the error-handling procedure is outside the scope of this invention.

Note that if a received BIER packet has an incoming TTL of 1 and its BitString has a bit set identifying the current router, the payload must be processed by the current router, but the packet must not be forwarded further, and the packet should also be passed to the error-handling procedures for expired packets (subject to any implementation-specific rate limiting).

Nibble:

This field is set to the binary value 0101; this ensures that the MPLS ECMP logic will not confuse the remainder of the BIER header with an IP header or with the header of a pseudowire packet. In an MPLS network, if a router receives a BIER packet with any other value in the first nibble after the label stack, it should discard the packet and log an error.

Ver:

This 4-bit field identifies the version of the BIER header and is always set to 0. If a packet is received by a particular router and that router does not support the specified version of the BIER header, the router must discard the packet and log an error.

BSL:

This 4-bit field encodes the length in bits of the BitString. If k is the length of the BitString, the value of this field is log 2(k)-5. However, only certain values are supported:

1: 64 bits
2: 128 bits
3: 256 bits
4: 512 bits
5: 1024 bits
6: 2048 bits
7: 4096 bits An implementation may set to any value other than those listed above. A received packet containing a value in this field that is not supported by an implementation should be discarded and an error logged.

Entropy:

This 20-bit field specifies an "entropy" value that can be used for load-balancing purposes. The BIER forwarding process may do equal-cost load balancing, in which case the load-balancing procedure must choose the same path for any two packets that have the same entropy value and the same BitString.

If an ingress router is encapsulating (as the payload) MPLS packets that have entropy labels, the ingress router must ensure that if two such packets have the same MPLS entropy label they also have the same value of the BIER entropy field.

OAM:

By default, these two bits are set to 0 by the ingress router and are not modified by other routers. These two bits have no effect on the path taken by a BIER packet and have no effect on the quality of service applied to a BIER packet. The use of these bits in other than the default manner is optional.

Rsv:

These two bits are currently unused. They should be set to 0 upon transmission and MUST be ignored upon reception.

DSCP:

By default, this 6-bit field is not used in MPLS networks. The default behavior is that all six bits should be set to 0 upon transmission and must be ignored upon reception. Non-default use of this field in MPLS networks is outside the scope of this document.

Proto:

This 6-bit "Next Protocol" field identifies the type of the payload. (The "payload" is the packet or frame immediately following the BIER header.) IANA has created a registry called "BIER Next Protocol Identifiers". This field is to be populated with the appropriate entry from that registry.

If an egress router receives a BIER packet but does not recognize (or does not support) the value of the Next Protocol field, the egress router should discard the packet and log an error.

Bfir-Id:

By default, this is the identifier of the ingress router, in the subdomain to which the packet has been assigned. The BFIR-id is encoded in the 16-bit field as an unsigned integer in the range [1,65535]. BFIR-id field is composed of set identifier of the ingress router and the identifier of the ingress router (aka bitstring) within the set. For example, let's say BSL configured in a subdomain is 256 bits and set identifier is 2 and identifier of the ingress router is 10 then BFIR-id is (2×256)+10=522. Certain applications may require that the BFIR-id field contain the identifier of a router other than the ingress router. However, that usage of the BFIR-id field is outside the scope of this invention.

FIG. 30 is another example encoding of the header at the bottom of a MPLS label stack according to some embodiments.

In an MPLS network, the first 4 octets of the above header are also the bottom entry (last 4 octets) of an MPLS label stack. The BIFT-id is an MPLS label which is allocated and advertised by a router against a unique <SD, SI, BSL> using control plane protocols such as OSPF, IS-IS, BGP-LS. Since BIFT-id is an MPLS label, its value may be changed as a packet goes from router to router. When the header is encapsulated directly by Ethernet Header (i.e. BIFT-id is the only MPLS label) then Ether type is set as MPLS unicast (=0x8847) since for ethernet layer this is a unicast packet. In non-MPLS network, a domain wide unique BIFT-id is assigned for <SD, SI, BSL>. Such assignment can be done by a centralized SDN controller (shown in FIG. 2) that oversees entire BIER domain. If the header is carried as non-MPLS packet over Ethernet Header then Ethertype is NOT 0x8847 or 0x8848.

Routers in a BIER domain forward multicast packets that are encapsulated with a header such as one of the headers discussed above. In response to receiving the multicast packet, the BIFT-id in the header is mapped to the appropriate subdomain and set combination, which is then used to access the corresponding forwarding table in the data plane. The packet is discarded if the bitstring in the header consists entirely of zeros, which indicates that the forwarding process is complete and the router does not need to forward the packet to any other routers. If the packet includes at least one non-zero bits, the position of the least significant bit that is set to a value of 1 (e.g. the bit k) in the bitstring is identified. If the bit k identifies the router that receives the packet, the packet is copied and sent to the multicast flow overlay 605. The bit k is then cleared.

If the bit k identifies a different router, the bit k is used as an index into the forwarding table and the corresponding forwarding bit mask and next-hop router are extracted from the forwarding table. A copy of the packet is created and the bitstring in the copy is updated by performing a logical AND of the original bitstring with the forwarding bit mask. The copy is then forwarded to the next-hop router. Thus, the bitstring in the forwarded copy only identifies the egress routers that are to be reached via the next-hop router. The original packet's bitstring is then updated by performing a logical AND of the bitstring with the inverse of the forwarding bit mask to clear bits that identify the egress routers that are receiving the copy of the packet that was just forwarded to the next-hop router. Thus, only one copy of the packet is forwarded to each next-hop router. The number of lookups in the forwarding table is the same as the number of next-hop routers and it is not necessary to do a separate lookup for each destination egress router.

As discussed herein, there are a number of problems with implementations of stateless multicasting according to a BIER architecture. For example, the number of ingress replications at the ingress router grows linearly with the number of unique combinations of subdomains and sets that include the egress routers for a multicast packet. Ingress replication results in bandwidth waste in the routing underlay 615 and a significant replication burden on the ingress router. For another example, the size of the routing tables grows linearly with the number of routers in the BIER domain. Furthermore, the routing tables are updated in response to any change in the network topology and the convergence time on the control plane increases with the number of routers in the BIER domain. For yet another example, the size of the forwarding tables grows linearly with the number of routers in the BIER domain. Entries in the forwarding tables are updated in response to network topology changes, which results in longer data plane programming times. The increased time required for the control plane to program the data plane impacts the convergence time for traffic and, consequently, a switchover delay in the data plane increases with the number of routers. The linear growth of the forwarding tables also increases the cost and complexity of the data plane at transit routers, which conflicts with the goal of reducing the data plane states at transit routers for stateless multicast, irrespective of the size of the multicast domain (i.e., the number of egress routers). These problems are addressed using a hierarchical stateless architecture such as a hierarchical BIER architecture.

Figure 7:
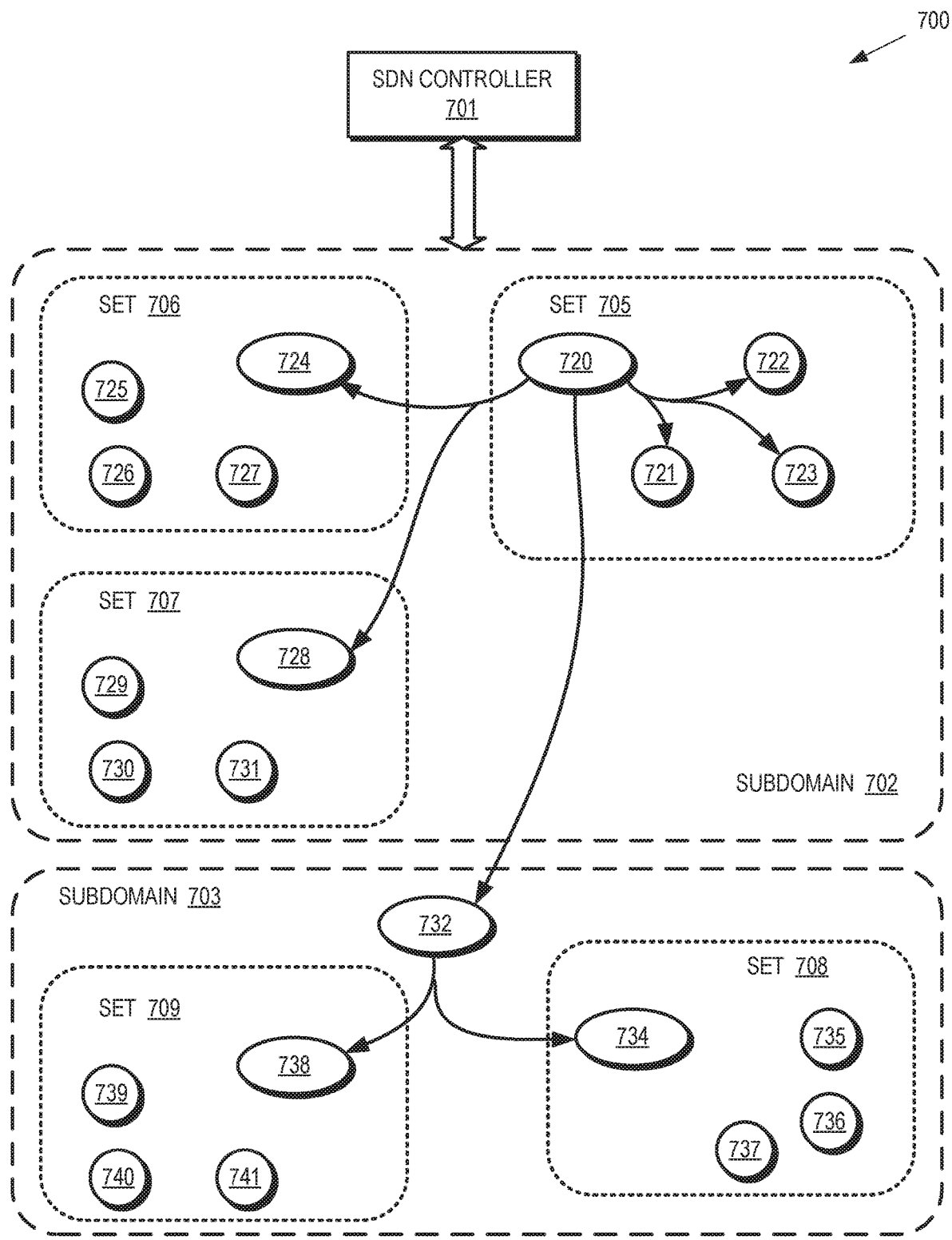
FIG. 7 is a block diagram of a communication system that implements stateless multicasting using a hierarchical BIER architecture according to some embodiments.

FIG. 7 is a block diagram of a communication system 700 that implements stateless multicasting using a hierarchical BIER architecture according to some embodiments. The communication system 700 includes a software defined networking (SDN) controller 701 that provides control functionality to the communication system 700. Routers within the hierarchical BIER domain of the communication system 700 are partitioned into subdomains 702, 703. Subdomains 702, 703 are identified by a subdomain identifier having a predetermined range, such as [0 . . . 255]. The subdomains 702, 703 are respectively partitioned into sets of routers including the sets 705, 706, 707 in the subdomain 702 and the sets 708, 709 in the subdomain 703. The sets 705, 706, 707, 708, 709 are collectively referred to herein as "the sets 705-709."

The BIER domain also includes routers 720, 721, 722, 723, 724, 725, 726, 727, 728, 729, 730, 731, 732, 733, 734, 735, 736, 737, 738, 739, 740, 741 which are collectively referred to herein as "the routers 720-741." In the illustrated embodiment, the subdomain 702 includes the routers 720-731 and the subdomain 703 includes the routers 732-741. The set 705 includes the routers 720-723 and the set 709 includes the routers 738-741. The other routers are similarly included in the other sets. In some embodiments, the number of routers 720-741 in each subdomain 702, 703 is limited to a predetermined maximum number, such as 65535 routers, and each router is assigned an identifier within a corresponding range, such as [1, 65535], which uniquely identifies the router within its subdomain. In some embodiments, the router identifiers are allocated densely from the available numbering space to produce more efficient encoding into bitstrings. For example, if there are less than 256 routers, then all of the router identifiers are assigned from the range [1, 256].

The routers 720, 732 are subdomain gateway routers that receive multicast packets originated from other subdomains for egress routers within the corresponding subdomains 702, 703. A single subdomain can include multiple subdomain gateway routers for resiliency, load-balancing, or other purposes. Multicast packets that are transmitted to routers within the subdomains 702, 703 pass through the subdomain gateway routers 720, 732. For example, multicast packets that are transmitted to any of the routers within the sets 705-707 are first transmitted to the subdomain gateway router 720, which then distributes the multicast packets to the sets 705-707. For another example, multicast packets that are transmitted to any of the routers within the sets 708, 709 are first transmitted to the subdomain gateway router 732, which then distributes the multicast packets to the sets 708, 709.

The routers 720, 724, 728, 734, 738 are set gateway routers that receive multicast packets originated from other sets for egress routers within the sets 705-709, respectively. A single set can include multiple set gateway routers for resiliency, load-balancing, or other purposes. Multicast packets that are transmitted to routers within the sets 705-708 therefore pass through the corresponding set gateway routers 720, 724, 728, 734, 738. For example, multicast packets that are transmitted to the routers 725-727 are first transmitted to the set gateway router 724, which distributes the multicast packets to the routers 725-727. For another example, multicast packets that are transmitted to the routers 735-737 are first transmitted to the set gateway router 734, which distributes the multicast packets to the routers 735-737. The set gateway routers 720, 724, 728, 734, 738 receive multicast packets from the subdomain gateway routers 720, 732 for the subdomains 702, 703 that include the corresponding sets 705-709. Thus, a hierarchical domain is created in the communication system 700 by forming parent-child relationships between the subdomain gateway routers 720, 732 and the set gateway routers 720, 724, 728, 734, 738.

In the illustrated embodiment, the router 720 is an ingress router for the hierarchical domain in the communication system 700. Thus, the router 720 (as well as other routers) is able to function in multiple roles within the hierarchical domain, e.g., the router 720 is able to function as the ingress router for the hierarchical domain, a subdomain gateway router for the subdomain 702, a set gateway router for the set 705, and an egress router. Operating as the ingress router, the router 720 segregates destination egress routers for a multicast packet into groups that correspond to different levels in the hierarchical domain. In the illustrated embodiment, the hierarchical domain includes three levels—subdomain, set, and local—that correspond to three different types of multicast packets that are multicast to three different groups.

Local—Egress routers that share the same set and subdomain with a gateway router are part of a local group. For example, the routers 721-723 are in a local group of the router 720. Local type multicast packets are multicast to routers in a local group using a bitstring that identifies the egress routers in the local group.

Set—Sets that include egress routers for the multicast packet and are different than the set that includes the subdomain gateway router for the subdomain that includes the sets are part of a set group. For example, the sets 706, 707 are part of a set group for the router 720. Set type multicast packets are multicast to the set gateway routers for the sets in the set group using a bitstring that identifies the set gateway routers. The set gateway routers then forward the multicast packets to egress routers in the corresponding sets.

Subdomain—Subdomains that include egress routers for the multicast packet and are different than the subdomain that includes the ingress router are included into a subdomain group. For example, the subdomain 703 is part of a subdomain group for the router 720. Subdomain type multicast packets are multicast to the subdomain gateway routers for the subdomains in the subdomain group using a bitstring that identifies the subdomain gateway routers. The subdomain gateway routers then forward the multicast packets to one or more local egress routers or set gateway routers in one or more sets groups associated with the subdomain gateway router.

Thus, the ingress router transmits at most a number of copies of the multicast packet that is equal to a number of levels in the hierarchical domain. In the illustrated embodiment, the hierarchical domain includes three levels and the routers 720 forwards a maximum of three copies of the multicast packet: one copy is multicast to the subdomain gateway routers, one copy is multicast to the set gateway routers, and one copy is multicast to the local egress routers. In some embodiments, the routers in the hierarchical domain maintain control plane and data plane states that are used to route and forward multicast packets for any multicast flow within the hierarchical domain, as discussed herein.

The subdomain gateway routers 720, 732 are assigned a subdomain gateway identifier, e.g., an identifier in the range [1, 256] that uniquely identifies the subdomain gateway routers 720, 732 across the hierarchical domain. The subdomain gateway routers 720, 732 are also assigned prefixes, which are routable loopback IP addresses for routing multicast packets. A mapping of the subdomain gateway identifier to the corresponding prefix is advertised throughout the hierarchical domain using control plane functionality, as discussed below. If more than one router is a subdomain gateway router for the same subdomain, then the redundant subdomain gateway routers are assigned the same subdomain gateway identifier. In some embodiments, the subdomain bitstring has a length of 256 to encode each possible subdomain gateway router in a different bit position, e.g., if the subdomain gateway identifier is 100, then the 100-th bit in the bitstring is set to a value of 1 to indicate the corresponding subdomain gateway router.

The set gateway routers 720, 724, 728, 734, 738 are assigned set gateway identifiers that are unique within the corresponding subdomains 702, 703. For example, set gateway routers within a subdomain are assigned an identifier in the range [1, 256]. The set gateway routers 720, 724, 728, 734, 738 are also assigned prefixes that are routable loopback IP addresses. A mapping of the prefix to the set gateway identifiers is advertised throughout the domain using control plane functionality, as discussed below. If more than one router is a set gateway router for the same set, then the redundant set gateway routers are assigned the same set gateway identifier. In some embodiments, the set bitstring has a length of 256 to encode each possible set gateway router in a different bit position, e.g., if the set gateway identifier is 101, then the 101-st bit in the bitstring is set to a value of 1 to indicate the corresponding set gateway router.

A bitstring identifier is assigned to identify a specific combination of bits in a bitstring. Some embodiments of the bitstring identifier are a 32-bit index that maps to a combination of a bitstring length and a bitstring. For example, a bitstring identifier of 1000 maps to a bitstring length of 10 and a bitstring of 0101000001. A subdomain bitstring identifier is defined for a bitstring that contains a specific combination of set gateway routers in the subdomain. A set bitstring identifier is defined for a bitstring containing a specific combination of egress routers in the set.

Figure 8:
FIG. 8 is a bitstring identifier table that maps bitstring identifiers to bitstrings for sets of routers according to some embodiments.

FIG. 8 is a bitstring identifier table 800 that maps bitstring identifiers to bitstrings containing a specific combination of set gateway routers according to some embodiments. The table 800 is stored in some embodiments of the subdomain gateway routers 720, 732 shown in FIG. 7. Each row of the table 800 is associated with a bitstring identifier for child sets of the subdomain gateway router that stores the table 800. The first column of the table 800 includes a bitstring identifier, the second column of the table 800 includes a bitstring length, and the third column of the table 800 includes a bitstring that encodes a set of set bitstrings for child sets of the subdomain.

Figure 9:
FIG. 9 is a bitstring identifier table that maps bitstring identifiers to bitstrings for destination routers according to some embodiments.

FIG. 9 is a bitstring identifier table 900 that maps bitstring identifiers to bitstrings for destination routers according to some embodiments. The table 900 is stored in some embodiments of the set gateway routers 720, 724, 728, 734, 738 shown in FIG. 7. Each row of the table 900 is associated with a bitstring identifier for destination routers in the router set that is served by the set gateway router that stores the table 900. The first column of the table 900 includes a bitstring identifier, the second column of the table 900 includes a bitstring length, and the third column of the table 900 includes a bitstring that encodes a set of bitstrings for destination routers in the set. In some embodiments, the destination routers are egress routers.

Figure 10:
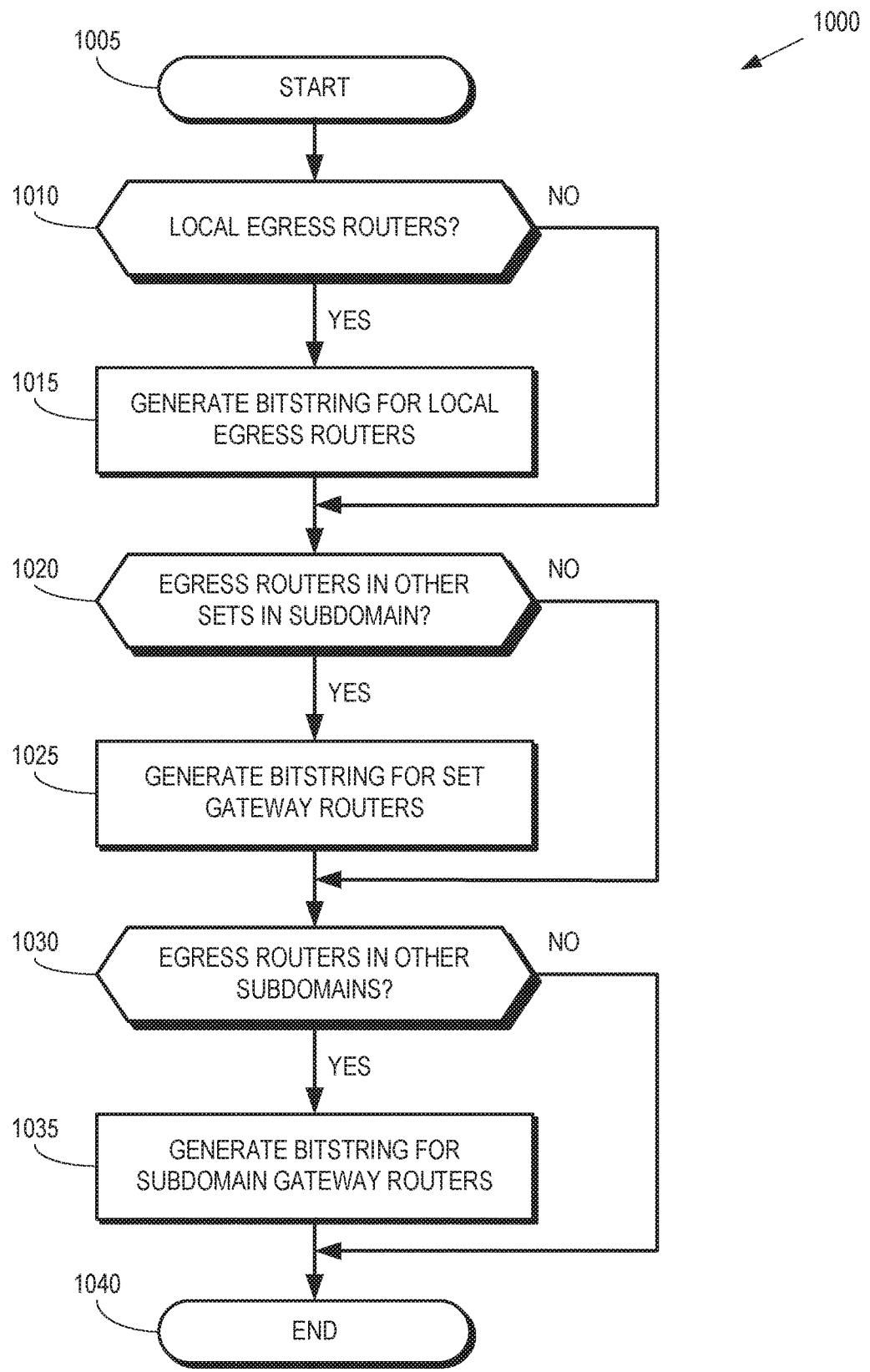
FIG. 10 is a flow diagram of a method for configuring a hierarchical domain at an ingress router according to some embodiments.

FIG. 10 is a flow diagram of a method 1000 for configuring a hierarchical domain at an ingress router according to some embodiments. The method 1000 is implemented in some embodiments of the communication system 700 shown in FIG. 7. The method 1000 is disclosed in the context of a hierarchical domain that includes three levels: subdomain, set, and local. However, some embodiments of the method 1000 are used to configure hierarchical domains with more or fewer levels.

The method 1000 starts at terminator block 1005. At decision block 1010, the ingress router determines whether there are any local egress routers that are in the same subdomain and the same set as the ingress router. If one or more local egress routers are in the same subdomain and the same set as the ingress router, the method 1000 flows to block 1015. If not, the method 1000 flows to decision block 1020.

At block 1015, the ingress router generates a bitstring that identifies the local egress routers. In some embodiments, the ingress router generates the bitstring by performing a bitwise OR operation to combine the bitstrings that are allocated to the local egress routers. For example, the bitstring that identifies the local egress routers having bitstrings 0100000000 and 0000000010 is generated using the bitwise OR operation to produce the bitstring 0100000010.

At decision block 1020, the ingress router determines whether there are any egress routers in other sets in the same subdomain as the ingress router. If so, the method 1000 flows to block 1025. If not, the method 1000 flows to decision block 1030.

At block 1025, the ingress router generates a bitstring that identifies the set gateway routers for the sets that include egress routers. In some embodiments, the ingress router generates the bitstring for the set gateway routers by performing a bitwise OR operation to combine the bitstrings that are allocated to the set egress routers.

At decision block 1030, the ingress router determines whether there are any egress routers in other subdomains that differ from the subdomain that includes the ingress router. If so, the method 1000 flows to block 1035. If not, the method 1000 flows to the terminator block 1040 and the method 1000 ends.

At block 1035, the ingress router generates a bitstring that identifies the subdomain gateway routers for the subdomains that include egress routers. In some embodiments, the ingress router generates the bitstring for the subdomain gateway routers by performing a bitwise OR operation to combine the bitstrings that are allocated to the subdomain egress routers. The method 1000 then flows to the terminator block 1040 and the method 1000 ends.

Although the method 1000 illustrates a particular order for generating bitstrings for the various routers, some embodiments perform these operations in a different order or concurrently.

Figure 11:
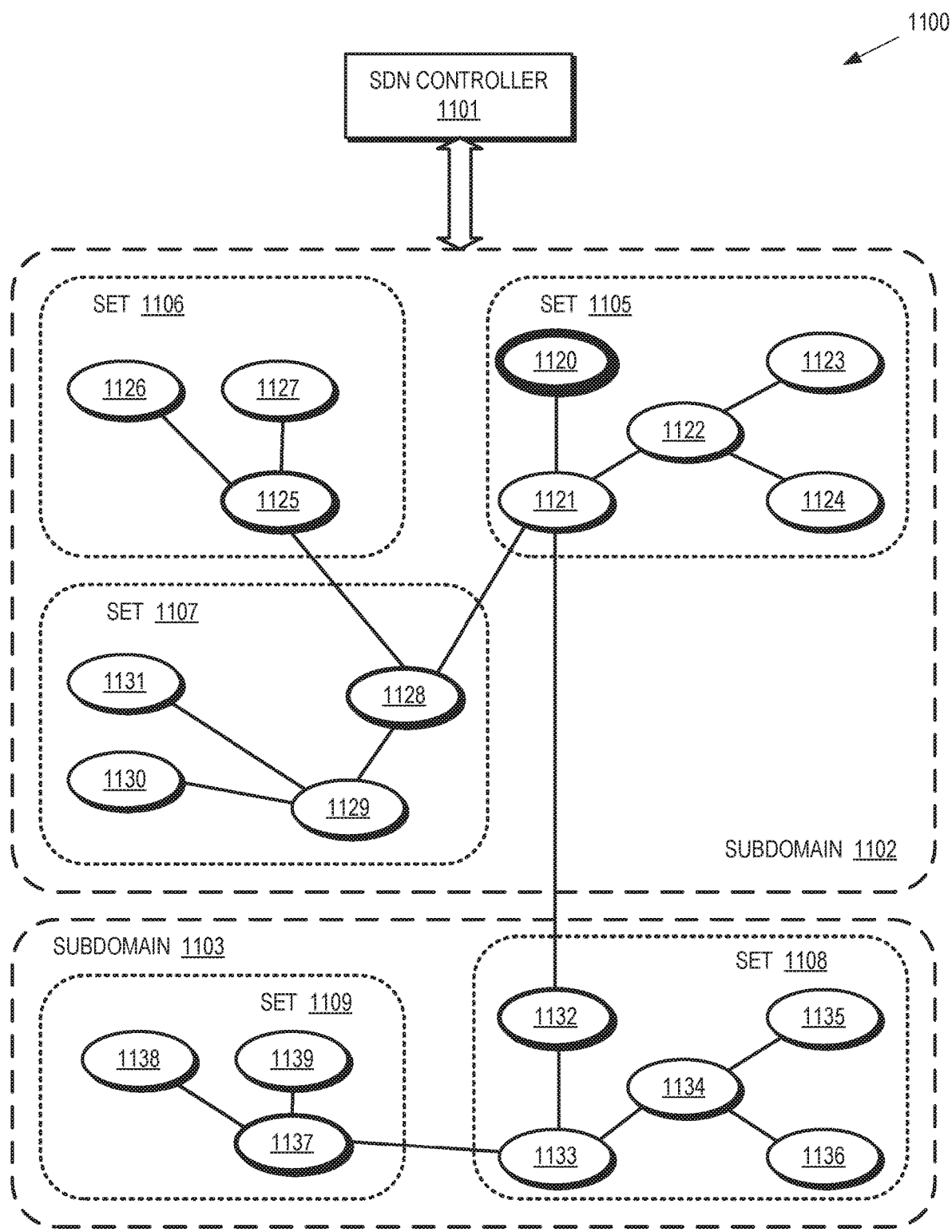
FIG. 11 is a block diagram of a communication system that implements stateless multicasting using a hierarchical BIER architecture according to some embodiments.

FIG. 11 is a block diagram of a communication system 1100 that implements stateless multicasting using a hierarchical BIER architecture according to some embodiments. The communication system 1100 includes a software defined networking (SDN) controller 1101 that provides control functionality to the communication system 1100. Routers within a hierarchical BIER domain of the communication system 1100 are partitioned into subdomains 1102, 1103. Subdomains 1102, 1103 are identified by a subdomain identifier having a predetermined range, such as [0 . . . 255]. The subdomains 1102, 1103 are respectively partitioned into sets of routers including the sets 1105, 1106, 1107 in the subdomain 1102 and the sets 1108, 1109 in the subdomain 1103. The sets 1105, 1106, 1107, 1108, 1109 are collectively referred to herein as "the sets 1105-1109."

The BIER domain also includes routers 1120, 1121, 1122, 1123, 1124, 1125, 1126, 1127, 1128, 1129, 1130, 1131, 1132, 1133, 1134, 1135, 1136, 1137, 1138, 1139, which are collectively referred to herein as "the routers 1120-1139." In the illustrated embodiment, the subdomain 1102 includes the routers 1120-1131 and the subdomain 1103 includes the routers 1132-1139. The set 1105 includes the routers 1120-1124 and the set 1109 includes the routers 1132-1135. The other routers are similarly included in the other sets. The number of routers 1120-1139 in each subdomain 1102, 1103 is limited to a predetermined maximum number, such as 65535 routers, and each router is assigned an identifier within a corresponding range, such as [1, 65535], which uniquely identifies the router within its subdomain. In some embodiments, the router identifiers are allocated densely from the available numbering space to produce more efficient encoding into bitstrings. For example, if there are less than 256 routers, then all of the router identifiers are assigned from the range [1, 256].

The router 1120 is an ingress router for the hierarchical BIER domain, as well as being a subdomain gateway router for the subdomain 1102, and a set gateway router for the set 1105. The router 1132 is a subdomain gateway router for the subdomain 1103 and a set gateway router for the set 1108. The routers 1125, 1128, 1137 are set gateway routers for the sets 1106, 1107, 1109, respectively. The egress routers from the hierarchical BIER domain include the routers 1122, 1123, 1124, 1126, 1127, 1129, 1130, 1131, 1134, 1135, 1136, 1138, and 1139. As discussed herein, the ingress router 1120 multicasts directly to local egress routers 1122-1124. For example, the ingress router 1120 generates a first copy of the multicast packet and append a header including a bitstring that identifies the local egress routers 1122-1124. The first copy of the multicast packet is then multicast locally.

In order to reach the egress routers 1126, 1127, 1129-1131, the ingress router 1120 multicasts to the set gateway routers 1125, 1128, which then forward the multicast packets to their local egress routers. For example, the ingress router 1120 generates a second copy of the multicast packet and appends a header including a bitstring that identifies the set gateway routers 1125, 1128. The ingress router 1120 then multicast the second copy of the multicast packet to the set gateway routers 1125, 1128. Upon receipt of the second copy, the set gateway routers 1125, 1128 generate headers including bitstrings that identify their respective local egress routers and each multicasts a copy towards their respective local egress routers.

In order to reach the egress routers 1134-1136, 1138, 1139, the ingress router 1120 multicasts to the subdomain gateway router 1132, which multicasts the packet to its corresponding set gateway routers and local egress routers. For example, the ingress router 1120 generates a third copy of the multicast packet and appends a header including a bitstring that identifies the subdomain gateway router 1132. The ingress router 1120 then multicasts the third copy of the multicast packet to the subdomain gateway router 1132. Upon reception of the third copy, the subdomain gateway router 1132 generates headers including bitstrings that identify its respective set gateway routers and local egress routers. The subdomain gateway router 1132 then multicasts one copy of the multicast packet towards the set gateway routers (including the set gateway bitstring) and another copy of the multicast packet towards the local egress routers (including the local bitstring).

Figure 12:
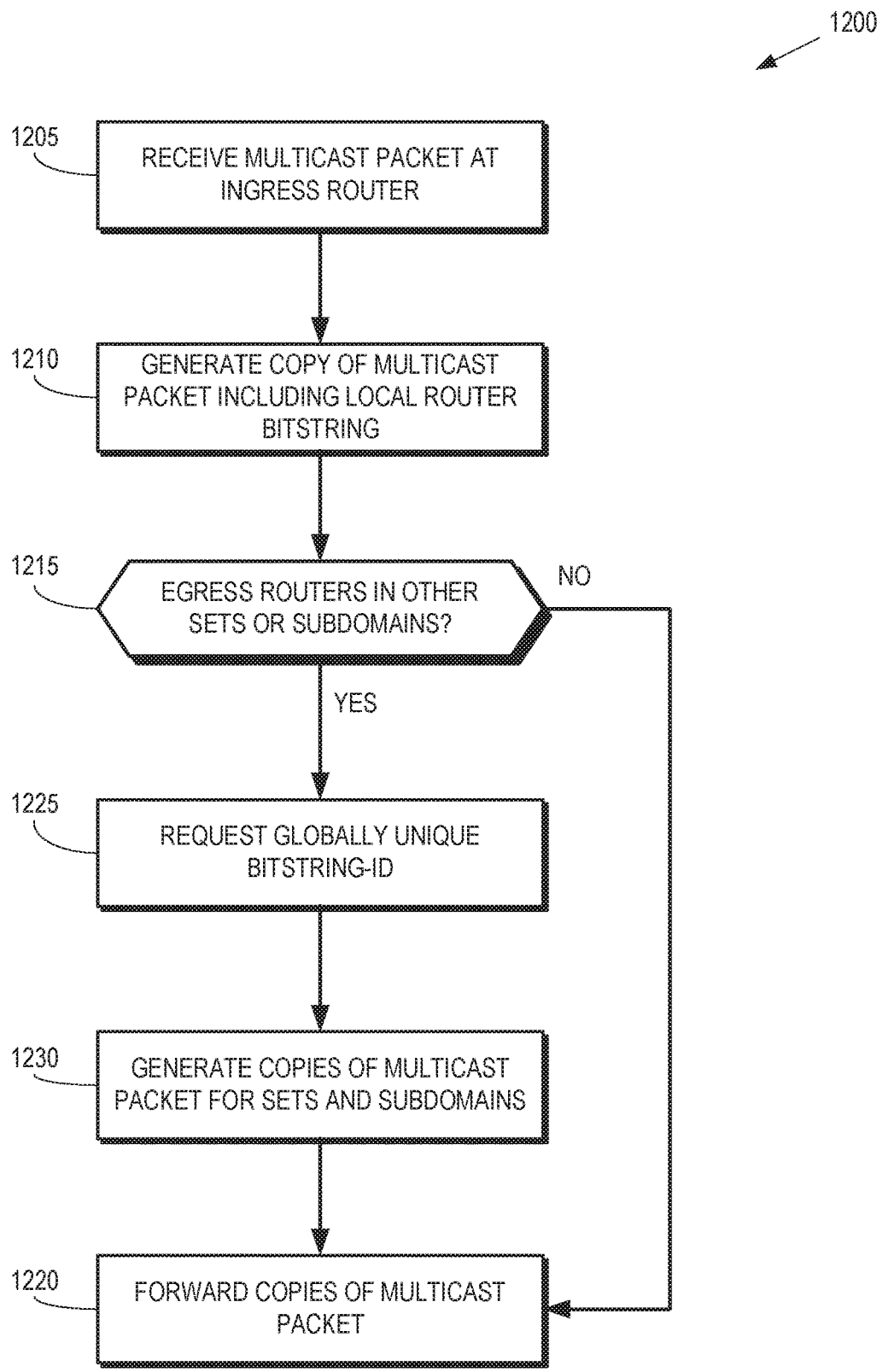
FIG. 12 is a flow diagram of a method for multicasting packets in a hierarchical BIER domain according to some embodiments.

FIG. 12 is a flow diagram of a method 1200 for multicasting packets in a hierarchical BIER domain according to some embodiments. The method 1200 is implemented in some embodiments of the communication system 700 shown in FIG. 7 and the communication system 1100 shown in FIG. 11. As discussed herein, an ingress router to the hierarchical BIER domain partitions the destination egress routers into groups corresponding to levels in the hierarchy. Some embodiments of the ingress router partition the destination egress routers into three groups: local, set, and subdomain. The local egress routers are identified by a first bitstring stored at the ingress router, the set gateway routers are identified by a second bitstring stored at the ingress router, and the subdomain gateway routers are identified by a third bitstring stored at the ingress router. The ingress router is therefore able to reach all the egress routers in the hierarchical BIER domain by transmitting a number of copies of a multicast packet that is less than or equal to the number of groups or levels in the hierarchy.

At block 1205, the ingress router receives a multicast packet that is to be multicast to egress routers within the hierarchical BIER domain. At block 1210, the ingress router generates a first copy of the multicast packet with a header that includes the first bitstring to identify the egress routers in the same set and subdomain as the ingress router. The header also includes information identifying the first copy as a multicast packet of the type "local."

At decision block 1215, the ingress router determines whether there are egress routers in other sets or subdomains that differ from the set or the subdomain that includes the ingress router. If not, the method 1200 flows to block 1220 and the ingress router forwards the first copy of the multicast packet to the local egress routers. If there are additional egress routers in other sets or subdomains, the method 1200 flows to block 1225.

At block 1225, the ingress router sends a request to a controller (such as the SDN controller 1101 shown in FIG. 11) to assign a globally unique bitstring identifier. At block 1230, the ingress router generates second or third copies of the multicast packet for multicasting to the set gateway routers or subdomain gateway routers, depending on whether there are egress routers in other sets or subdomains. The method 1200 then flows to block 1220 and the method 1200 ends. An advantage of some embodiments of the method 1200 is that the method 1200 is backwards compatible with conventional, non-hierarchical BIER multicasting. In some embodiments, the method 1200 is used to process a fourth type of packet, which can be referred to as "conventional" and includes a conventional non-hierarchical BIER multicast packet.

Figure 13:
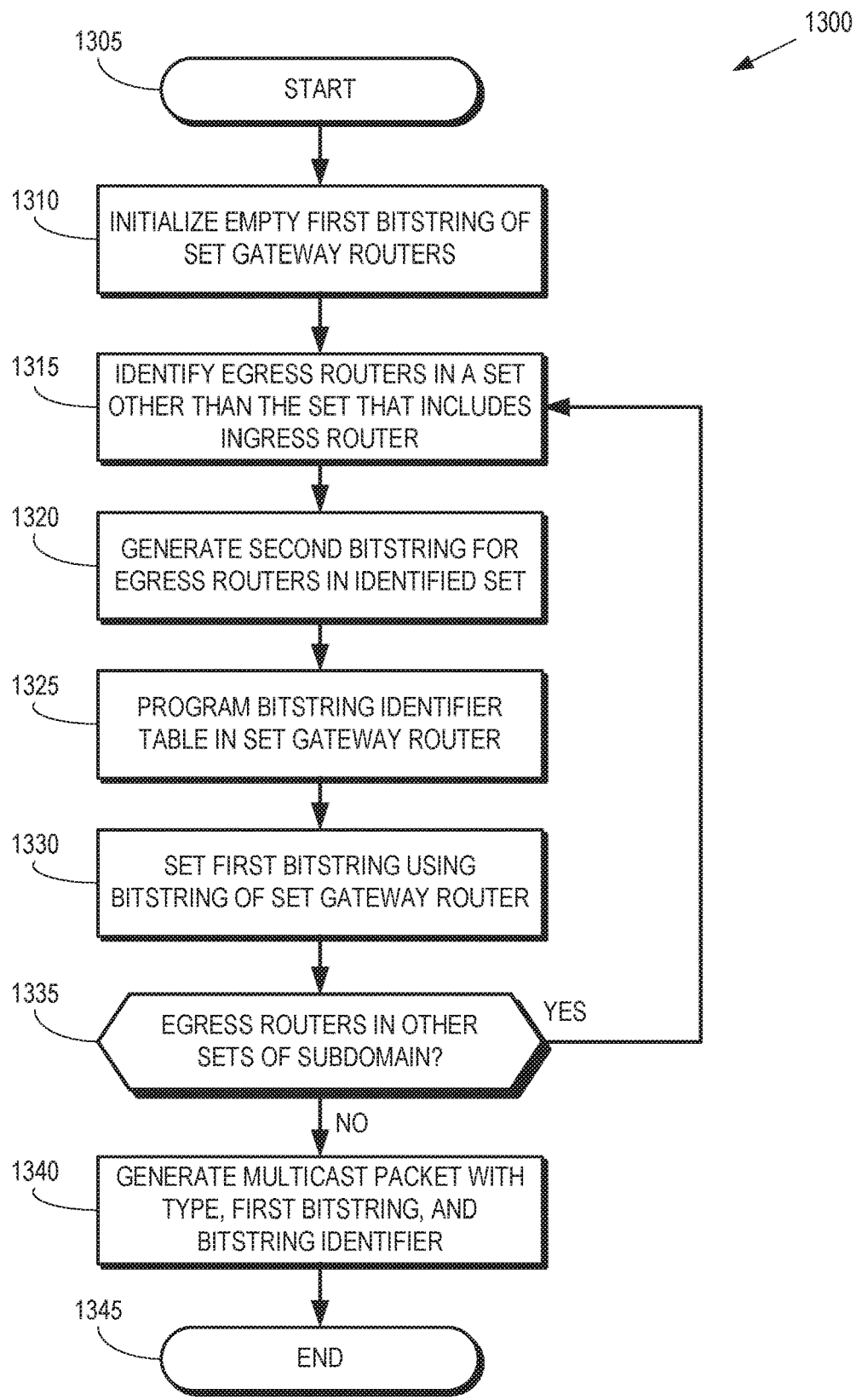
FIG. 13 is a flow diagram of a method of generating a copy of the multicast packet for multicasting to one or more set gateway routers according to some embodiments.

FIG. 13 is a flow diagram of a method 1300 of generating a copy of the multicast packet for multicasting to one or more set gateway routers according to some embodiments. The method 1300 is implemented in some embodiments of the communication system 700 shown in FIG. 7 and the communication system 1100 shown in FIG. 11. For example, the method 1300 can be implemented in block 1230 of the method 1200 shown in FIG. 12. The method 1300 is performed if an ingress router determines that there are egress routers in other sets within the same subdomain as the ingress router.

The method 1300 begins at a terminator block 1305. At block 1310, the ingress router initializes an empty (first) bitstring of the set gateway routers in the same subdomain as the ingress router.

At block 1315, the ingress router identifies egress routers in a set of the subdomain other than the set that includes the ingress router.

At block 1320, the ingress router generates a second bitstring for the egress routers in the identified set of the subdomain.

At block 1325, the ingress router uses a globally unique bitstring identifier (provided by a controller such as the SDN controller 1101 shown in FIG. 11) as a bitstring identifier for a corresponding set gateway router and requests that the controller programs a set bitstring identifier table in the set gateway router with an entry that maps the globally unique bitstring identifier to the second bitstring. As a result, the set gateway router is able to map the globally unique bitstring identifier to corresponding egress routers indicated by the second bitstring.

At block 1330, the first bitstring is set based on a bitstring of the set gateway router. In some embodiments, the first bitstring is modified by performing an exclusive-OR of the first bitstring with the bitstring of the set gateway router for the set that includes the egress routers.

At decision block 1335, the ingress router determines whether there are egress routers in other sets of the subdomain that includes the ingress router. If so, the method 1300 flows back to block 1315 and performs another iteration for another set in the subdomain that includes the ingress router. If not, the method 1300 flows to block 1340.

At block 1340, the ingress router generates a header indicating that the multicast packet type is "set" and including the first bitstring and the globally unique bitstring identifier. This header is appended to the second copy of the multicast packet that is to be forwarded by the ingress router. The method 1300 ends at terminator block 1345.

Figure 14:
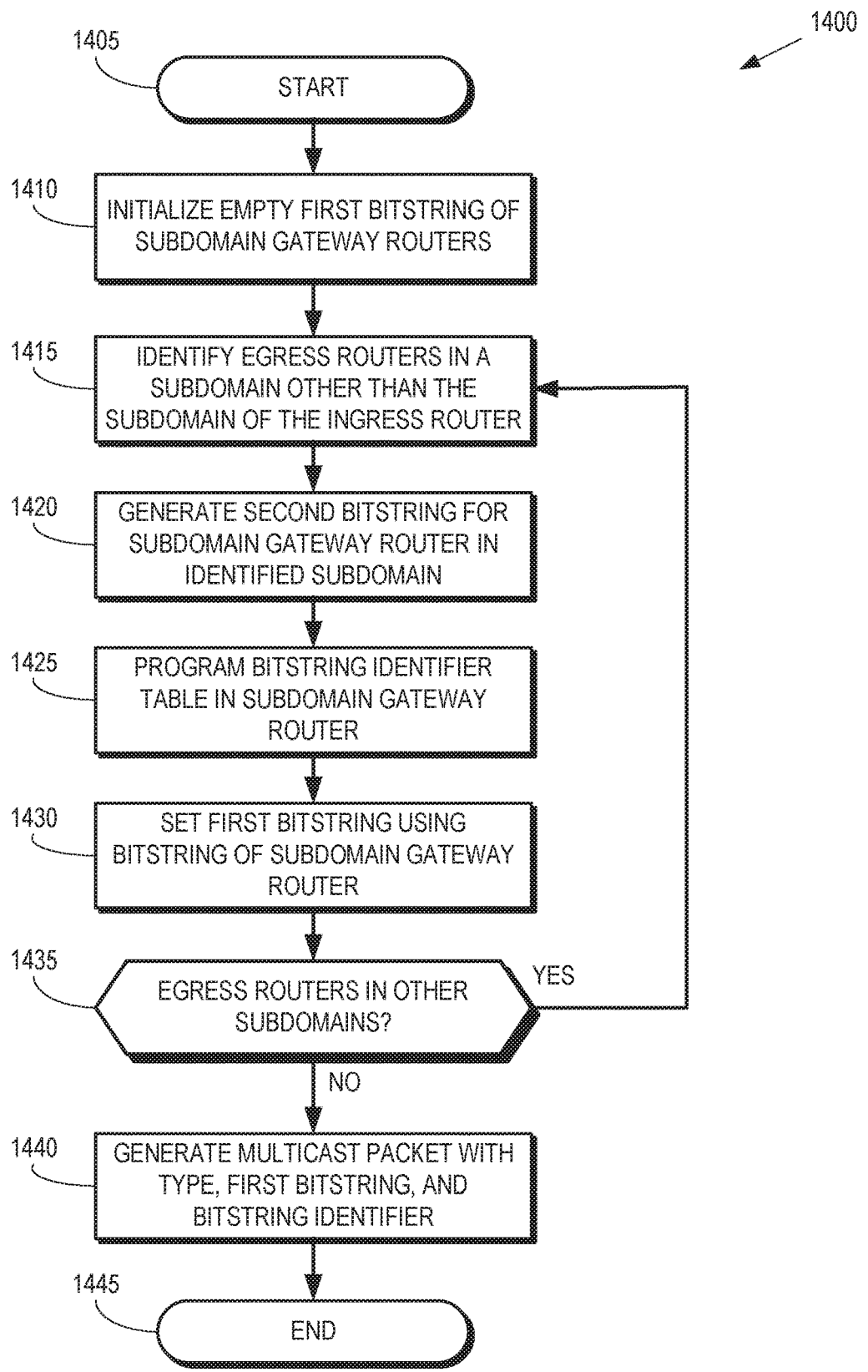
FIG. 14 is a flow diagram of a method of generating a copy of the multicast packet for multicasting to one or more subdomain gateway routers according to some embodiments.

FIG. 14 is a flow diagram of a method 1400 of generating a copy of the multicast packet for multicasting to one or more subdomain gateway routers according to some embodiments. The method 1400 is implemented in some embodiments of the communication system 700 shown in FIG. 7 and the communication system 1100 shown in FIG. 11. For example, the method 1400 can be implemented in block 1230 of the method 1200 shown in FIG. 12. The method 1400 is performed if an ingress router determines that there are egress routers in other subdomains, The method 1400 begins at a terminator block 1405. At block 1410, the ingress router initializes an empty first bitstring for the subdomain gateway routers.

At block 1415, the ingress router identifies one or more egress routers in a subdomain other than the subdomain that includes the ingress router.

At block 1420, the ingress router generates a second bitstring for the identified subdomain. In some embodiments, the second bitstring includes information identifying set gateway routers for sets in the identified subdomain that include one or more egress routers.

At block 1425, the ingress router uses a globally unique bitstring identifier (provided by a controller such as the SDN controller 1101 shown in FIG. 11) as a subdomain bitstring identifier in the other subdomain and requests that the controller program the subdomain bitstring identifier table in the subdomain gateway router with an entry that maps the globally unique bitstring identifier to the second bitstring. As a result, the subdomain gateway router is able to map the globally unique bitstring identifier to corresponding set gateway routers.

At block 1430, the first bitstring is set based on a bitstring of the subdomain gateway router. In some embodiments, the first bitstring is modified by performing an exclusive-OR of the first bitstring with the bitstring of the subdomain gateway router for the set that includes the egress routers.

At decision block 1435, the ingress router determines whether there are egress routers in other subdomains that differ from the subdomain that includes the ingress router. If so, the method 1400 flows back to block 1415 and performs another iteration for another subdomain. If not, the method 1400 flows to block 1440.

At block 1440, the ingress router generates a header including information indicating that the multicast packet type is "subdomain" and including the first bitstring and the globally unique bitstring identifier. The header is then appended to the third copy of the multicast packet for multicasting to the other subdomains. The method 1400 ends at terminator block 1445.

Figure 15:
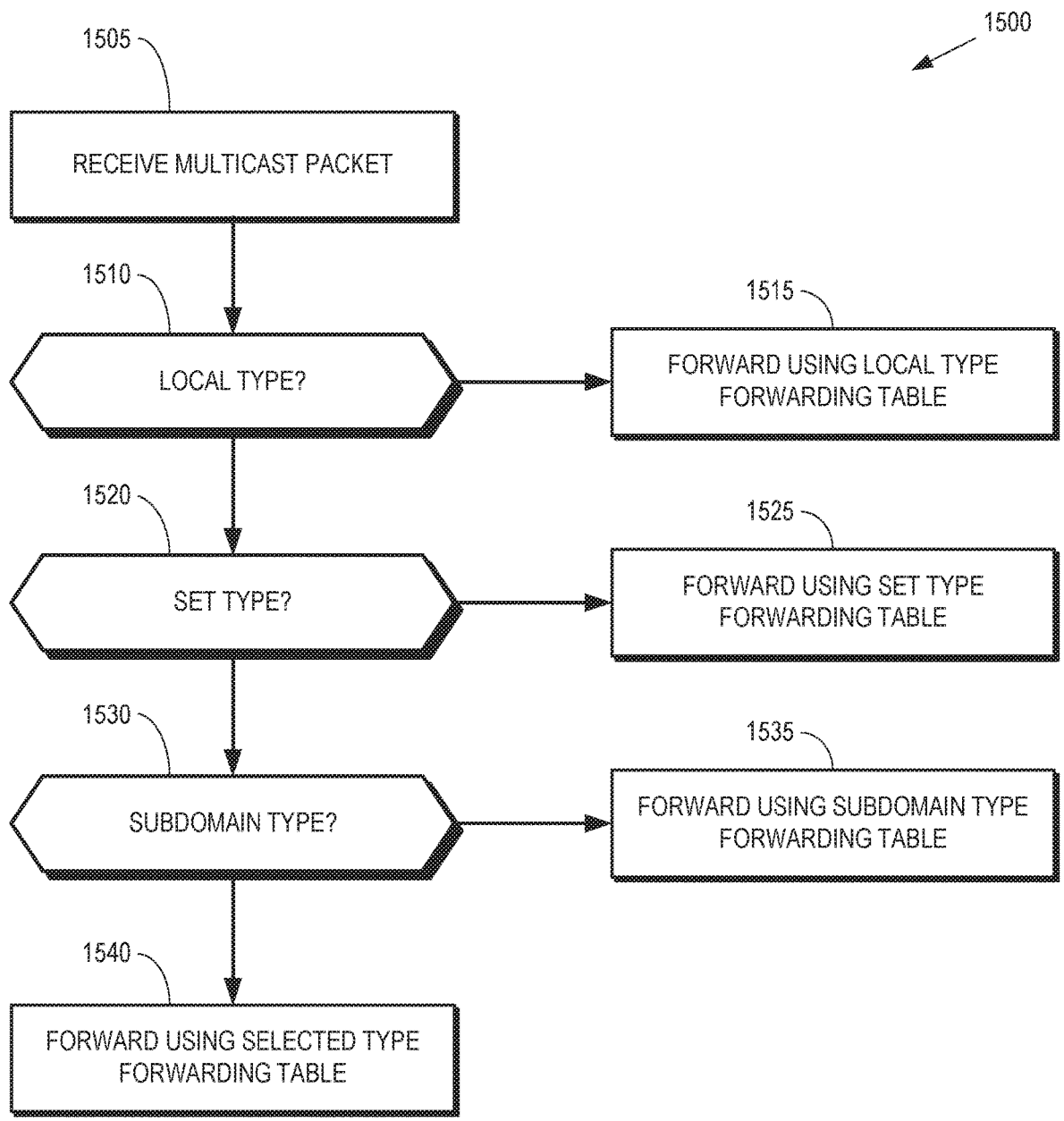
FIG. 15 is a flow diagram of a method of forwarding copies of multicast packets at a router in a hierarchical domain according to some embodiments.

FIG. 15 is a flow diagram of a method 1500 of forwarding copies of multicast packets at a router in a hierarchical domain according to some embodiments. The method 1500 is implemented in some embodiments of the communication system 700 shown in FIG. 7 and the communication system 1100 shown in FIG. 11.

At block 1505, the router receives a multicast packet. A header in the multicast packet includes information such as a bitstring identifier that identifies destination routers for the multicast packet, which may include subdomain gateway routers, set gateway routers, or local egress routers. The information in the header is also used to determine a type of the multicast packet. In the illustrated embodiment, the types include a local type that indicates that the multicast packet is to be forwarded to local egress routers, a set type that indicates that the multicast packet is to be forwarded to set gateway routers, and a subdomain type that indicates that the multicast packet is to be forwarded to subdomain gateway routers. In some cases, such as a multicast packet that is formed according to conventional, non-hierarchical protocols, the header may not include information indicating the type of the multicast packet.

At decision block 1510, the router determines whether the multicast packet is a local type. If so, the method 1500 flows to block 1515 and the router forwards the multicast packet using information in a local type of forwarding table, as discussed below. If the multicast packet is not a local type, the method 1500 flows to decision block 1520.

At decision block 1520, the router determines whether the multicast packet is a set type. If so, the method 1500 flows to block 1525 and the router forwards the multicast packet using information in a set type of forwarding table, as discussed below. If the multicast packet is not a set type, the method 1500 flows to decision block 1530.

At decision block 1530, the router determines whether the multicast packet is a subdomain type. If so, the method 1500 flows to block 1535 and the router forwards the multicast packet using information in a subdomain type of forwarding table, as discussed below. If the multicast packet is not a subdomain type, which may indicate that the packet is a conventional, non-hierarchical multicast packet, the method flows to block 1540.

At block 1540, the router routes other types of multicast packets, such as conventional multicast BIER packets. The router determines whether the destination router for the multicast packet is in the same subdomain and set. For example, the router can use a subdomain identifier or a set identifier in a header of the multicast packet to determine whether the router and the destination router in the same subdomain and the same set. If so, the router uses the local type of forwarding table to forward the multicast packet. If the router determines that the destination router is in the same subdomain but a different set, the router forwards the multicast packet to the set gateway router using the set type of forwarding table. If the router determines that the destination router is in a different subdomain and a different set, the router forwards the multicast packet to the subdomain gateway router using the subdomain type of forwarding table. Thus, the router is only required to maintain a number of forwarding tables that is equal to the number of levels in the hierarchy of the hierarchical domain, e.g., three forwarding tables for the local, set, and subdomain levels.

Figure 16:
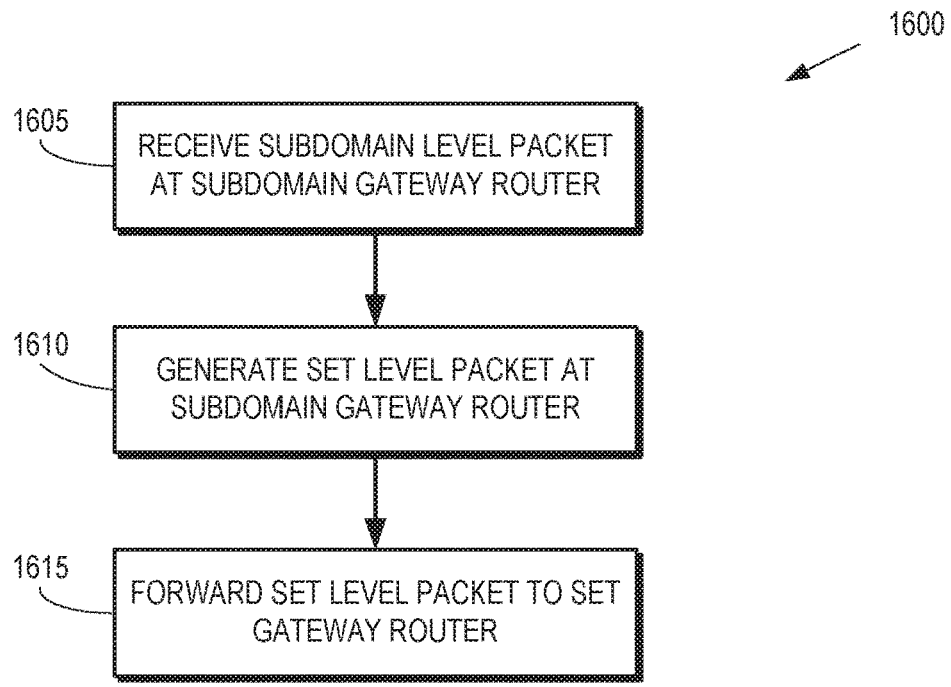
FIG. 16 is a flow diagram of a method of forwarding copies of subdomain type multicast packets at a subdomain gateway router according to some embodiments.

FIG. 16 is a flow diagram of a method 1600 of forwarding copies of subdomain type multicast packets at a subdomain gateway router according to some embodiments. The method 1600 is implemented in some embodiments of the communication system 700 shown in FIG. 7 and the communication system 1100 shown in FIG. 11.

At block 1605, the subdomain gateway router receives a subdomain level multicast packet. For example, the level of the multicast packet indicated in a header of the multicast packet is "subdomain." At block 1610, the subdomain gateway router generates a set level multicast packet using a copy of the subdomain level multicast packet. In some embodiments, the subdomain gateway router generates the set level multicast packet by mapping a set bitstring identifier from the header of the multicast packet to an entry in a globally unique bitstring table that maps to a set bitstring, which identifies set gateway routers. The subdomain gateway router then generates a header that identifies the copy as a set level multicast packet and includes the set bitstring and the set bitstring identifier. At block 1615, the subdomain gateway router forwards the set level multicast packet, e.g., by multicasting the set level multicast packet.

Figure 17:
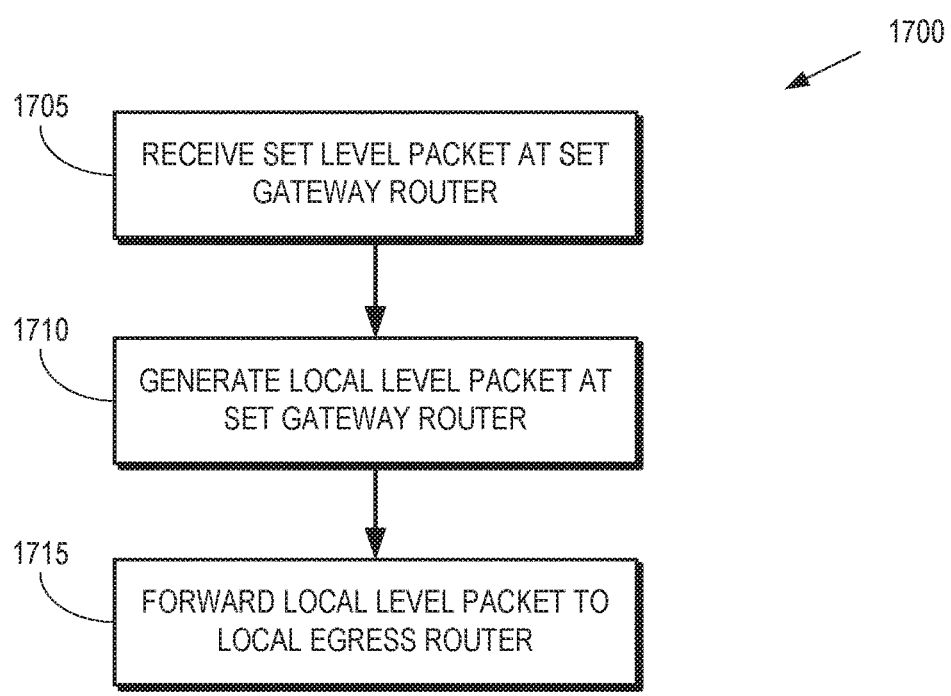
FIG. 17 is a flow diagram of a method of forwarding copies of set type multicast packets at a set gateway router according to some embodiments.

FIG. 17 is a flow diagram of a method 1700 of forwarding copies of set type multicast packets at a set gateway router according to some embodiments. The method 1700 is implemented in some embodiments of the communication system 700 shown in FIG. 7 and the communication system 1100 shown in FIG. 11.

At block 1705, the set gateway router receives a set level multicast packet. For example, the level of the multicast packet indicated in a header of the multicast packet is "set." At block 1710, the set gateway router generates a local level multicast packet using a copy of the set level multicast packet. In some embodiments, the set gateway router generates the local level multicast packet by mapping a bitstring identifier from the header of the multicast packet to an entry in a globally unique bitstring table that maps to a local bitstring, which identifies local egress routers. The set gateway router then generates a header that identifies the copy as a local level multicast packet and includes the bitstring. At block 1715, the set gateway router forwards the local level multicast packet, e.g., by multicasting the local level multicast packet.

For each new multicast flow, the ingress router programs the subdomain gateway routers and the set gateway routers (via a controller such as the SDN controller 1101 shown in FIG. 11) with the globally unique bitstring identifier. In the example of IP-TLV deployments, the egress routers are added or removed incrementally from the multicast flow (e.g., the program channel). All of the subscribers (and their corresponding egress routers) do not typically join or leave a channel at the same time, so the ingress router is configured to perform the updates in response to an individual subscriber (or egress router) joining or leaving the multicast flow. In some cases, the bitstring identifier programming latency on the subdomain or set gateway routers is not tolerable. The ingress router can therefore choose to begin sending packets that do not have a conventional packet type until programming of the subdomain/set gateway routers is done.

Figure 18:
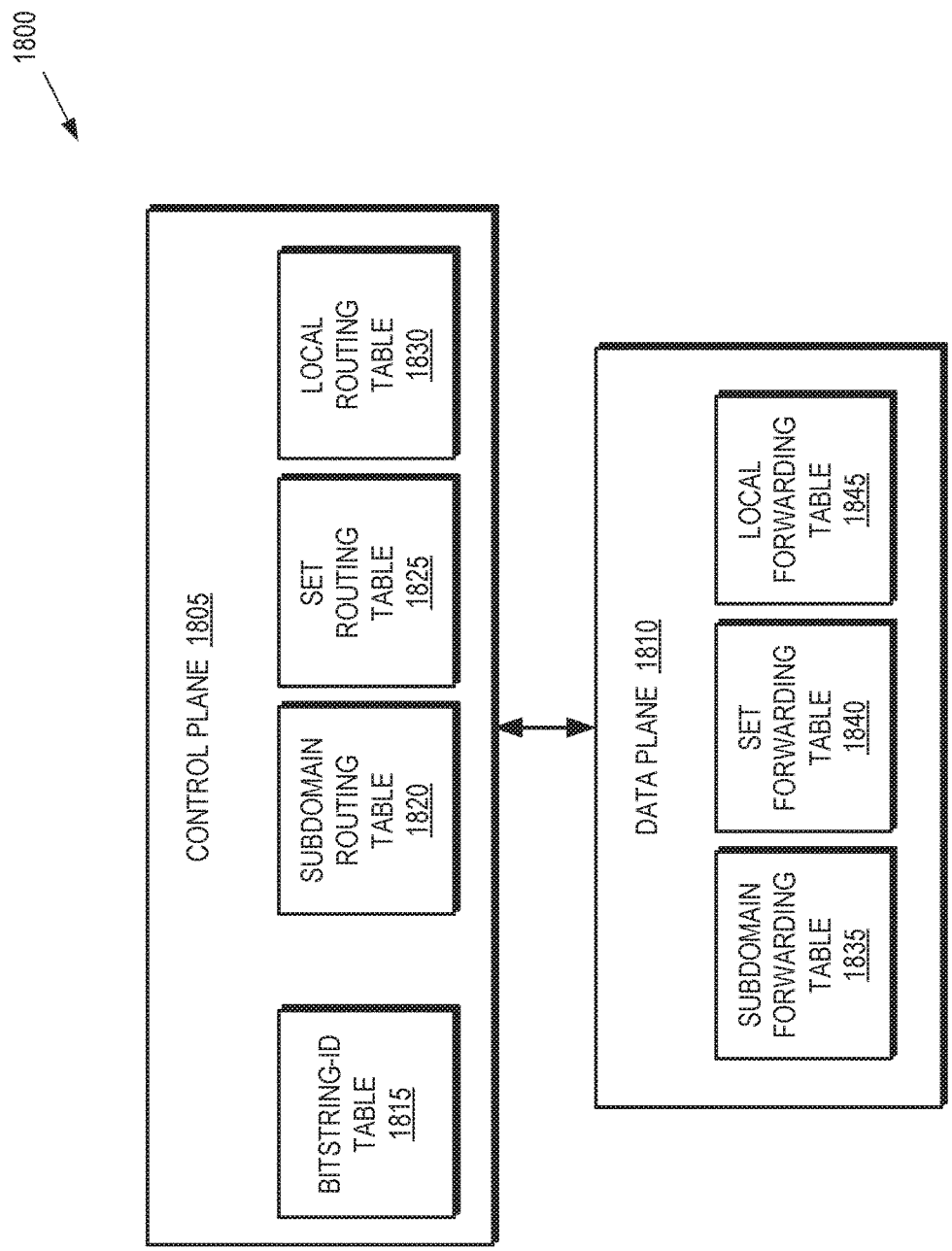
FIG. 18 is a block diagram of a router in a hierarchical domain according to some embodiments.

FIG. 18 is a block diagram of a router 1800 in a hierarchical domain according to some embodiments. The router 1800 is used to implement some embodiments of the routers in the communication system 700 shown in FIG. 7 and the communication system 1100 shown in FIG. 11. The router 1800 includes a control plane 1805 and a data plane 1810. As used herein, the term "control plane" refers to a portion of a routing architecture that is used to draw a network topology, which is represented in a routing table that defines what to do with incoming packets. As used herein, the term "data plane" defines the portion of the routing architecture that determines how to route packets that arrive on an inbound interface, e.g., using a forwarding table. The data plane is also referred to as the forwarding plane or the user plane.

The control plane 1805 includes a globally unique bitstring identifier table 1815 that maps globally unique bitstring identifiers to bitstrings, as discussed herein. The bitstring identifier table 1815 is programmed by a controller such as the SDN controller 1101 shown in FIG. 11. The control plane 1805 also includes routing tables for each level of the hierarchical domain. In the illustrated embodiment, the control plane 1805 includes a subdomain routing table 1820 that includes information used to define a routing of multicast packets to subdomain gateway routers, a set routing table 1825 that includes information used to define a routing of multicast packets to set gateway routers, and a local routing table 1830 that includes information used to define a routing of multicast packets to local egress routers.

The data plane 1810 includes forwarding tables for each level of the hierarchical domain. In the illustrated embodiment, the data plane 1810 includes a subdomain forwarding table 1835 that includes information used to forward multicast packets to subdomain gateway routers, a set forwarding table 1840 that includes information used to forward multicast packets to set gateway routers, and a local forwarding table 1845 that includes information used to forward all the multicast packets to local egress routers. The information in the subdomain routing table 1820, the set routing table 1825, and the local routing table 1830 are used to program the data plane 1810. In some embodiments, the data plane 1810 is programmed in response to a request transmitted from the data plane 1810 to the control plane 1805.

Figure 19:
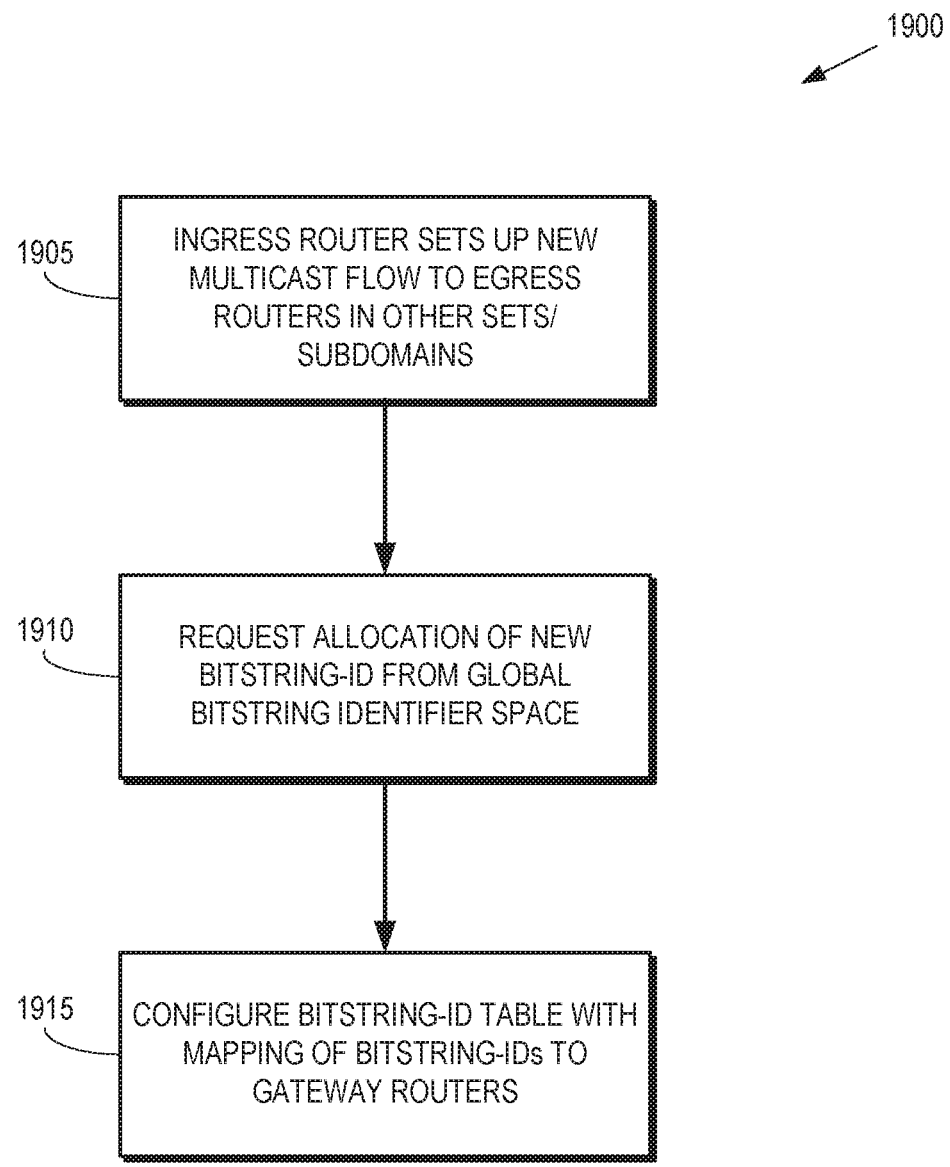
FIG. 19 is a flow diagram of a method of configuring a bitstring identifier table according to some embodiments.

FIG. 19 is a flow diagram of a method 1900 of configuring a bitstring identifier table according to some embodiments. The method 1900 is used to configure some embodiments of the bitstring identifier table 800 shown in FIG. 8, the bitstring identifier table 900 shown in FIG. 9, and the bitstring identifier table 1815 shown in FIG. 18. In some embodiments, the method 1900 is implemented in a system that uses a reliable transport channel such as TCP, SCTP, and the like. The transport channel operates according to IP and is efficient, e.g., has minimal delay, response time, high throughput, and the like. The protocol used to implement the method 1900 uses request/response transactions. Each message carries a message identifier, which can be locally unique. Responses include the same message identifier as the corresponding request so that the message identifier establishes a context of a unique request/response transaction.

At block 1905, an ingress router sets up a new multicast flow to multicast packets to egress routers in sets and domains, which may or may not be the same or different than the set and domain that include the ingress router.

At block 1910, the ingress router requests allocation of a new bitstring identifier for the new multicast flow from a global bitstring identifier space maintained at a controller such as the SDN controller 1101 shown in FIG. 11. The controller manages the global bitstring identifier space for the hierarchical domain. The ingress router therefore transmits a bitstring identifier request message to the controller. The bitstring identifier request message includes a message identifier. On receipt of the bitstring identifier request message, the controller allocates a new bitstring identifier in response to the ingress router with a bitstring identifier response that includes the message identifier from the request message.

At block 1915, a bitstring identifier table is configured with the mapping of bitstring identifiers to gateway routers. On receipt of the bitstring identifier response from the controller, the ingress router initiates a series of mapping request messages to the controller. The mapping request messages target different subdomain gateway routers or set gateway routers. For example, a mapping request message can include a message identifier, a subdomain gateway identifier, a bitstring identifier, and a set bitstring. The mapping request therefore identifies a subdomain gateway router that is to be programmed with a mapping of the bitstring identifier to the set bitstring. The set bitstring identifies the child set gateway identifiers for the flow. For another example, the mapping request message can include a message identifier, a set gateway identifier, a bitstring identifier, and a bitstring. The mapping request therefore identifies a set gateway router that is to be programmed with a mapping of the bitstring identifier to the bitstring that identifies the child egress routers for the flow.

In response to receiving the mapping request, the controller identifies the target subdomain gateway routers or set gateway routers indicated in the mapping request message. The controller can perform this identification by translating a subdomain gateway identifier or a set gateway identifier in the message to corresponding prefixes. The controller then creates the context for the message using the ingress router and the message identifier. The controller also sends a bitstring identifier table request message to the corresponding subdomain gateway routers or set gateway routers. Each subdomain gateway router or set gateway router that receives the bitstring identifier table request message uses a series of messages to establish the appropriate mappings that are used to configure the bitstring identifier table.

Figure 20:
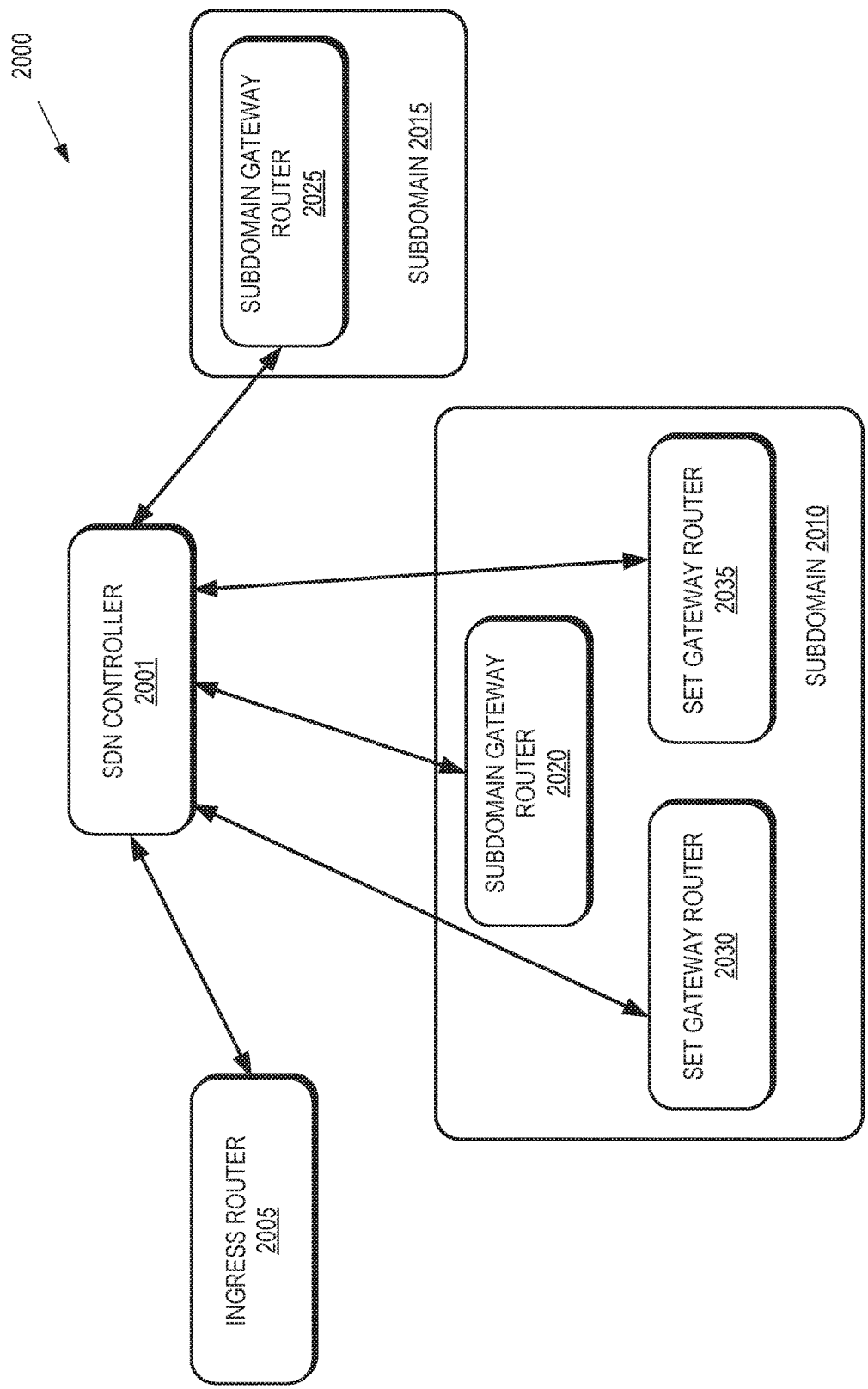
FIG. 20 is a block diagram of a communication system that implements a bitstring management protocol according to some embodiments.

FIG. 20 is a block diagram of a communication system 2000 that implements a bitstring management protocol according to some embodiments. The communication system 2000 represents portions of some embodiments of the communication system 700 shown in FIG. 7 and the communication system 1100 shown in FIG. 11. The communication system 2000 includes an SDN controller 2001 that corresponds to some embodiments of the SDN controller 701 shown in FIG. 7 and the SDN controller 1101 shown in FIG. 11. As discussed above with regard to FIG. 19, the bitstring management protocol uses request/response transactions to exchange messages carrying message identifiers that define a context for the request/response transaction.

An ingress router 2005 initiates a new multicast flow that multicasts packets to egress routers that are distributed across multiple subdomains 2010, 2015. Although two subdomains 2010, 2015 are shown in FIG. 20, some embodiments of the communication system 2000 include more subdomains. The subdomains 2010, 2015 include subdomain gateway routers 2020, 2025 that receive all multicast packets for egress routers within their corresponding subdomains 2010, 2015. As discussed herein, more than one subdomain gateway router can be provisioned in a subdomain to provide load-balancing, resiliency, or other functionality. The subdomains 2010, 2015 are partitioned into sets that are served by set gateway routers, such as the set gateway routers 2030, 2035.

In response to initiating the new multicast flow, the ingress router 2005 transmits a bitstring identifier request message to the SDN controller 2001. The message includes a message identifier that is generated by the ingress router 2005, which generates a unique message identifier for each message sent to the SDN controller 2001.

The SDN controller 2001 manages the global bitstring identifier space for the hierarchical domain. In response to receiving the bitstring identifier request message from the ingress router 2005, the SDN controller 2001 allocates a new bitstring identifier. The SDN controller 2001 then responds to the ingress router 2005 with a bitstring identifier response message that includes the message identifier from the request and the bitstring identifier. If the controller fails to allocate a bitstring identifier, then it returns a bitstring identifier with a value indicating an invalid request.

In response to receiving a bitstring identifier response from the SDN controller 2001, the ingress router 2005 determines whether the request is valid or not. If the received bitstring identifier indicates an invalid request, then the multicast flow set up fails. Otherwise, the ingress router 2005 initiates a series of bitstring identifier mapping request messages to the SDN controller 2001.

Each bitstring identifier mapping request message targets one of the subdomain gateway routers 2020, 2025 or the set gateway routers 2030, 2035. Mapping request messages directed to one of the subdomain gateway routers 2020, 2025 includes a tuple that identifies the subdomain gateway router that is to be programmed with a mapping of the bitstring identifier to the bitstring indicating one or more set gateway routers for the flow. Mapping request messages directed to one of the set gateway routers 2030, 2035 identify the set gateway routers that need to be programmed with a mapping of the bitstring identifier to a bitstring that indicates the child egress routers for the flow.

In response to receiving a bitstring identifier mapping request message, the SDN controller 2001 identifies the target subdomain gateway routers 2020, 2025 or target set gateway routers 2030, 2035 indicated in the message. The SDN controller performs this identification by translating a subdomain gateway identifier or set gateway identifier in the message to the corresponding prefixes. This translation is possible because the SDN controller 2001 maintains a database of all subdomain gateway routers and set gateway routers in the hierarchical domain, as discussed herein.

For each bitstring identifier mapping request message received from the ingress router 2005, the SDN controller 2001 creates a context of the message and sends a bitstring identifier table request message to the corresponding subdomain gateway routers 2020, 2025 or set gateway routers 2030, 2035. The message carries a tuple that includes the message identifier, a bitstring identifier, and a bitstring.

When one of the subdomain gateway routers 2020, 2025 receives a bitstring identifier table request message with the corresponding tuple, the subdomain gateway routers 2020, 2025 check if the bitstring is empty (all zeros). If so, the bitstring identifier entry is removed from the subdomain bitstring identifier table. If the bitstring is not empty, the subdomain gateway router 2020, 2025 is programmed with a mapping of the bitstring identifier to a bitstring that indicates one or more set gateway routers. The subdomain gateway routers 2020, 2025 then respond to the SDN controller 2001 with a bitstring identifier table response message containing the message identifier and an indication of whether the request succeeded or failed.

When one of the set gateway routers 2030, 2035 receives a bitstring identifier table request message with the corresponding tuple, the set gateway routers 2030, 2035 check if the bitstring is empty (all zeros). If so, the bitstring identifier entry is removed from the set bitstring identifier table. If the bitstring is not empty, the set gateway router 2030, 2035 is programmed with a mapping of the bitstring identifier to a bitstring that indicates one or more egress routers. The set gateway routers 2030, 2035 then respond to the SDN controller 20001 with a bitstring identifier table response message containing the message identifier and an indication of whether the request succeeded or failed.

When the SDN controller 2001 receives the bitstring identifier table response message from the subdomain gateway routers 2020, 2025 or the set gateway routers 2030, 2035, the SDN controller 2001 correlates the previously created context of the ingress router 2005 in response to the ingress router 2005 with a bitstring identifier mapping response message including the message identifier and an indication of whether the mapping succeeded or failed.

When the ingress router 2005 receives the bitstring identifier mapping response message, it includes the corresponding the subdomain gateway routers 2020, 2025 or set gateway routers 2030, 2035 in the multicast message flow. The ingress router 2005 can also use the preceding procedure to update existing mappings of bitstring identifiers to bitstrings in the subdomain gateway routers 2020, 2025 or the set gateway routers 2030, 2035. The ingress router 2005 tears down a multicast flow by deleting corresponding mappings of the bitstring identifier to the bitstring from the subdomain gateway routers 2020, 2025 or the set gateway routers 2030, 2035 using the aforementioned procedure. During teardown, the bitstring value in the bitstring mapping request messages are set to a predetermined value, such as zero, which results in deletion of the entries from the subdomain gateway routers 2020, 2025 or the set gateway routers 2030, 2035. Upon completion of the teardown procedure, the ingress router 2005 sends a bitstring identifier release message including a message identifier and a bitstring identifier to the SDN controller 2001, which frees up the bitstring identifier to a global pool in response to receiving the bitstring identifier release message.

Figure 21:
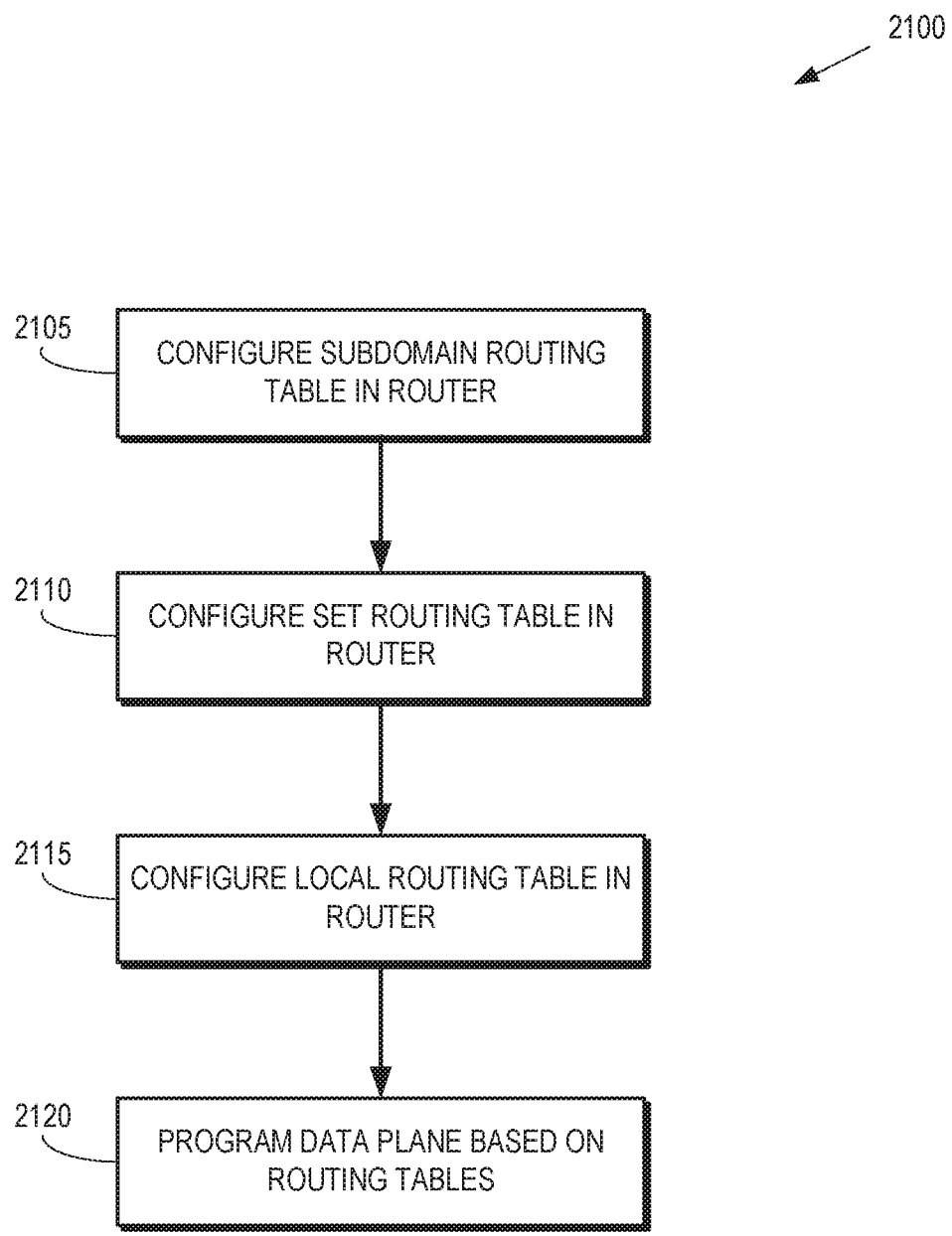
FIG. 21 is a flow diagram of a method of configuring routing tables in a control plane of a router according to some embodiments.

FIG. 21 is a flow diagram of a method 2100 of configuring routing tables in a control plane of a router according to some embodiments. The method 2100 is implemented in some embodiments of the communication system 700 shown in FIG. 7 and the communication system 1100 shown in FIG. 11. The method 2100 is used to configure some embodiments of the control plane 1805 in the router 1800 shown in FIG. 18.

At block 2105, a subdomain routing table is configured in the control plane of the router. In some embodiments, shortest paths from an ingress router to one or more egress routers are determined and used to configures the subdomain routing table. For example, a control protocol at the router maps a prefix assigned to a subdomain gateway router into a set of one or more equal-cost adjacencies using a Shortest Path First (SPF) algorithm. The equal-cost adjacencies are then used to determine entries in the subdomain routing table including next-hop information that indicates the next-hop router along routes from the router to the subdomain gateway routers in the hierarchical domain. Each router includes one subdomain routing table.

At block 2110, a set routing table is configured in the control plane of the router. In some embodiments, a control protocol at the router maps a prefix assigned to a set gateway router into a set of one or more equal-cost adjacencies using the SPF algorithm. The equal-cost adjacencies are used to configure the entries in the set routing table including next-hop information that indicates the next-hop router along routes from the router to the set gateway routers in the hierarchical domain. Each router includes one set routing table.

At block 2115, a local routing table is configured in the control plane of the router. The control protocol at the router identifies the local egress routers associated with the router and configures the local routing table with information that includes next-hop information that indicates the next-hop router along routes from the router to the local egress routers. Each router includes one local routing table.

At block 2120, the routing tables in the control plane of the router are used to program the data plane of the router. For example, the data plane of the router can send a programming request to the control plane of the router, which responds by providing information from the routing tables that is used to program forwarding tables in the data plane of the router.

Figure 22:
FIG. 22 is a subdomain gateway routing table according to some embodiments.

FIG. 22 is a subdomain gateway routing table 2200 according to some embodiments. The subdomain gateway routing table 2200 is configured using some embodiments of the method 2100 illustrated in FIG. 21. Each row of the subdomain gateway routing table 2200 is associated with a subdomain gateway router. The first column of the subdomain gateway routing table 2200 shows the bitstrings of the subdomain gateway routers as a number of bits that is equal to a bitstring length. The second column of the subdomain gateway routing table 2200 is the prefix of the subdomain gateway router associated with the entry. The third column is a routable IP address of an adjacent, next-hop router along a shortest path to reach the subdomain gateway router, e.g., as computed by the SPF algorithm. The maximum size of the subdomain gateway routing table 2200 is equal to the maximum number of subdomain gateway routers in the hierarchical domain.

Figure 23:
FIG. 23 is a set gateway routing table according to some embodiments.

FIG. 23 is a set gateway routing table 2300 according to some embodiments. The set gateway routing table 2300 is configured using some embodiments of the method 2100 illustrated in FIG. 21. Each row of the set gateway routing table 2300 is associated with a set gateway router. The first column of the set gateway routing table 2300 bitstrings of the set gateway routers represented as a number of bits that is equal to a bitstring. The second column of the set gateway routing table 2300 is the prefix of the set gateway router associated with the entry. The third column of the set gateway routing table 2300 is a routable IP address of an adjacent, next-hop router along a shortest path to reach the set gateway router, e.g., as computed by the SPF algorithm. The maximum size of the set gateway routing table 2300 is equal to the maximum number of set gateway routers in a subdomain of the hierarchical domain.

Figure 24:
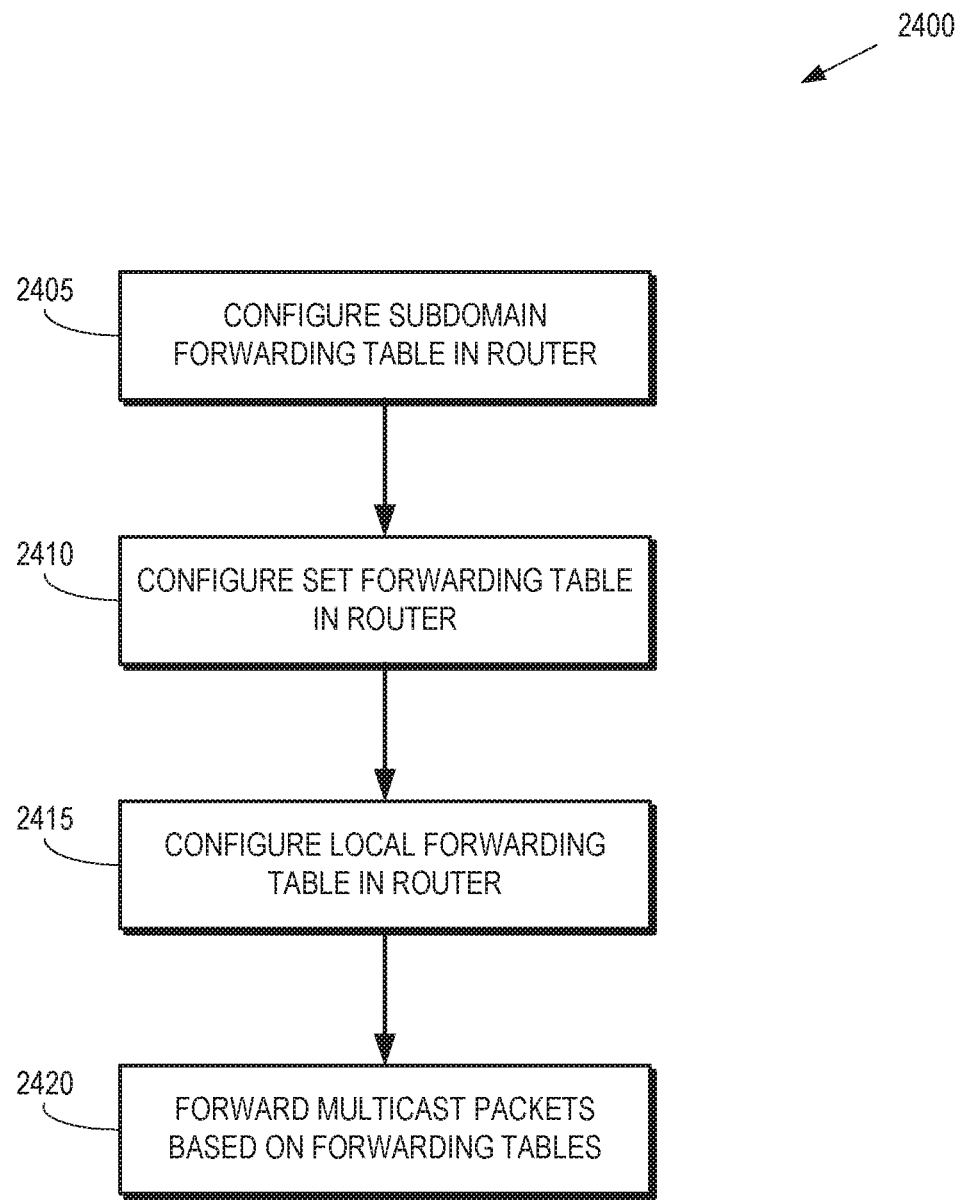
FIG. 24 is a flow diagram of a method of configuring forwarding tables in a data plane of a router according to some embodiments.

FIG. 24 is a flow diagram of a method 2400 of configuring forwarding tables in a data plane of a router according to some embodiments. The method 2400 is implemented in some embodiments of the communication system 700 shown in FIG. 7 and the communication system 1100 shown in FIG. 11. The method 2400 is used to configure some embodiments of the data plane 1810 in the router 1800 shown in FIG. 18.

At block 2405, a subdomain forwarding table in a data plane of the router is configured, e.g., based on information in a corresponding subdomain routing table in a control plane of the router. The subdomain forwarding table is indexed based on bitstrings of the subdomain gateway routers. In some cases, multiple entries in the subdomain forwarding table share the same next-hop router. A forwarding bit mask is generated by taking a bitwise OR of the bitstrings of the subdomain gateway routers that share the same next-hop router.

At block 2410, a set forwarding table in the data plane of the router is configured, e.g., based on information in a corresponding set routing table in the control plane of the router. The set routing table is indexed based on bitstrings of the set gateway routers. In some cases, multiple entries in the set forwarding table share the same next-hop router. A forwarding bit mask is generated by taking a bitwise OR of the bitstrings of the set gateway routers that share the same next-hop router.

At block 2415, a local forwarding table in the data plane of the router is configured, e.g., based on information in a corresponding local routing table in the control plane of the router. The local forwarding table is indexed based on bitstrings of the egress routers in the set that includes the router.

At block 2420, the data plane of the router forwards multicast packets received at the data plane of the router based on the subdomain, set, and local forwarding tables.

FIG. 25 is a subdomain gateway forwarding table 2500 according to some embodiments. The subdomain gateway forwarding table 2500 is configured using some embodiments of the method 2400 illustrated in FIG. 24. Each row of the subdomain gateway forwarding table 2500 is associated with a subdomain gateway router. The first column of the subdomain gateway forwarding table 2500 shows the bitstrings of the sub domain gateway routers as a number of bits that is equal to a bitstring length. The second column of the subdomain gateway forwarding table 2500 is a forwarding bit mask. For example, the first, third, and fourth entries in the subdomain gateway forwarding table 2500 share the same next-hop router (Ra) and so the forwarding bit mask for these entries is formed using a bitwise OR of the bitstrings for these entries. The third column is a routable IP address of an adjacent, next-hop router along a shortest path to reach the subdomain gateway router, e.g., as computed by the SPF algorithm. The maximum size of the subdomain gateway forwarding table 2500 is equal to the maximum number of subdomain gateway routers in the hierarchical domain.

FIG. 26 is a set gateway forwarding table 2600 according to some embodiments. The set gateway forwarding table 2600 is configured using some embodiments of the method 2400 illustrated in FIG. 24. Each row of the set gateway forwarding table 2600 is associated with a set gateway router. The first column of the set gateway forwarding table 2600 shows the bitstrings of the set gateway routers as a number of bits that is equal to a bitstring length. The second column of the set gateway forwarding table 2600 is a forwarding bit mask. For example, the first and third entries in the set gateway forwarding table 2600 share the same next-hop router (Ra) and so the forwarding bit mask for these entries is formed using a bitwise OR of the bitstrings for these entries. The third column is a routable IP address of an adjacent, next-hop router along a shortest path to reach the set gateway router, e.g., as computed by the SPF algorithm. The maximum size of the set gateway forwarding table 2600 is equal to the maximum number of set gateway routers in a subdomain of the hierarchical domain.

Figure 27:
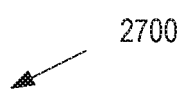
FIG. 27 is a local gateway forwarding table according to some embodiments.

FIG. 27 is a local gateway forwarding table 2700 according to some embodiments. The local gateway forwarding table 2700 is configured using some embodiments of the method 2400 illustrated in FIG. 24. Each row of the local gateway forwarding table 2700 is associated with a local egress router. The first column of the local gateway forwarding table 2700 shows the bitstrings of the local egress routers as a number of bits that is equal to a bitstring length. The second column of the local gateway forwarding table 2700 is a forwarding bit mask. For example, the first, third, and fourth entries in the local gateway forwarding table 2700 share the same next-hop router (Ra) and so the forwarding bit mask for these entries is formed using a bitwise OR of the bitstrings for these entries. The third column is a routable IP address of an adjacent, next-hop router along a shortest path to reach the local egress router, e.g., as computed by the SPF algorithm. The maximum size of the local gateway forwarding table 2700 is equal to the maximum number of set gateway routers in a subdomain of the hierarchical domain.

A data plane of a router in a hierarchical domain encapsulates packets using data plane headers. FIG. 31 is a generic data plane header for H-BIER packets according to some embodiments. This generic data plane header for H-BIER shares similar format as the conventional BIER header. However, the semantics of BIFT-id and Ver fields differ between H-BIER and BIER, which distinguishes between H-BIER and conventional BIER packets.

The definition of the fields are as follows:

BIFT-id: The semantics of BIFT-id in H-BIER is different from that in BIER. In conventional BIER, the BIFT-id is used to identify a bit index forwarding table (BIFT) corresponding to combination of a subdomain and a set. In H-BIER, the BIFT-id identifies that it is an H-BIER packet and thus distinguishes itself from the conventional BIER packets.

In an MPLS network, BIFT-id is an MPLS label which is allocated and advertised by a router to receive H-BIER packets (only). Any packet received with that label is identified as H-BIER packet. Since BIFT-id is an MPLS label, its value may be changed as an H-BIER packet goes from BFR to BFR.

In non-MPLS network, a domain wide unique BIFT-id must be allocated to indicate H-BIER packet.

TC:

The "Traffic Class" field [RFC5462] has its usual meaning in an MPLS label stack entry.

S Bit:

When an H-BIER packet is traveling through an MPLS network, the high-order 20 bits of the initial four octets of the H-BIER encapsulation contain an MPLS label in the BIFT-id field. These four octets are treated as the final entry in the packet's MPLS label stack. Hence, the S bit (see [RFC3032]) must be set to 1. If there are any MPLS label stack entries immediately preceding the H-BIER encapsulation, the S bit of those label stack entries MUST be set to 0.

TTL:

This is the usual MPLS "Time to Live" field [RFC3032]. When an H-BIER packet is received, its "incoming TTL" (see below) is taken from this TTL field.

When an H-BIER packet is forwarded to one or more BFR adjacencies, the H-BIER-MPLS label carried by the forwarded packet must have a TTL field whose value is one less than that of the packet's incoming TTL.

If an H-BIER packet's incoming TTL is 1 or greater and one of the bits in its BitString identifies the current router, then the current router is a "terminating" router, i.e egress router or set gateway router or subdomain gateway router for the packet. Therefore, the current router must process the packet as a terminating router.

If the incoming TTL is 0, the packet is considered to be "expired". If the incoming TTL is 1 and the BitString has a bit set that does not identify the current router, the packet is also considered to be expired. Expired packets should be passed to an error-handling procedure. (Optional implementation-specific rate limiting may be applied to control the rate at which packets are passed to the error-handling procedure.) Specification of the error-handling procedure is outside the scope of this invention.

Note that if a received H-BIER packet has an incoming TTL of 1 and its BitString has a bit set identifying the current router, the payload must be processed by the current router, but the packet must not be forwarded further, and the packet should also be passed to the error-handling procedures for expired packets (subject to any implementation-specific rate limiting).

Nibble:

This field is set to the binary value 0101; this ensures that the MPLS ECMP logic will not confuse the remainder of the H-BIER header with an IP header or with the header of a pseudowire packet. In an MPLS network, if a router receives a H-BIER packet with any other value in the first nibble after the label stack, it should discard the packet and log an error.

Ver:

Conventional BIER header uses Ver=0. This invention introduces Ver=1,2,3,4 to be used for H-BIER packets.

Ver=1 indicates local type packet
Ver=2 indicates set type packet
Ver=3 indicates subdomain type packet
Ver=4 indicates conventional type packet. This allows a conventional BIER mode of packet to be encoded as H-BIER header. The benefit of this method is that it does not require a router to allocate a unique BIFT-id (or MPLS Label) for each combination of subdomain and set. The conventional BIER packet is sent or received in H-BIER header, which requires only 1 unique BIFT-id (or MIMS Label) to be allocated by a router to identify any H-BIER packets.

BSL:

This 4-bit field encodes the length in bits of the BitString. If k is the length of the BitString, the value of this field is log 2(k)-5. However, only certain values are supported:

1: 64 bits
2: 128 bits
3: 256 bits
4: 512 bits
5: 1024 bits
6: 2048 bits
7: 4096 bits An implementation may set to any value other than those listed above. A received packet containing a value in this field that is not supported by an implementation should be discarded and an error logged.

Entropy:

This 20-bit field specifies an "entropy" value that can be used for load-balancing purposes. The H-BIER forwarding process may do equal-cost load balancing, in which case the load-balancing procedure must choose the same path for any two packets that have the same entropy value and the same BitString.

If an ingress router is encapsulating (as the payload) MPLS packets that have entropy labels, the ingress router must ensure that if two such packets have the same MPLS entropy label they also have the same value of the H-BIER entropy field.

OAM:

By default, these two bits are set to 0 by the ingress router and are not modified by other routers. These two bits have no effect on the path taken by a H-BIER packet and have no effect on the quality of service applied to a H-BIER packet. The use of these bits in other than the default manner is optional.

Rsv:

These two bits are currently unused. They should be set to 0 upon transmission and MUST be ignored upon reception.

DSCP:

By default, this 6-bit field is not used in MPLS networks. The default behavior is that all six bits should be set to 0 upon transmission and must be ignored upon reception. Non-default use of this field in MPLS networks is outside the scope of this document.

Proto:

This 6-bit "Next Protocol" field identifies the type of the payload. (The "payload" is the packet or frame immediately following the H-BIER header.) IANA has created a registry called "BIER Next Protocol Identifiers". This field is to be populated with the appropriate entry from that registry.

If an egress router receives a H-BIER packet but does not recognize (or does not support) the value of the Next Protocol field, the egress router should discard the packet and log an error.

BFIR-id:

By default, this is the identifier of the ingress router, in the subdomain to which the packet has been assigned. The BFIR-id is encoded in the 16-bit field as an unsigned integer in the range [1,65535]. BFIR-id field is composed of set identifier of the ingress router and the identifier of the ingress router (aka bitstring) within the set. For example, let's say BSL configured in a subdomain is 256 bits and set identifier is 2 and identifier of the ingress router is 10 then BFIR-id is (2×256)+10=522. Certain applications may require that the BFIR-id field contain the identifier of a router other than the ingress router. However, that usage of the BFIR-id field is outside the scope of this invention.

Variable: This part depends on the specific version type, which is described in type specific headers as below.

FIG. 32 is an example of a local type packet header according to some embodiments. This packet type is encoded with Ver=1 to indicate local type. The variable part consists of BitString that encodes the destination egress routers.

FIG. 33 is an example of a set type packet header according to some embodiments. This packet type is encoded with Ver=2 to indicate set type. The variable part consists of SET-BitString that encodes the destination set gateway routers, and bitstring identifier FIG. 34 is an example of a subdomain type packet header according to some embodiments. This packet type is encoded with Ver=3 to indicate subdomain type packet. The variable part consists of SUBDOMAIN-BitString that encodes the destination subdomain gateway routers, and bitstring identifier.

Figure 35:
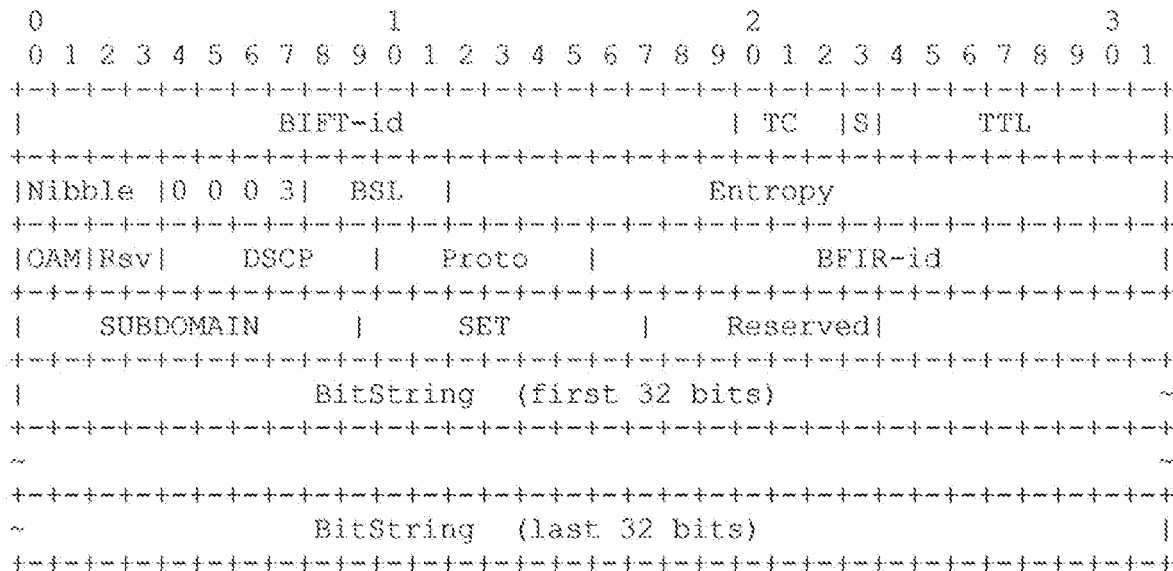
FIG. 35 is an example of a packet header for an "other" type such as a conventional BIER packet according to some embodiments.

FIG. 35 is an example of a packet header for an "other" type such as a conventional BIER packet according to some embodiments. This packet type is encoded with Ver=4 to indicate conventional type. The variable part consists of the subdomain identifier, set identifier and the BitString that encodes the egress routers within the subdomain and set. The Reserved fields must be sent as 0s and should be ignored by receiver.

Some embodiments of an ingress router perform multicasting of a packet of the multicast flow according to the following algorithm/pseudocode, which utilizes the terminology:

BFER=Bit Forwarding Egress Router (aka egress routers in this document)
BFR=Bit Forwarding Router (i.e a router that forwards H-BIER packets)
SD=Subdomain or Subdomain Identifier.
SI=Set or Set Identifier
SD-BFR=Subdomain gateway router
SI-BFR=Set Gateway Router F-BM=Forwarding bit mask
BIFT=Bit Index Forwarding Table (i.e subdomain gateway forwarding table OR
set gateway forwarding table or local forwarding table)
SD-BIFT=Subdomain forwarding table
SI-BIFT=Set forwarding table
LC-BIFT=Local forwarding table
SDBitString=Bitstring of subdomain gateway routers
SIBitString=Bitstring of set gateway routers
BitString=Bitstring of egress routers.

```
void HBIER_Multicast(Payload, List_of_all_BFERs)
{
    Initialize following lists:
    BFER_List_A = 0;
    BFER_List_B = 0;
    BFER_List_C = 0;
    for each BFER in List_of_all_BFERs
    {
        if BFER belongs to local BFR-set
        {
            insert BFER into BFER_List_A
        }
        else if BFER belongs to foreign BFR-set in local SD
        {
            insert BFER into BFER_List_B
        }
        else if BFER belongs to foreign SD
        {
            Insert BFER into BFER_List_C
        }
    }
    if BFER_List_A is non-empty
    {
        Set BitString = 0
        for each BFER in BFER_List_A
        {
            BitString |= BitString of the BFER;
        }
        Build Packet as follows:
        Packet_A= {Type=Group-A, BitString} encoded in H-BIER Header of Figure 17 + Payload.
        Call ForwardBitStringPacket(Packet_A);
    }
    if (BFER_List_B OR BFER_List_C non-empty)
    {
        if BitString-id does not exist for flow
        {
            SendBitStringIdRequest( );
            Wait till BitStringIdResponse( );
        }
```

Resume_Forwarding:

```
        if BFER_List_B is non-empty
        {
            Set SIBitString = 0
            for each BFER in BFER_List_B
            {
                SIBitString |= ConvertToBitString(BFR-set of the BFER - 1);
            }
            Build Packet as follows:
            Packet_B= {Type=Group-B, SI-BitString, BitString-id} encoded in H-BIER Header of Figure 18 + Payload.
            Call ForwardBitStringPacket(Packet_B);
        }
        if BFER_List_C is non-empty
        {
            Set SDBitString = 0
            for each BFER in BFER_List_C
            {
                SDBitString |= IndexToBitString(SD of the BFER - 1);
            }
```

```
            Build Packet as follows:
            Packet _C = {Type=Group-C, SD-BitString, BitString-id} encoded in H-BIER Header of Figure 19 + Payload.
            Call ForwardBitStringPacket(Packet_C);
        }
    }
}
// Forwards a BIER packet to appropriate adjacent next-hop(s)
void ForwardBitStringPacket (Packet)
{
    if Packet->Type == Group-A
    {
        BitStringToUse = Packet->BitString;
        BIFT           = LC-BIFT;
    }
    else if Packet->Type == Group-B
    {
        BitStringToUse = Packet->SIBitString;
        BIFT           = SI-BIFT;
    }
    else
    {
        BitStringToUse = Packet->SDBitString;
        BIFT           = SD-BIFT;
    }
    for (Index = GetFirstBitPosition(BitStringToUse); Index ;
            Index = GetNextBitPosition(BitStringToUse, Index)) {
        F-BM = BIFT[Index]->F-BM;
        if (!F-BM) continue;
        Next-hop = BIFT[Index]->Next-hop;
        PacketCopy = Copy(Packet);
        if PacketCopy->Type == Group-A
        {
            PacketCopy->BitString &= F-BM;
        }
        else if PacketCopy->Type == Group-B
        {
            PacketCopy->SIBitString &= F-BM;
        }
        else PacketCopy->Type == Group-C
        {
            PacketCopy->SDBitString &= F-BM;
        }
        PacketSend(PacketCopy, Next-hop);
        BitStringToUse &= ~F-BM;
    }
}
void SendBitStringIdRequest( )
{
    Sends BitString-id request to SDN controller using Control Plane methods
    (see Section 6.3.1)
}
// Handles BitString-id response from SDN Controller.
void BitStringIdResponse(BitString-id)
{
    goto Resume_Forwarding;
}
```

For optimality, an implementation of the above algorithm prebuilds the requisite H-BIER headers for a flow and precomputes the adjacent next-hops per H-BIER header. Then for every packet in the flow, the ingress router makes copies for each prebuilt H-BIER header and forwards the copies to their precomputed next-hops.

Some embodiments of routers in a hierarchical domain process received multicast packets according to the following algorithm.

```
void Process_HBIER_Packet (Packet)
{
    if Packet->Type == Group-A
    {
        BitStringToUse = Packet->BitString;
```

```
            BIFT          = LC-BIFT;
    }
    else if Packet->Type == Group-B
    {
        BitStringToUse = Packet->SIBitString;
        BIFT          = SI-BIFT;
    }
    else if Packet->Type == Group-C
    {
        BitStringToUse = Packet->SDBitString;
        BIFT          = SD-BIFT;
    }
    else
    {
        // Must be Packet->Type == Group-D, the state-of-the-art BIER
packet.
        // If SD of the packet is external SD then "unicast" to external
SD-BFR
        if (Packet->SD != local-SD) && (BFR is not SD-BFR)
        {
            // Lookup next-hop for SD-BFR-id (= always
            Packet->SD + 1)
            Next-hop = SD-BIFT[Packet->SD + 1];
            // Forward the packet to SD-BFR unmodified.
            PacketSend(Packet, Next-hop);
            Forwarding done;
        }
        // If SI of the packet is external SI in same SD then "unicast"
to
        // external SI-BFR
        if (Packet->SI != local-SI) && (BFR is not SI-BFR)
        {
            // Lookup next-hop for SI-BFR-id (= always
            Packet->SI + 1)
            Next-hop = SI-BIFT[Packet->SI + 1];
            // Forward the packet to SI-BFR unmodified.
            PacketSend(Packet, Next-hop);
            Forwarding done;
        }
        // BFR is SI-BFR for Packet->SI.
        // Convert Packet->Type from Group-D->Group-A.
        Remove(Packet->SD);
        Remove(Packet->SI);
        Packet->Type = Group-A;
    }
    for (Index = GetFirstBitPosition(BitStringToUse); Index ;
            Index = GetNextBitPosition(BitStringToUse, Index)) {
        if (Packet->Type == Group-A)
        {
            if Index is BFR's BitString
            {
                PacketCopy = Copy(Packet);
                SendToMulticastOverlay(PacketCopy->Payload);
                BitStringToUse &= ~(IndexToBitString(Index));
                continue;
            }
        }
        else if PacketCopy->Type == Group-B
        {
            if this is SI-BFR and Index is local SI-BFR-id
            {
                PacketCopy = Copy(Packet);
                Process_SI_BFR(PacketCopy);
                BitStringToUse &= ~(IndexToBitString(Index));
                continue;
            }
        }
        else PacketCopy->Type == Group-C
        {
            if this is SD-BFR and Index is local SD-BFR-id
            {
                PacketCopy = Copy(Packet);
                Process_SD_BFR(PacketCopy);
                BitStringToUse &= ~(IndexToBitString(Index));
                continue;
            }
        }
        F-BM = BIFT[Index]->F-BM;
        if (!F-BM) continue;
        Next-hop = BIFT[Index]->Next-hop;
        PacketCopy = Copy(Packet);
        if PacketCopy->Type == Group-A
        {
            PacketCopy->BitString &= F-BM;
        }
        else if PacketCopy->Type == Group-B
        {
            PacketCopy->SIBitString &= F-BM;
        }
        else PacketCopy->Type == Group-C
        {
            PacketCopy->SDBitString &= F-BM;
        }
        PacketSend(PacketCopy, Next-hop);
        BitStringToUse &= ~F-BM;
    }
}
// Algorithm for processing Group-B packet at SI-BFR
void Process_SI_BFR(Packet)
{
    // Gets the BitString of BFERs mapped by the Packet->BitStringId
    BitString = SI-BitString-id-Table[Packet->BitStringId];
    // Convert packet type from Group-B->Group-A
    Remove(Packet->SIBitString);
    Remove(Packet->BitStringId);
    Packet->Type    = Group-A.
    Packet->BitString = BitString;
    // Forward Group-A packet to BFERs.
    for (Index = GetFirstBitPosition(Packet->BitString); Index ;
            Index = GetNextBitPosition(Packet->BitString, Index)) {
        F-BM = LC-BIFT[Index]->F-BM;
        if (!F-BM) continue;
        Next-hop    = LC-BIFT[Index]->Next-hop;
        PacketCopy = Copy(Packet);
        PacketCopy->BitString &= F-BM;
        PacketSend(PacketCopy, Next-hop);
        Packet->BitString &= ~F-BM;
    }
}
// Algorithm for processing Group-C packet at SD-BFR
void Process_SD_BFR(Packet)
{
    // Gets the BitString of SI-BFRs mapped by the Packet->BitStringId
    SIBitString = SD-BitString-id-Table[Packet->BitStringId];
    // Convert packet type from Group-C->Group-B
    Remove(Packet->SDBitString);
    Packet->Type    = Group-B.
    Packet->SIBitString = SIBitString;
    // Forward Group-B packet to SI-BFRs.
    for (Index = GetFirstBitPosition(Packet->SIBitString); Index ;
            Index = GetNextBitPosition(Packet->SIBitString, Index)) {
        F-BM = SI-BIFT[Index]->F-BM;
        if (!F-BM) continue;
        Next-hop    = SI-BIFT[Index]->Next-hop;
        PacketCopy = Copy(Packet);
        PacketCopy->SIBitString &= F-BM;
        PacketSend(PacketCopy, Next-hop);
        Packet->SIBitString &= ~F-BM;
    }
}
```

In the following, a router is referred to as a BFR, a subdomain gateway router is SD-BFR, a set gateway router is SI-BFR, a routing table is BIRT, and a forwarding table is BIFT. In some embodiments, the control plane distributes H-BIER information of a router across the H-BIER domain. Thus, a router in the H-BIER domain receives H-BIER information of all other routers in the H-BIER domain. Based on this information a router builds the routing or forwarding tables. The H-BIER information is also received by SDN Controller. The H-BIER information consists of the following:

a) Routers subdomain and set, Prefix->BFR-id mapping.
b) SD-BFR's BFR-Prefix->SD-BFR-id mapping.
c) SI-BFR's BFR-Prefix->SI-BFR-id mapping.

d) BFR's label/index which is to be encoded as BIFT-id in BIER header, for all H-BIER packets sent to the BFR.

State-of-the-art BIER uses the IGPs (OSPF, IS-IS, BGP-LS) as the control plane to distribute BIER information. This section leverages the existing BIER extensions to IGPs wherever applicable, and defines novel methods wherever necessary. This section describes the methods and procedures required in H-BIER control plane to perform a, b, c & d.

Methods of H-BIER Control Plane in IS-IS

A type-length value (TLV) structure can be used to carry BIER information a) from above. This Sub-TLV is carried within one of the following prefix-reachability TLV types in IS-IS.

Types 235, 237 defined in RFC 5120
Type 135 defined in RFC 5305
Type 236 defined in RFC 5308

The prefix-reachability TLV carries the BFR-Prefix, and the BIER Info Sub-TLV carries the attributes of the BFR-Prefix. In this invention, we collectively term any of these prefix-reachability TLV types mentioned below as "BFR-Prefix Reachability TLV".

H-BIER Info Sub-TLV

Figure 36:
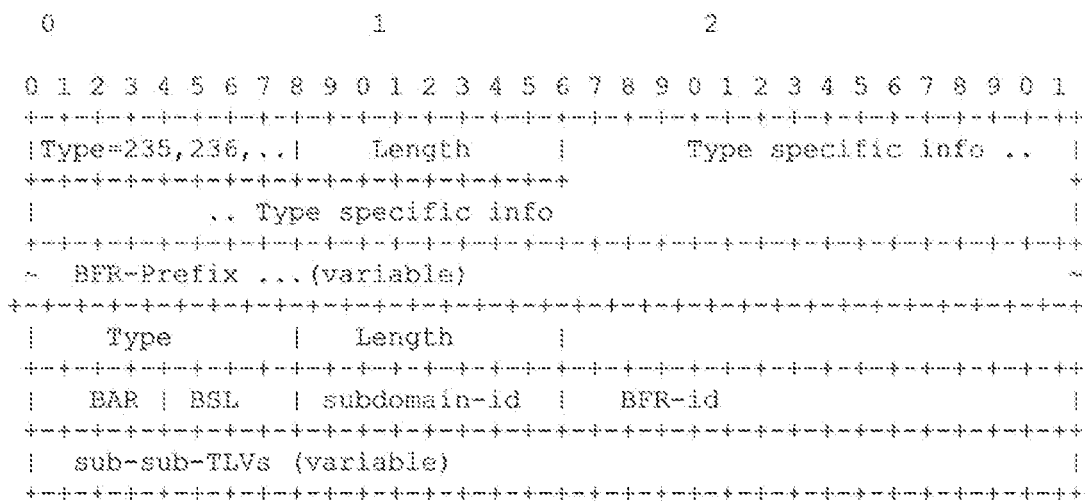
FIG. 36 illustrates a sub-TLV according to some embodiments.

In some embodiments, a new H-BIER Info Sub-TLV is defined to advertise H-BIER information a, b, c and d. H-BIER Info Sub-TLV MUST be carried within a BFR-Prefix Reachability TLV. Presence of this Sub-TLV also indicates that the advertising BFR supports the H-BIER methods disclosed herein. The BFR-Prefix Reachability TLV carries the BFR-Prefix, and the H-BIER Info Sub-TLV carries the attributes of the BFR-Prefix. FIG. 36 illustrates a sub-TLV according to some embodiments.

The H-BIER Info Sub-TLV carries the following important fields.

- Type=Value 33 is proposed for H-BIER Info Sub-TLV type. If the implementation is standardized then need to reserve at IANA registry https://www.iana.org/assignments/isis-tiv-codepoints/isis-tiv-codepoints.xhtml#tiv-codepoints
- BAR=BIER Algorithm. It specifies the algorithm to be used when calculating optimal path to the BFR-Prefix. As of now, type 0 is supported which means use Shortest Path First (SPF) algorithm to compute reachability to the BFR-Prefix.
- BSL=Bit String Length. This field carries the values defined for the BSL field in BIER header (Look at BSL definition in section 2.1.2 in [BIER-ENCAP]). From the BSL, the SI can be computed from BFR-id. For example, if BFR-id is 334 and BSL indicates 256 bits then SI=1.
- Subdomain-id=the SD where the BFR resides.
- BFR-id=The 2-octet field carrying BFR-id (Keep in mind that SI is part of this BFR-id as mentioned above).
- Sub-Sub-TLVs=H-BIER Info Sub-TLV can carry one or more OPTIONAL Sub-Sub-TLVs. This invention defines the following Sub-Sub-TLVs.
  - SD-BFR Sub-Sub-TLV
  - SI-BFR Sub-Sub-TLV
  - MPLS Encapsulation Sub-Sub-TLV SD-BFR Info Sub-Sub-TLV This OPTIONAL Sub-Sub-TLV carries information on b. This Sub-Sub-TLV is advertised by a BFR that is configured as SD-BFR. FIG. 37 illustrates a format of SD-BFR Info Sub-Sub-TLV according to some embodiments.

Type=Type 1 is assigned as discussed herein.
Length=1
Value=The 1-octet value carries the SD-BFR-id assigned to this SD-BFR.

SI-BFR Info Sub-Sub-TLV

This OPTIONAL Sub-Sub-TLV carries information on c. This Sub-Sub-TLV MUST be advertised by a BFR that is configured as SI-BFR. FIG. 38 illustrates a format of SI-BFR Info Sub-Sub-TLV according to some embodiments.

Type=Type 2 is assigned by as discussed herein.
Length=1
Value=The 1-octet value carries the SI-BFR-id assigned to this SI-BFR.

MPLS Encapsulation Sub-Sub-TLV

This OPTIONAL Sub-Sub-TLV carries the information d. MPLS Encapsulation Sub-Sub-TLV MUST be sent if BFR receives H-BIER packet on MPLS network. FIG. 39 illustrates a format of a Sub-Sub-TLV according to some embodiments.

The Label value represents the BIFT-id in BIER header, that is to be used to send H-BIER packets to this BFR.

Originating BFR Procedures

The section describes the procedures followed by a H-BIER capable BFR while advertising H-BIER information. The BFR advertises the BFR-Prefix in the appropriate BFR-Prefix Reachability TLV, that includes the H-BIER Info Sub-TLV. In the exemplary topology in FIG. 15, all BFRs R1-R20 advertises this information across the H-BIER domain. The BFR MAY also include BIER Info Sub-TLV in the advertisement, if it intends to support both H-BIER and state-of-the-art BIER methods. If the BFR is configured to send or receive H-BIER packets on MPLS network, then it MUST send MPLS Encapsulation sub-sub-TLV. The Label value is the label that the BFR will use to receive H-BIER packets. If the BFR is configured as SD-BFR then it MUST include SD-BFR Info Sub-Sub-TLV to advertise its SD-BFR-id. If the BFR is configured as SI-BFR then it include SI-BFR Info Sub-Sub-TLV to advertise its SI-BFR-id.

Receiving BFR Procedures

A H-BIER Capable BFR that receives a BFR-Prefix Reachability TLV with H-BIER Info Sub-TLV, applies the following procedure, which utilizes the terminology:

SD-BIRT=Subdomain routing table
SI-BIRT=Set routing table
LC-BIRT=Local routing table 1. Receiving BFR MUST check for uniqueness of the received BFR-id for a given SD. If duplication is detected (i.e same BFR-id is already received from another BFR-Prefix), then all BFRs advertising that BFR-id MUST be treated as if they didn't advertise a valid BFR-id.
2. If the BAR value in H-BIER Info Sub-TLV does not match the locally configured value, must report misconfiguration.
3. If H-BIER Sub-TLV indicates that the advertising BFR belongs to same {SD, SI} as the receiving BFR, then receiving BFR computes reachability to BFR-Prefix using BAR and installs the route into BIRT with BFR-id as index. If {SD, SI} is not same then no path computation is performed.
4. If it carries a SD-BFR Info Sub-Sub-TLV and SD of advertising BFR is different from local SD then receiving BFR computes reachability to BFR-Prefix using BAR and installs the route info SD-BIRT with SD-BFR-id as index (as shown in FIG. 11). Note that it is valid to receive same SD-BFR-id from multiple BFR-Prefixes within a SD, since multiple SD-BFRs can be assigned the same SD-BFR-id for load balancing, resiliency. Only the BFR-Prefix(es) that leads to the most optimal path should be installed in SD-BIRT.
5. If it carries a SI-BFR Info Sub-Sub-TLV and SI of advertising BFR is different from local SI then receiving BFR computes reachability to BFR-Prefix using BAR and installs the route info SI-BIRT with SI-BFR-id as index (as shown in FIG. 12). Note that it is valid to receive same SI-BFR-id from multiple BFR-Prefixes within a SI, since multiple SI-BFRs can be assigned the same SI-BFR-id for load balancing, resiliency. Only the BFR-Prefix(es) that leads to the most optimal path should be installed in SI-BIRT.
6. If it contains MPLS Encapsulation Sub-Sub-TLV then the Label value it carries MUST be used to send MPLS encapsulated H-BIER packets to the advertising BFR (if it is the immediate next-hop for those H-BIER packets).

Methods of H-BIER Control Plane in OSPF
H-BIER Sub-TLV

Figure 40:
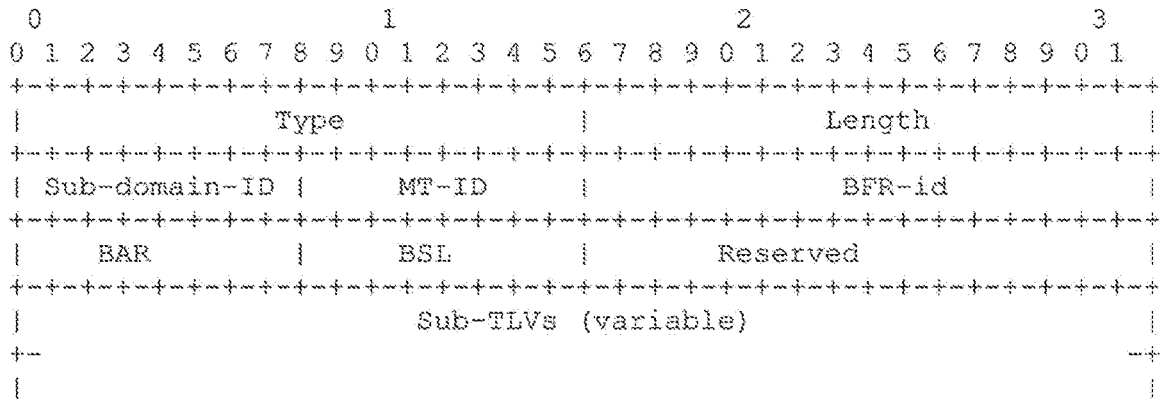
FIG. 40 illustrates a format of H-BIER Sub-TLV according to some embodiments.

Some embodiments define a new H-BIER Sub-TLV to advertise H-BIER information a, b, c and d. H-BIER Sub-TLV is carried within an Extended Prefix TLV. Presence of this Sub-TLV also indicates that the advertising BFR supports the H-BIER methods as discussed herein. FIG. 40 illustrates a format of H-BIER Sub-TLV according to some embodiments.

Figure 41:
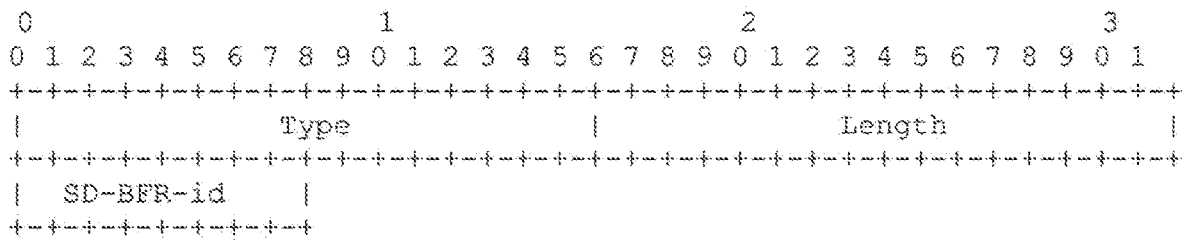
FIG. 41 illustrates a format of SD-BFR Sub-TLV according to some embodiments.
Figure 42:
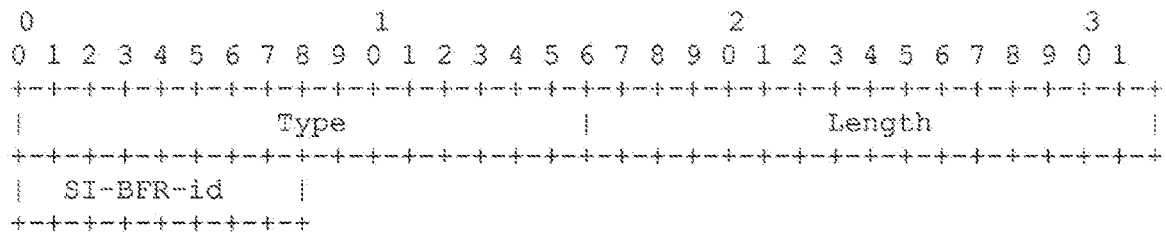
FIG. 42 illustrates a format of SI-BFR Sub-TLV according to some embodiments.

The H-BIER Sub-TLV carries the following important fields.
Type=Value 12 is proposed for H-BIER Sub-TLV type. If the implementation is standardized then need to reserve at IANA registry (https://www.iana.org/assignments/ospfv2-parameters/ospfv2-parameters.xhtml#extended-prefix-tlv-sub-tlvs)
Subdomain-id=the SD where the BFR resides.
MT-ID: Multi-Topology ID (as defined in [RFC4915]) that identifies the topology that is associated with the BIER sub-domain.
BFR-id=The 2-octet field carrying BFR-id (Keep in mind that SI is part of this BFR-id).
BAR=BIER Algorithm. It specifies the algorithm to be used when calculating optimal path to the BFR-Prefix. As of now, type 0 is supported which means use Shortest Path First (SPF) algorithm to compute reachability to the BFR-Prefix.
BSL=Bit String Length. This field carries the values defined for the BSL field in BIER header (Look at BSL definition in section 2.1.2 in [BIER-ENCAP]). From the BSL, the SI can be computed from BFR-id. For example, if BFR-id is 334 and BSL indicates 256 bits then SI=1.
Sub-TLVs=H-BIER Sub-TLV can carry one or more OPTIONAL Sub-TLVs. This invention defines the following Sub-TLVs.
SD-BFR Sub-TLV
SI-BFR Sub-TLV
MPLS Encapsulation Sub-TLV
SD-BFR Sub-TLV This OPTIONAL Sub-TLV carries information on b. This Sub-TLV is advertised by a BFR that is configured as SD-BFR. FIG. 41 illustrates a format of SD-BFR Sub-TLV according to some embodiments.
Type=Type 13 is assigned by this invention. If the implementation is standardized then need to reserve at IANA registry
https://www.iana.org/assignments/ospfv2-parameters/ospfv2-parameters.xhtml#extended-prefix-tlv-sub-tlvs
Length=1
Value=The 1-octet value carries the SD-BFR-id assigned to this SD-BFR.
SI-BFR Sub-TLV This OPTIONAL Sub-TLV carries information on c. This Sub-TLV is advertised by a BFR that is configured as SI-BFR. FIG. 42 illustrates a format of SI-BFR Sub-TLV according to some embodiments.
Type=Type 14 is assigned by this invention. If the implementation is standardized then need to reserve at IANA registry
https://www.iana.org/assignments/ospfv2-parameters/ospfv2-parameters.xhtml#extended-prefix-tlv-sub-tlvs
Length=1
Value=The 1-octet value carries the SI-BFR-id assigned to this SI-BFR.
MPLS Encapsulation Sub-TLV This OPTIONAL Sub-TLV carries the information d. MPLS Encapsulation Sub-TLV is sent if BFR receives H-BIER packet on MPLS network. FIG. 43 illustrates a format of a Sub-TLV according to some embodiments.
The Label value represents the BIFT-id in BIER header, that is to be used to send H-BIER packets to this BFR.
Originating BFR Procedures The section describes the procedures followed by a H-BIER capable BFR while advertising H-BIER information. The BFR advertises the BFR-Prefix in OSPF Extended Prefix TLV, that includes the H-BIER Sub-TLV. In the exemplary topology disclosed herein, all BFRs advertise this information across the H-BIER domain. The BFR is associated with one and only one OSPF topology that is identified by the MT-ID. The BFR can include BIER Sub-TLV in the advertisement, if it intends to support both H-BIER and state-of-the-art BIER methods. If the BFR is configured to send or receive H-BIER packets on MPLS network, then it sends MPLS Encapsulation sub-TLV. The Label value is the label that the BFR will use to receive H-BIER packets. If the BFR is configured as SD-BFR then it includes SD-BFR Sub-TLV to advertise its SD-BFR-id. If the BFR is configured as SI-BFR then it includes SI-BFR Sub-TLV to advertise its SI-BFR-id.
Receiving BFR Procedures A H-BIER Capable BFR that receives an OSPF Extended Prefix TLV with H-BIER Sub-TLV, applies the following procedure:
1. If the association between SD and OSPF topology advertised in the H-BIER Sub-TLV is in conflict with the association locally configured on the receiving router, the H-BIER Sub-TLV MUST be ignored.
2. Receiving BFR MUST check for uniqueness of the received BFR-id in a given MT-ID and SD. If duplication is detected (i.e same BFR-id is already received from another BFR-Prefix), then all BFRs advertising that BFR-id MUST be treated as if they didn't advertise a valid BFR-id.
3. If the BAR value in H-BIER Sub-TLV does not match the locally configured value, must report mis-configuration.
4. If H-BIER Sub-TLV indicates that the advertising BFR belongs to same {SD, SI} as the receiving BFR, then receiving BFR computes reachability to BFR-Prefix in the topology identified by MT-ID using BAR, and installs the route into BIRT with BFR-id as index. If {SD, SI} is not same then no path computation is performed.
5. If it carries a SD-BFR Sub-TLV and SD of advertising BFR is different from local SD then receiving BFR computes reachability to BFR-Prefix using BAR and installs the route info SD-BIRT with SD-BFR-id as index (as shown in FIG. 11). Note that it is valid to receive same SD-BFR-id from multiple BFR-Prefixes within a SD, since multiple SD-BFRs can be assigned the same SD-BFR-id for load balancing, resiliency. Only the BFR-Prefix(es) that leads to the most optimal path should be installed in SD-BIRT.

6. If it carries a SI-BFR Sub-TLV and SI of advertising BFR is different from local SI then receiving BFR computes reachability to BFR-Prefix using BAR and installs the route info SI-BIRT with SI-BFR-id as index (as shown in FIG. 12). Note that it is valid to receive same SI-BFR-id from multiple BFR-Prefixes within a SI, since multiple SI-BFRs can be assigned the same SI-BFR-id for load balancing, resiliency. Only the BFR-Prefix(es) that leads to the most optimal path should be installed in SI-BIRT.

7. If it contains MPLS Encapsulation Sub-TLV then the Label value it carries MUST be used to send MPLS encapsulated H-BIER packets to the advertising BFR (if it is the immediate next-hop for those H-BIER packets).

Flooding Scope of H-BIER Information

The flooding scope of the OSPF Extended Prefix Opaque LSA [RFC7684] that is used for advertising the H-BIER Sub-TLV is set to area-local. To allow BIER deployment in a multi-area environment, OSPF must propagate BIER information between areas. FIG. 44 illustrates the flooding scope according to some embodiments.

The following procedure is used in order to propagate H-BIER related information between areas:

When an OSPF Area Border Router (ABR) advertises a Type-3 Summary LSA from an intra-area or inter-area prefix to all its attached areas, it will also originate an Extended Prefix Opaque LSA. The flooding scope of the Extended Prefix Opaque LSA type will be set to area-local. The route-type in the OSPF Extended Prefix TLV is set to inter-area. When determining whether a H-BIER Sub-TLV should be included in this LSA, an OSPF ABR will:

Examine its best path to the prefix in the source area and find the advertising router associated with the best path to that prefix.

Determine if such advertising router advertised a H-BIER Sub-TLV for the prefix. If yes, the ABR will copy the information from such H-BIER Sub-TLV when advertising H-BIER Sub-TLV to each attached area.

In some embodiments, a router advertises a prefix 192.0.0.1/32 in Area 1. It also advertises Extended Prefix Opaque LSA for prefix 192.0.0.1/32 and includes H-BIER Sub-TLV in it. An area Border Router (ABR) calculates the reachability for prefix 192.0.0.1/32 inside Area 1 and propagates it to Area 0. When doing so, it copies the entire BIER Sub-TLV (including all its Sub-TLVs) it received from R1 in Area 1 and includes it in the Extended Prefix Opaque LSA it generates for 192.0.0.1/32 in Area 0. ABR R3 calculates the reachability for prefix 192.0.0.1/32 inside Area 0 and propagates it to Area 2. When doing so, it copies the entire H-BIER Sub-TLV (including all its Sub-TLVs) it received from R2 in Area 0 and includes it in the Extended Prefix Opaque LSA it generates for 192.0.0.1/32 in Area 2.

Methods of H-BIER Control Plane in BGP-LS

This section describes the methods in BGP-LS to advertise H-BIER information. An external component (e.g. SDN Controller) may collect H-BIER information in the "north-bound" direction (i.e. BFR->Controller) within the H-BIER domain. For example, BitString-id management procedures described above requires the SDN Controller to maintain H-BIER information database for all BFRs in the H-BIER domain. This translation is possible because Controller maintains the database of all SD-BFRs and SI-BFRs in the domain. Each BFR advertises its H-BIER information to SDN Controller through BGP-LS session.

BGP-LS address-family/sub-address-family have been defined to allow BGP to carry Link-State information. The BGP Network Layer Reachability Information (NLRI) encoding format for BGP-LS and a new BGP Path Attribute called the BGP-LS attribute. BGP-LS provides the containers for 1:1 mapping of link state information from IGPs. The BIER information advertisement originated in OSPF and ISIS. In some cases, a new BGP-LS Prefix Attribute TLV called as "BIER TLV" carries the BIER information. In order to carry H-BIER information, a new BGP-LS Prefix Attribute TLV and its Sub-TLVs are defined. This new TLV is called "H-BIER TLV". H-BIER TLV carries H-BIER information.

H-BIER TLV

FIG. 45 illustrates a format of H-BIER TLV according to some embodiments. Type: This technique assigns the value as 1163. If this technique is standardized in IETF then the value needs to be reserved in BGP-LS registry in IANA—https://www.iana.org/assignments/bgp-ls-parameters/bgp-ls-parameters.xhtml Length: 2 octet.

Reserved: is 0 on transmission, ignored on reception. May be used in future versions.

Subdomain-id: Unique value identifying the BIER subdomain, 1 octet.

MT-ID: Multi-Topology ID that identifies the topology that is associated with the BIER sub-domain.1 octet.

BitString Length (BS Len): A 1 octet field encoding the supported BitString length associated with this BFR-prefix. This field are specified in section 3 in [BIER-ENCAP]. Given that the bier router can support BSL values set, this field encoding the BSL values set that BIER routers supported.

BFR-id: A 2 octet field encoding the BFR-id, as documented in [BIER-ARCH]. If the BFR-id is zero, it means, the advertising router is not advertising any BIER-id. In some environment, BFR-id can be configured by SDN Controller, the BFR-id should be sent to a controller.

Sub-TLVs: Contains one or more Sub TLVs of H-BIER TLV. This invention defines the following Sub-TLVs.
SD-BFR Sub-TLV
SI-BFR Sub-TLV
MPLS Encapsulation Sub-TLV SD-BFR Sub-TLV This OPTIONAL Sub-TLV carries information on b originated in OSPF or IS-IS. FIG. 46 illustrates a format of SD-BFR Sub-TLV according to some embodiments.

Type=Type 1 is assigned by this invention. If the implementation is standardized then need to create a new registry at IANA for Sub-TLVs of H-BIER TLV and reserve this value.

Length=1

Value=The 1-octet value carries the SD-BFR-id assigned to this SD-BFR.

SI-BFR Sub-TLV

This OPTIONAL Sub-TLV carries information on c) originated in OSPF or IS-IS. FIG. 47 illustrates a format of SI-BFR Sub-TLV according to some embodiments.

Type=Type 2 is assigned by this invention. If the implementation is standardized then need to create a new registry at IANA for Sub-TLVs of H-BIER TLV and reserve this value.

Length=1

Value=The 1-octet value carries the SI-BFR-id assigned to this SI-BFR.

MPLS Encapsulation Sub-TLV

This OPTIONAL Sub-TLV carries the information d. MPLS Encapsulation Sub-TLV MUST be sent if BFR receives H-BIER packet on MPLS network. FIG. 48 illustrates a format of a Sub-TLV according to some embodiments.

Type=Type 3 is assigned by this invention. If the implementation is standardized then need to create a new registry at IANA for Sub-TLVs of H-BIER TLV and reserve this value.

Length=4

Reserved=Must be set to 0 by sender and ignored by receiver.

Label=Value represents the BIFT-id in BIER header, that is to be used to send H-BIER packets to this BFR, Originating BFR Procedures A BFR originates H-BIER TLV to push H-BIER information to a BGP-LS speaker, such as SDN Controller. A BFR may also originate H-BIER TLV to redistribute H-BIER information originated in IGPs (OSPF or ISIS). In such case BFR maps the H-BIER information from the IGPs to BGP-LS.

Receiver Procedures

BGP-LS speaker that receives H-BIER TLV from a BFR may build the H-BIER information database for the BFRs. For example, as mentioned above, SDN Controller receives H-BIER information for all BFR's in the domain, which is used for BitString-id management.

Figure 28:
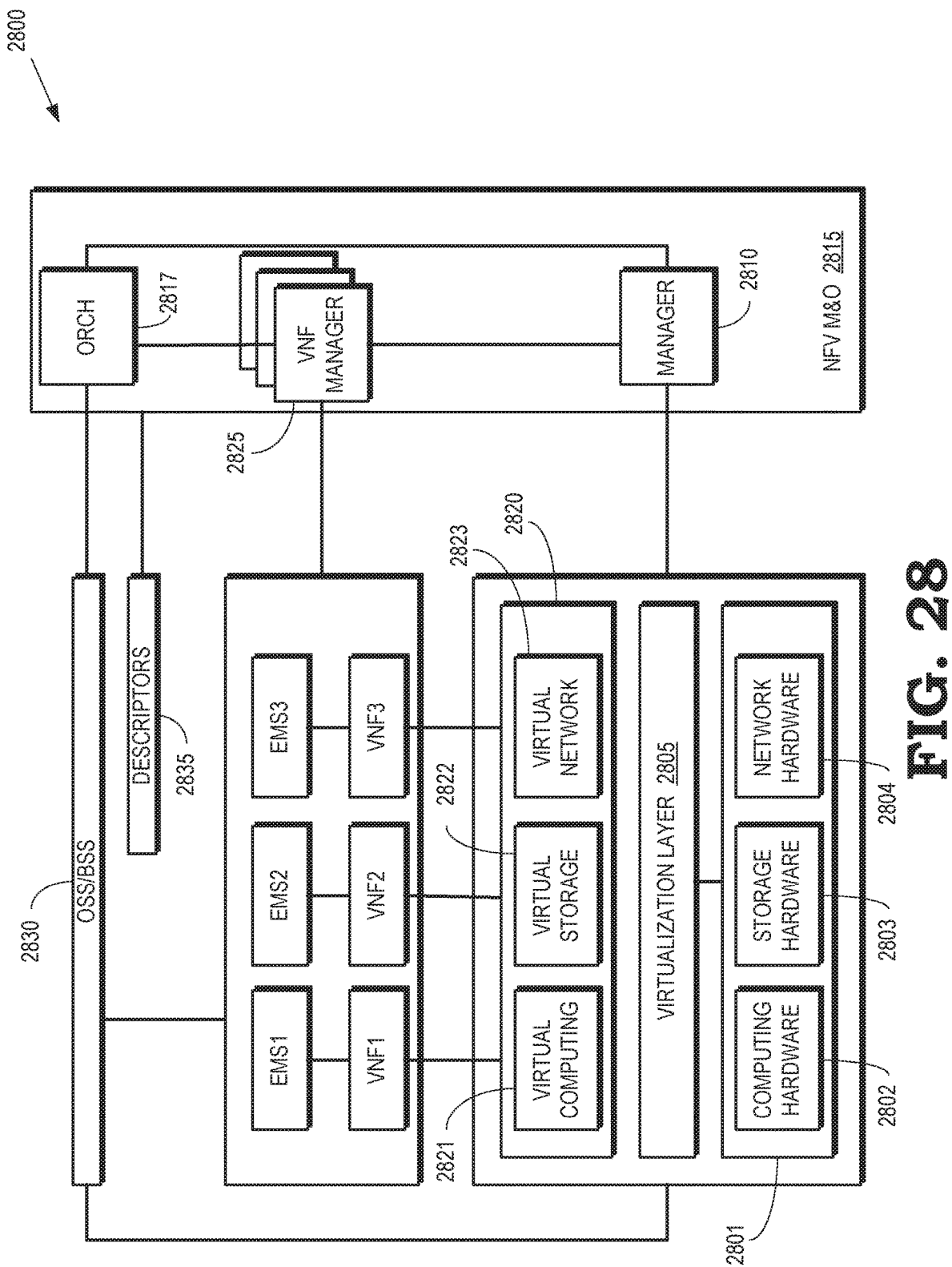
FIG. 28 is a block diagram of a network function virtualization (NFV) architecture according to some embodiments.

FIG. 28 is a block diagram of an NFV architecture 2800 according to some embodiments. The NFV architecture 2800 is used to implement some embodiments of the communication system 700 shown in FIG. 7 and the communication system 1100 shown in FIG. 11. The NFV architecture 2800 includes hardware resources 2801 including computing hardware 2802, storage hardware 2803, and network hardware 2804. The computing hardware 2802 is implemented using one or more processors, the storage hardware 2803 is implemented using one or more memories, and the network hardware 2804 is implemented using one or more transceivers, transmitters, receivers, interfaces, and the like.

A virtualization layer 2805 provides an abstract representation of the hardware resources 2801. The abstract representation supported by the virtualization layer 2805 can be managed using a virtualized infrastructure manager 2810, which is part of the NFV management and orchestration (M&O) module 2815. Some embodiments of the manager 2810 are configured to collect and forward performance measurements and events that may occur in the NFV architecture 2800. For example, performance measurements may be forwarded to an orchestrator (ORCH) 2817 implemented in the NFV M&O 2815. The hardware resources 2801 and the virtualization layer 2805 may be used to implement virtual resources 2820 including virtual computing resources 2821, virtual storage resources 2822, and virtual networking resources 2823.

Virtual networking functions (VNF1, VNF2, VNF3) run over the NFV infrastructure (e.g., the hardware resources 2801) and utilize the virtual resources 2820. For example, the virtual networking functions (VNF1, VNF2, VNF3) may be implemented using virtual machines supported by the virtual computing resources 2821, virtual memory supported by the virtual storage resources 2822, or virtual networks supported by the virtual network resources 2823. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 2825 that exchanges information and coordinates actions with the manager 2810 or the orchestrator 2817.

The NFV architecture 2800 may include an operation support system (OSS)/business support system (BSS) 2830. The OSS/BSS 2830 deals with network management including fault management using the OSS functionality. The OSS/BSS 2830 also deals with customer and product management using the BSS functionality. Some embodiments of the NFV architecture 2800 use a set of descriptors 2835 for storing descriptions of services, virtual network functions, or infrastructure supported by the NFV architecture 2800. Information in the descriptors 2835 may be updated or modified by the NFV M&O 2815.

The NFV architecture 2800 implements network slices that provide control plane functions or user plane functions. A network slice is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 2800 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   configuring a plurality of routing tables in a control plane entity of a first router of a hierarchical domain that includes having a plurality of levels, wherein each of the plurality of routing tables is associated with a different one of a plurality of types of multicast packets, wherein each of the plurality of types is associated with a different one of the plurality of levels, and wherein each of the plurality of routing tables comprises routing information used to route corresponding copies of multicast packets to routers in different levels of a hierarchy of the hierarchical domain; and
   transmitting programming information from the control plane entity to a data plane entity, wherein the programming information is used to program the data plane entity to forward the copies of the multicast packets to the routers in the different levels of the hierarchy.

2. The method of claim 1, wherein the hierarchical domain comprises a subdomain level that partitions the routers into at least one subdomain, a set level that partitions the routers in each subdomain into at least one set, and a local level that comprises the routers in the at least one set.

3. The method of claim 2, wherein the plurality of routing tables comprises a subdomain routing table that includes entries for subdomain gateway routers to the subdomains in the hierarchical domain that do not include the first router, and wherein the entries for the subdomain gateway routers include bitstrings that identify the subdomain gateway routers, routable addresses of the subdomain gateway routers, and routable addresses of next-hop routers along routes to the subdomain gateway routers.

4. The method of claim 2, wherein the plurality of routing tables comprises a set routing table that includes entries for set gateway routers to sets that are in the subdomain that includes the first router but are not in a set that includes the first router, and wherein the entries for the set gateway routers include bitstrings that identify the set gateway routers, routable addresses of the set gateway routers, and routable addresses of next-hop routers along the routes to the set gateway routers.

5. The method of claim 2, wherein the plurality of routing tables comprises a local routing table that includes entries for local routers in the set that includes the first router, and wherein the entries for the local routers include bitstrings that identify the local routers, routable addresses of the local routers, and routable addresses of next-hop routers along the routes to the local routers.

6. The method of claim 2, further comprising:
   mapping a first bitstring identifier to a first bitstring that identifies at least one set gateway router to the at least one set; and
   mapping a second bitstring identifier to a second bitstring that identifies at least one egress router.

7. The method of claim 6, further comprising:
   allocating the first bitstring identifier and the second bitstring identifier according to a request/response management protocol.

8. The method of claim 1, further comprising:
   determining a topology of the hierarchical domain by running a shortest path first (SPF) algorithm on routable addresses of the routers in the hierarchical domain.

9. The method of claim 8, wherein configuring the plurality of routing tables comprises configuring the plurality of routing tables based on the topology determined using the SPF algorithm.

10. The method of claim 8, wherein configuring the plurality of routing tables based on the topology comprises mapping routable addresses assigned to the routers into a set of equal-cost adjacencies using the SPF algorithm.

11. The method of claim 1, further comprising:
   receiving a request from the data plane entity for the programming information, and wherein transmitting the programming information comprises transmitting the programming information in response to receiving the request from the data plane entity.

12. A control plane entity of first router in a hierarchical domain comprising:
   a memory to store a plurality of routing tables in the control plane entity;
   a processor to configure the plurality of routing tables that comprise routing information used to route corresponding copies of multicast packets to routers in different levels of a hierarchy of the hierarchical domain that includes having a plurality of levels, wherein each of the plurality of routing tables is associated with a different one of a plurality of types of multicast packets, wherein each of the plurality of types is associated with a different one of the plurality of levels; and a transmitter to transmit programming information from the control plane entity to a data plane entity, wherein the programming information is used to program the data plane entity to forward the copies of the multicast packets to the routers in the different levels of the hierarchy.

13. The control plane entity of claim 12, wherein the hierarchical domain comprises a subdomain level that partitions the routers into at least one subdomain, a set level that partitions the routers in each subdomain into at least one set, and a local level that comprises the routers in the at least one set.

14. The control plane entity of claim 13, wherein the plurality of routing tables comprises a subdomain routing table that includes entries for subdomain gateway routers to the subdomains in the hierarchical domain that do not include the first router, and wherein the entries for the subdomain gateway routers include bitstrings that identify the subdomain gateway routers, routable addresses of the subdomain gateway routers, and routable addresses of next-hop routers along routes to the subdomain gateway routers.

15. The control plane entity of claim 13, wherein the plurality of routing tables comprises a set routing table that includes entries for set gateway routers to sets that are in the subdomain that includes the first router but are not in a set that includes the first router, and wherein the entries for the set gateway routers include bitstrings that identify the set gateway routers, routable addresses of the set gateway routers, and routable addresses of next-hop routers along the routes to the set gateway routers.

16. The control plane entity of claim 13, wherein the plurality of routing tables comprises a local routing table that includes entries for local routers in the set that includes the first router, and wherein the entries for the local routers include bitstrings that identify the local routers, routable addresses of the local routers, and routable addresses of next-hop routers along the routes to the local routers.

17. The apparatus of claim 13, further comprising:
a first table in a subdomain gateway router that maps a first bitstring identifier to a first bitstring that identifies at least one set gateway router to the at least one set; and
a second table in the at least one set gateway router that maps a second bitstring identifier to a second bitstring that identifies at least one egress router.

18. The apparatus of claim 17, further comprising:
a controller configured to allocate the first bitstring identifier and the second bitstring identifier according to a request/response management protocol.

19. The control plane entity of claim 12, wherein the processor is to determine a topology of the hierarchical domain by running a shortest path first (SPF) algorithm on routable addresses of the routers in the hierarchical domain.

20. The control plane entity of claim 19, wherein the processor is to configure the plurality of routing tables based on the topology determined using the SPF algorithm.

21. The control plane entity of claim 20, wherein the processor is to map routable addresses assigned to the routers into a set of equal-cost adjacencies using the SPF algorithm.

22. The control plane entity of claim 12, further comprising:
a receiver to receive a request from the data plane entity for the programming information, and wherein the transmitter is configured to transmit the programming information in response to receiving the request from the data plane entity.

23. A control plane entity for a first router in a hierarchical domain comprising:
a memory configured to store:
a subdomain routing table that includes entries for subdomain gateway routers to the subdomains in the hierarchical domain that do not include the first router,
a set routing table that includes entries for set gateway routers to sets that are in the subdomain that includes the first router but are not in a set that includes the first router,
a local routing table that includes entries for local routers in the set that includes the first router,
a transmitter to transmit programming information from the control plane entity to a data plane entity, wherein the programming information is used to program the data plane entity to forward the copies of the multicast packets to the routers in the different levels of the hierarchy.

24. The control plane entity of claim 23,
wherein the entries for the subdomain gateway routers include bitstrings that identify the subdomain gateway routers, routable addresses of the subdomain gateway routers, and routable addresses of next-hop routers along routes to the subdomain gateway routers;
wherein the entries for the set gateway routers include bitstrings that identify the set gateway routers, routable addresses of the set gateway routers, and routable addresses of next-hop routers along the routes to the set gateway routers; and
wherein the entries for the local routers include bitstrings that identify the local routers, routable addresses of the local routers, and routable addresses of next-hop routers along the routes to the local routers.

* * * * *